(12) United States Patent
Dickson

(10) Patent No.: US 11,998,768 B2
(45) Date of Patent: Jun. 4, 2024

(54) HEAT RESISTANT DESCENT CONTROLLER

(71) Applicant: Tech Safety Lines, Inc., Carrollton, TX (US)

(72) Inventor: Johnny Dickson, Van Alstyne, TX (US)

(73) Assignee: Tech Safety Lines, Inc., Carrollton, TX (US)

( * ) Notice: Subject to any disclaimer, the term of this patent is extended or adjusted under 35 U.S.C. 154(b) by 0 days.

(21) Appl. No.: 18/104,854

(22) Filed: Feb. 2, 2023

(65) Prior Publication Data
US 2023/0173308 A1 Jun. 8, 2023

Related U.S. Application Data

(63) Continuation-in-part of application No. 17/174,928, filed on Feb. 12, 2021, now Pat. No. 11,752,366, which is a continuation of application No. 16/850,556, filed on Apr. 16, 2020, now Pat. No. 10,918,892, application No. 18/104,854 is a continuation-in-part of application No. 29/709,729, filed on Oct. 16, 2019, now Pat. No. Des. 933,308, and a continuation-in-part of application No. 29/709,730, filed on Oct. 16, 2019, now Pat. No. Des. 957,742, and a continuation-in-part of application
(Continued)

(51) Int. Cl.
*A62B 1/14* (2006.01)
*F16D 63/00* (2006.01)

(52) U.S. Cl.
CPC .............. *A62B 1/14* (2013.01); *F16D 63/008* (2013.01)

(58) Field of Classification Search
CPC .... A62B 1/14; A62B 1/00; A62B 1/06; A62B 1/08; F16D 63/008
See application file for complete search history.

(56) References Cited

U.S. PATENT DOCUMENTS

| 263,775 A | 9/1882 | Emmert |
| 300,857 A | 6/1884 | Evans |
| D28,992 S | 7/1898 | Eldon |

(Continued)

FOREIGN PATENT DOCUMENTS

| CA | 771509 A | 11/1967 |
| CN | 102548349 A | 7/2012 |

(Continued)

OTHER PUBLICATIONS

Instagram, "Highnovate", first available Jan. 1, 2021. (https://www.instagram.com/p/CJgf5BJhKi_I/) (Year: 2021).
(Continued)

*Primary Examiner* — Pamela Rodriguez
(74) *Attorney, Agent, or Firm* — Vincent J. Allen; J. Miguel Hernandez; Carstens, Allen & Gourley, LLP

(57) ABSTRACT

A load lowering descent controller having a fixed cylindrical body or capstan about which a rope or cable is turned. The descent controller allows for lowering of the load at a controlled rate by adjusting the amount of friction between the controller and the rope or cable as a function of rope or cable turning and relative contact with rope or cable engagement surfaces in the controller. The fixed cylindrical body or capstan is surrounded by a vented sleeve to prevent the rope from becoming heated and to prevent the user from being injured.

23 Claims, 29 Drawing Sheets

Related U.S. Application Data

No. 29/709,731, filed on Oct. 16, 2019, now Pat. No. Des. 957,743.

(60) Provisional application No. 63/306,712, filed on Feb. 4, 2022.

(56) References Cited

U.S. PATENT DOCUMENTS

| | | | |
|---|---|---|---|
| 3,335,469 | A | 8/1967 | Shand et al. |
| 3,949,832 | A | 4/1976 | Hunter |
| 4,040,627 | A | 8/1977 | Useldinger |
| 4,474,262 | A | 10/1984 | Himmelrich |
| 4,508,193 | A | 4/1985 | Forrest |
| 4,576,248 | A | 3/1986 | Marom |
| 4,651,351 | A | 3/1987 | Endo et al. |
| 4,883,146 | A | 11/1989 | Varner et al. |
| 5,038,888 | A | 8/1991 | Varner et al. |
| 5,090,503 | A | 2/1992 | Bell |
| 5,131,491 | A | 7/1992 | Varner et al. |
| D385,936 | S | 11/1997 | Nakazaki |
| 5,738,046 | A | 4/1998 | Williams et al. |
| 5,848,667 | A | 12/1998 | Davidson |
| D422,200 | S | 4/2000 | Maruyama |
| 6,800,007 | B2 | 10/2004 | Calkin |
| 6,814,185 | B1 | 11/2004 | Ostrobrod |
| 7,036,628 | B2 | 5/2006 | Wilcox et al. |
| 7,131,515 | B2 | 11/2006 | Gartsbeyn et al. |
| D533,813 | S | 12/2006 | Fujiwara et al. |
| D599,961 | S | 9/2009 | Arshadi |
| 7,650,717 | B2 | 1/2010 | Drayer |
| D616,950 | S | 6/2010 | Hersee et al. |
| 7,942,241 | B2 | 5/2011 | Botti et al. |
| 8,353,386 | B2 | 1/2013 | Helms |
| 9,320,925 | B2 | 4/2016 | Wise |
| 9,643,034 | B2 | 5/2017 | Wise |
| D854,395 | S | 7/2019 | Meyer et al. |
| 10,918,892 | B2 | 2/2021 | Dickson |
| D933,308 | S | 10/2021 | Dickson |
| D957,742 | S | 7/2022 | Dickson |
| D957,743 | S | 7/2022 | Dickson |
| 2003/0057018 | A1 | 3/2003 | Dodson et al. |
| 2003/0057023 | A1 | 3/2003 | Gartsbeyn et al. |
| 2004/0231923 | A1 | 11/2004 | Gartsbeyn et al. |
| 2005/0230184 | A1 | 10/2005 | Ansaldo |
| 2006/0113147 | A1 | 6/2006 | Harris, Jr. et al. |
| 2007/0007266 | A1 | 1/2007 | Sasaki et al. |
| 2007/0272484 | A1 | 11/2007 | Helms |
| 2010/0051381 | A1 | 3/2010 | Wydner et al. |
| 2020/0330799 | A1 | 10/2020 | Dickson |

FOREIGN PATENT DOCUMENTS

| | | |
|---|---|---|
| CN | 102721020 A | 10/2012 |
| CN | 102247663 B | 6/2013 |
| CN | 203631161 U | 6/2014 |
| EP | 3159047 A1 | 4/2017 |
| JP | D1688913 | 7/2021 |

OTHER PUBLICATIONS

Open Tip, "Sky Genie DS-L Descender Sky Genie", First accessed Feb. 23, 2021. (https://www.opentip.com/Sky-Genie-DS-L-Descender-Sky-Genie-p-4180457.html?ad=rc_related) (Year: 2021).

Tech Safety Lines, "SRK-15", first accessed Feb. 23, 2021. (https://www.techsafetylines.com/app/uploads/2019/12/TSL_SRK-15_Globai-Kit.pdf) (Year: 2021).

Youtube, "Tech Safety Lines' Aerial Platform (MEWP) Rescue Solutions", first available Apr. 18, 2019. (https://www.youtube.com/watch?v=PFYbeU3DBXw&feature=emb_title) (Year: 2019).

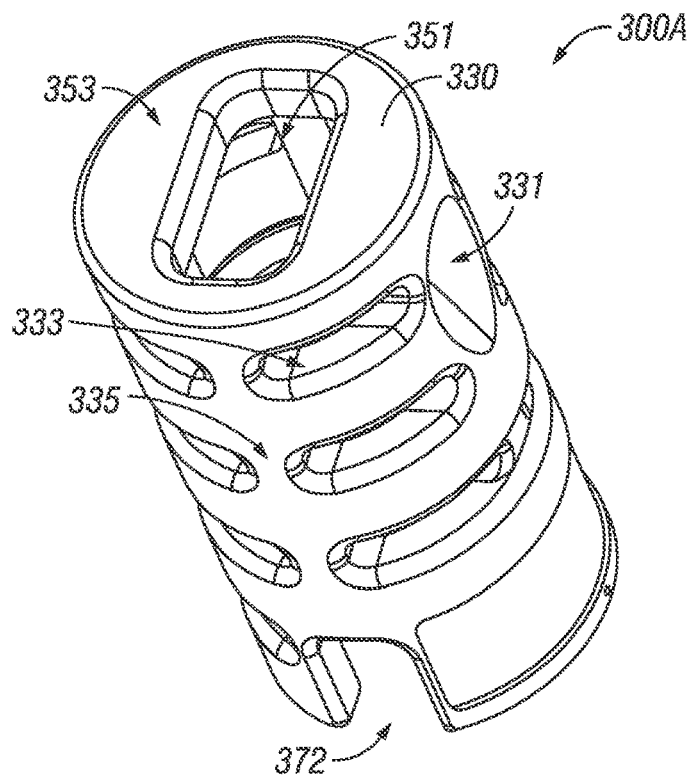
FIG. 16A
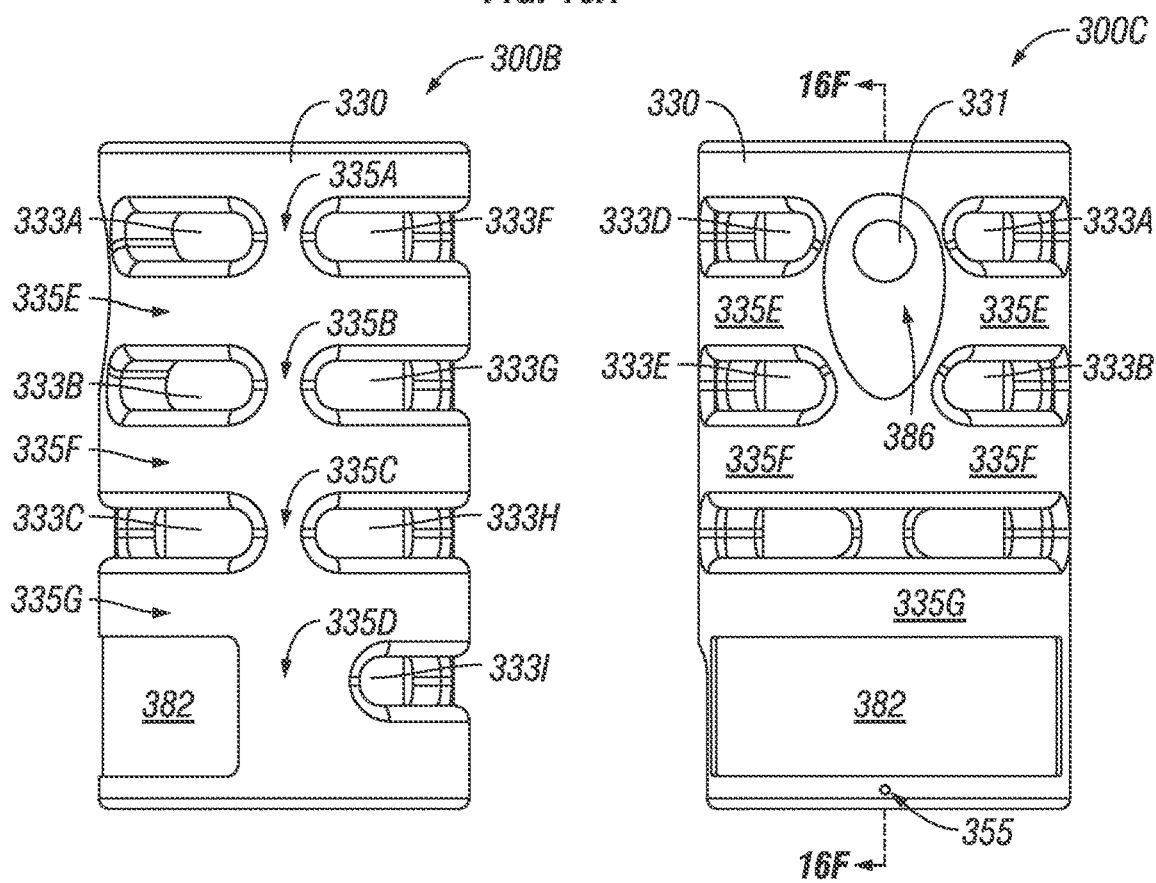
FIG. 16B                  FIG. 16C

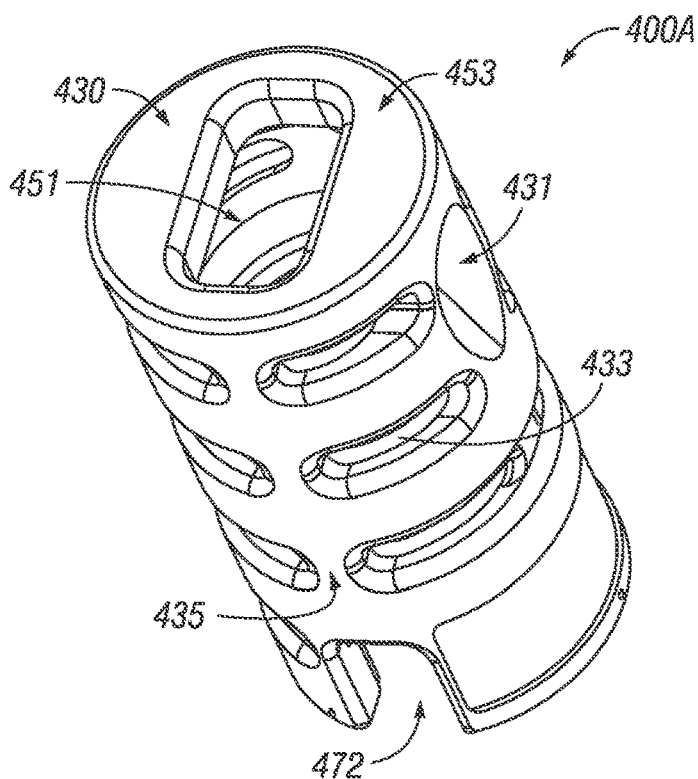
FIG. 18A
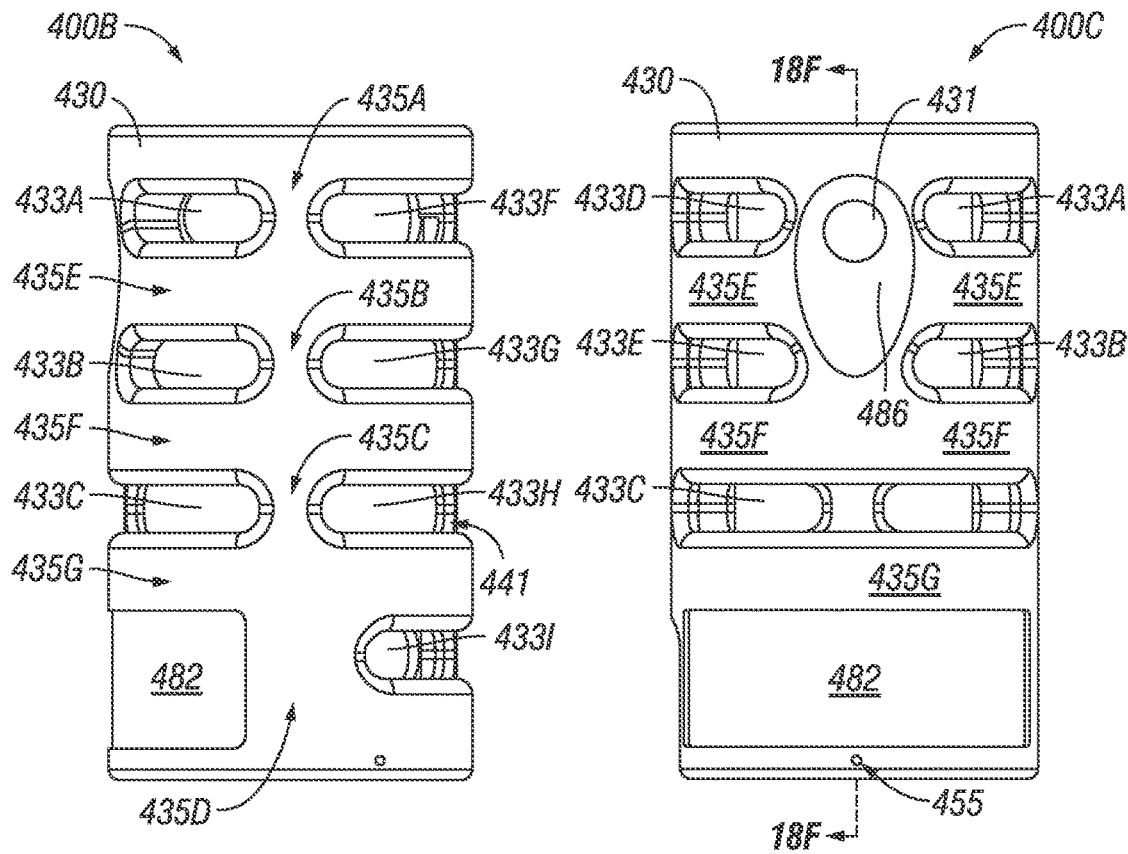
FIG. 18B
FIG. 18C

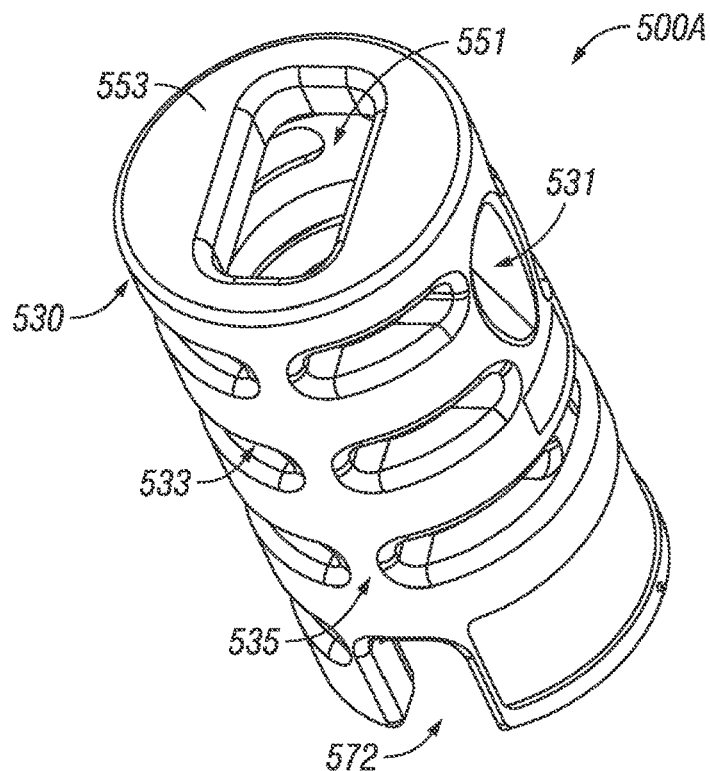
FIG. 20A
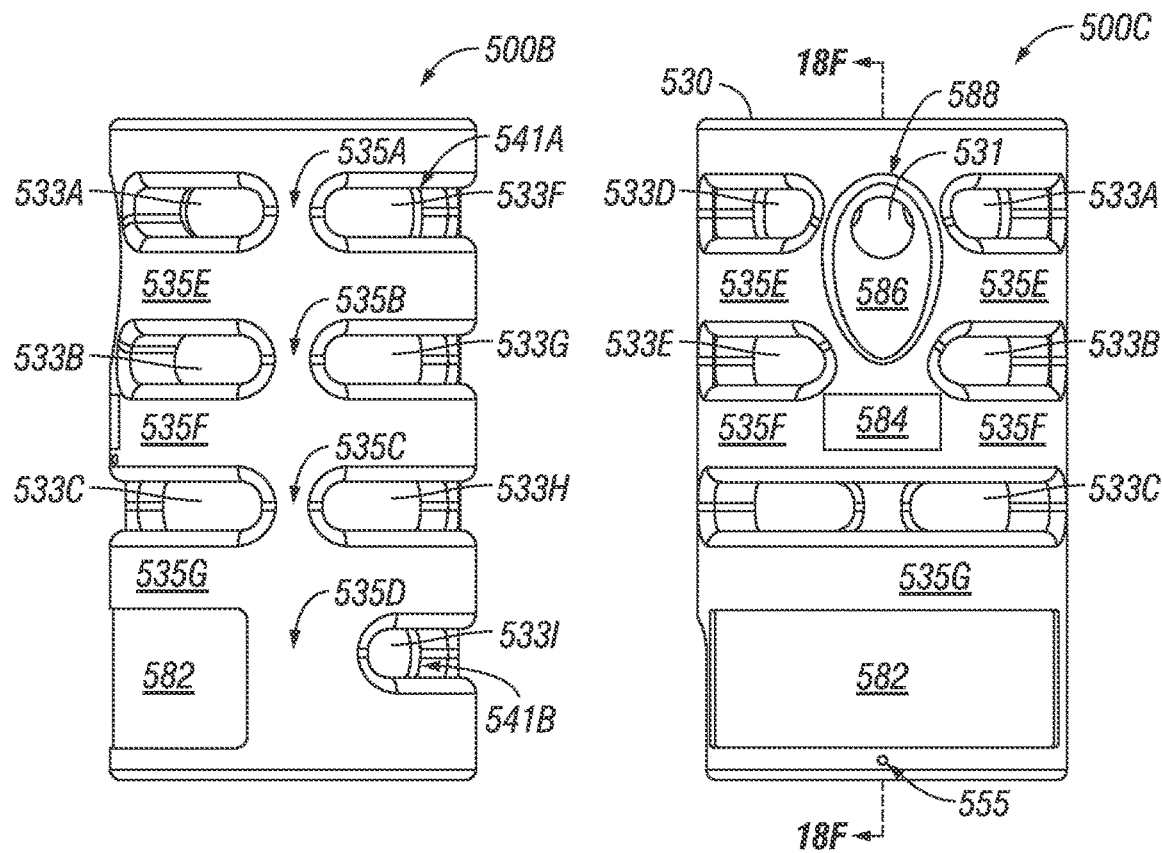
FIG. 20B
FIG. 20C

HEAT RESISTANT DESCENT CONTROLLER

CROSS-REFERENCE TO RELATED APPLICATION

Applicant incorporates herein by reference U.S. Pat. No. 7,131,515 B2; U.S. application Ser. No. 10/251,090; U.S. Provisional Patent Application No. 60/324,756. This disclosure is a non-provisional conversion of U.S. Provisional Patent Application Ser. No. 63/306,712, filed on Feb. 4, 2022; which is a continuation-in-part of U.S. application Ser. No. 16/850,556 filed on Apr. 16, 2020, now U.S. Pat. No. 10,918,892 B2; which is a non-provisional of U.S. Design Patent Application Nos. 29/709,731, 29/709,729 and 29/709,730 filed on Oct. 16, 2019 and a non-provisional conversion of U.S. Provisional Patent Application Ser. No. 62/834,782, filed Apr. 16, 2019, the entirety of which is incorporated herein by reference in its entirety for all purposes.

BACKGROUND

Technical Field

The present disclosure relates to a descent controller. More particularly, and not by way of limitation, the present disclosure is directed to an apparatus, system, and method for a heat resistant descent controller.

Background

This background section is intended to provide a discussion of related aspects of the art that could be helpful to understanding the embodiments discussed in this disclosure. It is not intended that anything contained herein be an admission of what is or is not prior art, and accordingly, this section should be considered in that light.

Descent assistance devices have been used for many years to aid in the lowering of a user or a load from a higher elevation to a lower elevation. These devices have taken many different forms and utilized various elements to provide a mechanical advantage and/or braking in order to control the descent of the user or load. Concerns with occupational safety have led to the development of mechanisms that enable a worker to lower himself from an elevated position such as a scaffold, crane, lift truck or platform in the event of an emergency such as a fire or fall.

As newly constructed buildings continue to increase in height, and the density of buildings increase, the length of rope to support a user or load also increases. One problem that arises with longer rope deployments is the heat that is generated in the descent controller device upon descent of a desired distance by a user. As a user brakes and/or controls his or her descent, the descent controller and rope individually and together generate significant heat. In some cases, the heat generated can exceed 300° F. As heat is generated, coatings and rope materials such as wax, and/or nylon begin to melt causing a buildup of this material within the descent controller. The buildup can cause additional heat to be generated from the material-to-material contact (wax-on-wax contact) that generates increased friction and heat.

It would be advantageous to have a descent controller that overcomes the disadvantages of the prior art.

BRIEF SUMMARY

This summary provides a discussion of aspects of certain embodiments of the invention. It is not intended to limit the claimed invention or any of the terms in the claims. The summary provides some aspects, but there are aspects and embodiments of the invention that are not discussed here.

It is an object of the present disclosure to provide a new and improved load lowering descent controller of the type embodying a fixed cylindrical body or capstan about which a rope or cable is turned. Another object of the present disclosure is to provide a descent controller of the foregoing character that may be actuated for lowering a load such as an unconscious user or equipment. A further object of the present disclosure is to provide a descent controller of the foregoing character, having a compact and robust design. Still another object of the present disclosure is to provide a descent controller wherein the operating components are substantially enclosed with a vented sleeve. An additional object of the present disclosure is to provide a descent controller having the foregoing characteristics, which enables the user to adjust the mechanical advantage of the device. A further object of the present disclosure is to provide vents in a sleeve or protective sleeve to prevent the rope from generating excessive heat during a descent. The sleeve or protective sleeve can be manufactured through additive manufacturing, injection molding, milling, or other manufacturing techniques.

Briefly, one embodiment of the present disclosure comprises an improved descent controller for lowering a load along a rope from an elevated position to a relatively lower position. The controller comprises a housing, having a friction cylinder or capstan of a length adapted to receive a plurality of turns of the rope wrapped therearound. The housing has an upper end portion and a lower end portion, with top and bottom end plates attached respectively adjacent the upper end portion and spaced from the lower end portion of the housing. The lower end portion has a transverse through aperture connecting to a generally longitudinal aperture. The top end plate has a portion thereof overhanging the cylinder and defining radial slots sized to loosely receive the rope. The housing defines a longitudinal counterbore intersecting the transverse through aperture at the housing lower end portion. An elongated aperture extends transversely through the housing upper end portion and intersects the counterbore.

A plunger comprises a bottom portion disposed within the housing counterbore and a top portion disposed adjacent the housing top plate. The plunger may include an intermediate portion having a diameter between the diameter of the bottom and top portions. The bottom portion of the plunger extends below the lower end plate and defines diametrically therethrough a downwardly narrowing tapered slot. The tapered slot defines an enlarged end adapted to freely admit the rope and tapers from the enlarged end to a relatively constricted end of a width sufficient for gripping the rope.

A bias member is disposed within the counterbore and between the plunger bottom portion and the housing. The bias member urges the plunger toward a position for wedging the rope in the narrow end of the tapered slot. An outer sleeve is secured to the plunger top portion for use in sliding the plunger against the force of the biasing spring to release the rope from the narrow end of the tapered slot. The sleeve defines a housing substantially enclosing the plunger, spring, friction cylinder, and the rope wrapped therearound. The lower portion of the sleeve may also include a longitudinally extending slot therein of sufficient width for freely receiving the rope. Means are provided on the lower end of the housing for engagement with a load support. The descent controller supports a load on the rope and, upon sliding movement of the sleeve, provides for a controlled descent of descent controller and the supported load along the rope.

In another aspect of the disclosure, the controller can be secured at an elevated position and actuated at that point to lower a rope-supported load. The present disclosure provides a descent controller that substantially encloses the working components. Additionally, the descent controller can use parts that are robust in construction while requiring only a fraction of the length of some known controllers.

BRIEF DESCRIPTION OF THE DRAWINGS

The novel features believed characteristic of the disclosure are set forth in the appended claims. The disclosure itself, however, as well as a preferred mode of use, further objectives, and advantages thereof, will be best understood by reference to the following detailed description of illustrative embodiments when read in conjunction with the accompanying drawings, wherein:

FIG. 16A is a perspective view illustration of a single-sleeve for a descent controller.

FIG. 16B is a side view illustration of a single-sleeve for a descent controller.

FIG. 16C is a front view illustration of a single-sleeve for a descent controller.

FIG. 18A is a perspective view illustration of a multi-sleeve combination for a descent controller.

FIG. 18B is a rear view illustration of a multi-sleeve combination for a descent controller.

FIG. 18C is a front view illustration of a multi-sleeve combination for a descent controller.

FIG. 20A is a perspective view illustration of a multi-sleeve combination for a descent controller.

FIG. 20B is a rear view illustration of a multi-sleeve combination for a descent controller.

FIG. 20C is a front view illustration of a multi-sleeve combination for a descent controller.

DETAILED DESCRIPTION

Figure 1:
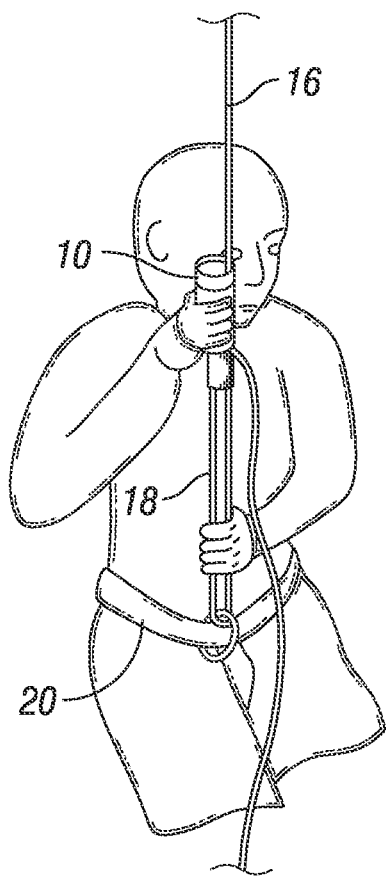
FIG. 1 is a perspective view illustrating use of an embodiment of a descent controller.
Figure 2:
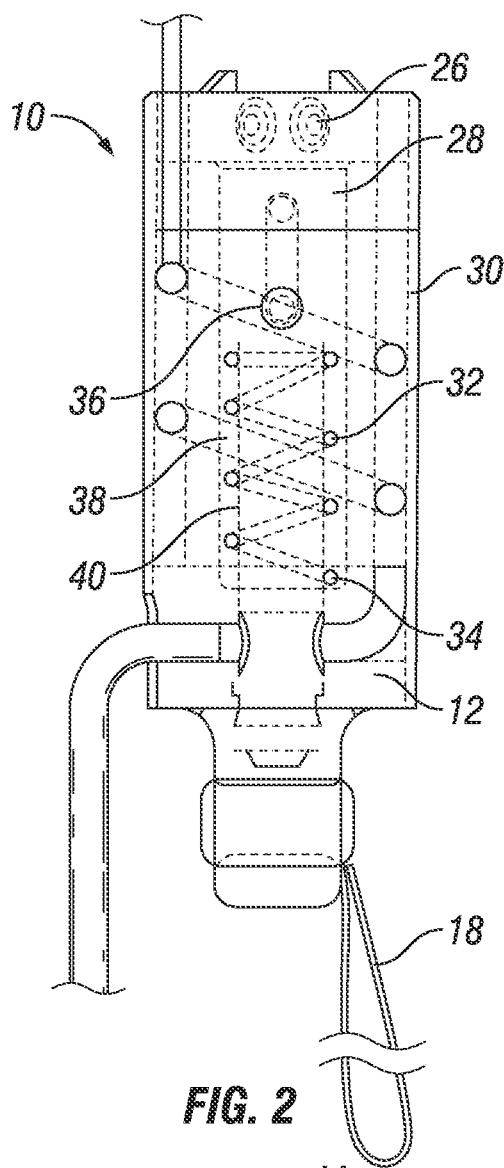
FIG. 2 is side view, partly in phantom and partly in section, of an embodiment of a descent controller.
Figure 3:
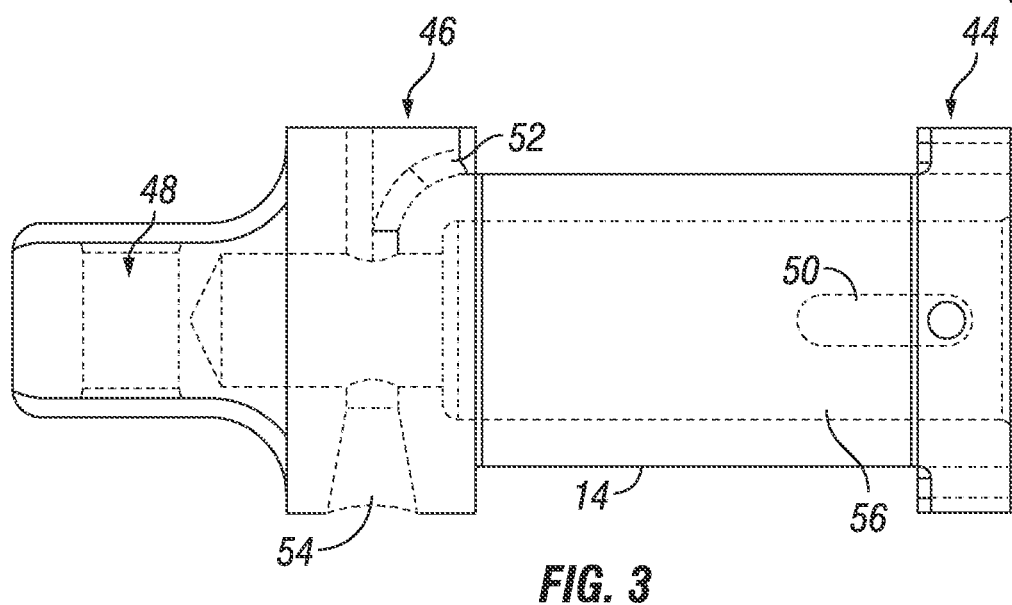
FIG. 3 is a side view showing the descent controller of FIG. 2 in a different orientation.

One embodiment of a descent controller 10 of the present disclosure is shown in FIGS. 1, 2 and 3. The descent controller comprises a housing 12 including a longitudinally oriented capstan 14 such as a cylinder shaft or drum about which a length of rope or line 16 is wound. The number of turns of rope is the principal determinate of the capstan ratio or mechanical advantage enabling the user or load to descend slowly along the fixed rope as the rope hangs from the elevated point. A user can change the number of turns of rope wound around the capstan to change the mechanical advantage and thereby the descent speed. The rope is secured at one end at an elevated point (not shown) above the ground and hangs downwardly to the ground or a lower platform (not shown). The descent controller is mounted on the rope to enable the descent controller and user or a load to descend slowly and controllably along the fixed length of rope from the elevated point to the lower point, whether the ground or a platform.

In at least one embodiment, the user and the rope may be coupled together through a belt 20 or other safely device such as a vest or backpack. The controller includes means for selectively gripping the rope to slow or prevent descent and for selectively releasing the rope to provide for a controlled descent. In a first extreme position or deadman position, the controller grips the rope tightly, preventing descent. In some embodiments, the opposite extreme position comprises a complete release position wherein the rope is released at a rate limited by the weight of the load and the number of turns of rope wrapped around the capstan or friction cylinder. Between the extreme positions, the rope can be released at a user-controlled rate.

The housing of the descent controller 10 includes a top plate 44 adjacent an upper end portion and a bottom portion comprising a bottom plate 46 adjacent a lower end of the capstan 14. Juxtaposed with the bottom portion of the housing is means for receiving a coupling device 48, strap 18, supporting rope, hook, loop, carabiner or the like for engaging and supporting a load suspension structure or harness, as shown in FIG. 2. The housing can be an integral structure.

In FIG. 3, the housing lower end portion defines a transverse through aperture 54 connecting to a longitudinal aperture 52, each sized for freely receiving a portion of the rope. The top plate 44 includes at least one rope receiving guide notch defined therein for receiving an inserted portion of the rope.

The housing defines a longitudinal counterbore 56 substantially concentric with a center axis and intersecting the transverse through aperture 54 at the housing lower end portion. Advantageously, the housing defines a diametrically smaller counterbore in the lower end portion and a diametrically larger counterbore in the intermediate and upper portions.

The housing intermediate and upper portions define at least one longitudinally elongated aperture 50 intersecting the counterbore. Advantageously, the housing defines a pair of diametrically opposed, longitudinally elongated apertures 50 and at least one of the apertures extends transversely through the wall of the housing and intersects the counterbore.

A plunger 28 (partially illustrated in phantom) comprises a bottom portion disposed within the housing counterbore and a top portion overlying the housing top plate. The plunger 28 includes an intermediate portion that may have a diameter between the bottom and top portions. The plunger 28 intermediate portion defines a diametrical aperture therethrough. The plunger can be integral to the housing.

The housing is secured to the plunger by at least one stop pin 36, shown in FIG. 2, extending through the plunger diametrical aperture and the housing longitudinally elongated aperture 50. The stop pin and longitudinally elongated aperture combine to limit the plunger to only axial movement between the extreme raised and lowered positions.

In one embodiment, the bottom portion of the plunger extends below the lower end plate and defines diametrically therethrough a narrowing tapered slot (not illustrated) having a generally teardrop shape. The slot tapers from an enlarged end that loosely receives the rope to a narrow or gripping end that frictionally grips the rope. A rope passing through the open end of the slot moves freely through the slot. However, the rope is tightly gripped and restrained by the narrower end of the slot. The housing transverse aperture 54 positively positions the rope in the slot. The transverse aperture 54 receives the rope and allows the rope to pass freely through the enlarged end of the tapered slot when the plunger is in a lowered position, as well as receiving the rope to force or jam the rope into the narrow end of the tapered slot when the plunger is in its upper position.

While a downwardly narrowing tapered slot is disclosed, it should be understood that other slots having different configurations in which the rope is loosely received in one portion and restrained from passage in another portion are possible and all such configurations are encompassed by the disclosure. For example, the slot may have an enlarged central portion connecting opposing narrower portions in a general diamond shape.

As shown in FIG. 3, The rope is inserted through the transverse through aperture 54 and longitudinal aperture 52, wound in a number of coils or turns about the capstan or friction cylinder 14 between the bottom and top plates and disposed through the top plate guide notch.

A bias member functions to urge the plunger toward its rope gripping or deadman position, wherein the narrower end of the slot is aligned with the housing transverse through aperture 54. In this position, the slot narrow end restrains the rope from passing through the descent controller. The bias member can be, for example, a coil spring 32 disposed between an interior wall 38 of the counterbore and an outer surface 40 of the bottom portion of the plunger. Preferably, a lower end of the spring is supported by a thrust shoulder 34 in the housing lower end portion, and an opposing upper end of the spring is supported by a plunger thrust shoulder defined at the intersection of the plunger bottom and intermediate portions.

A sleeve or housing 30 is secured to the plunger top portion. As shown in FIGS. 2 and 3, the sleeve extends in surrounding covering relation with the plunger intermediate and lower portions, spring, capstan, rope turns, the housing upper and lower plates and some of the housing lower end portion. Advantageously, the sleeve is removably secured to the plunger top portion by, for example, ball detents 26 or threaded fasteners so that the sleeve can be removed to facilitate disassembly and reassembly of the descent controller.

In one embodiment, the sleeve 30 can have a knurled, grooved or roughened outer surface to enable a user to readily grip the housing surface without slipping, to actuate the plunger. Adjacent its lower edge, the sleeve is provided with a longitudinally extending peripheral notch that aligns with the housing transverse aperture and through which the rope loosely extends.

Because the sleeve is rotationally secured to the plunger, and the plunger is rotationally secured to the housing by, for example, the stop pin, there is no tendency for the sleeve and/or plunger to rotate with respect to the capstan cylinder in this embodiment, thereby minimizing binding or jamming of the rope during descent.

In the event that a user completely releases the sleeve, e.g. a deadman fall, the spring will bias the plunger to a raised or second position so that the transverse aperture will jam the rope in the upper tapered end of the slot to prevent or retard further descent. The device can thus provide for a stop or a controlled descent as desired under deadman conditions.

Figure 4A:
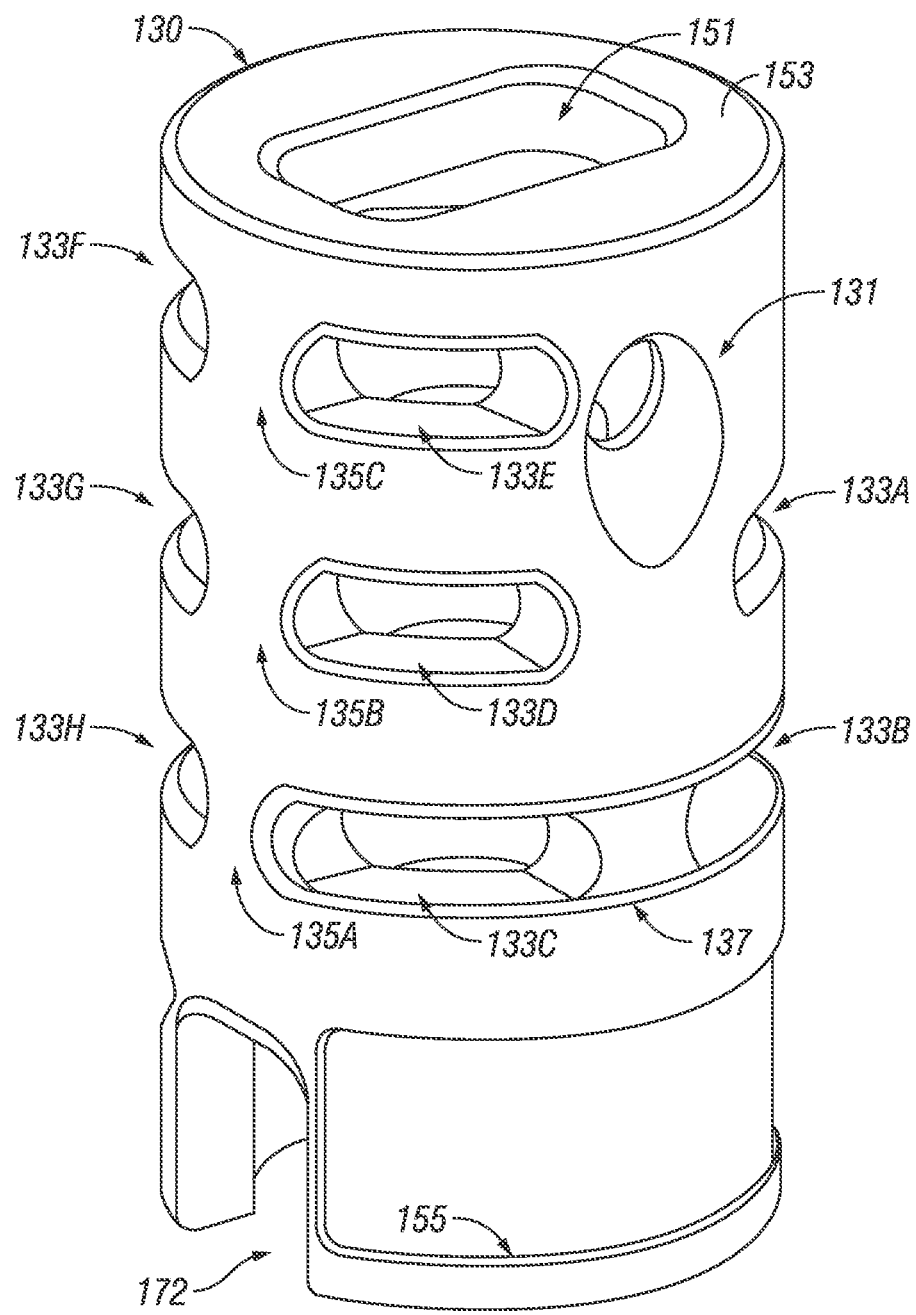
FIG. 4A is an upper perspective view of an embodiment of a vented sleeve.
Figure 4B:
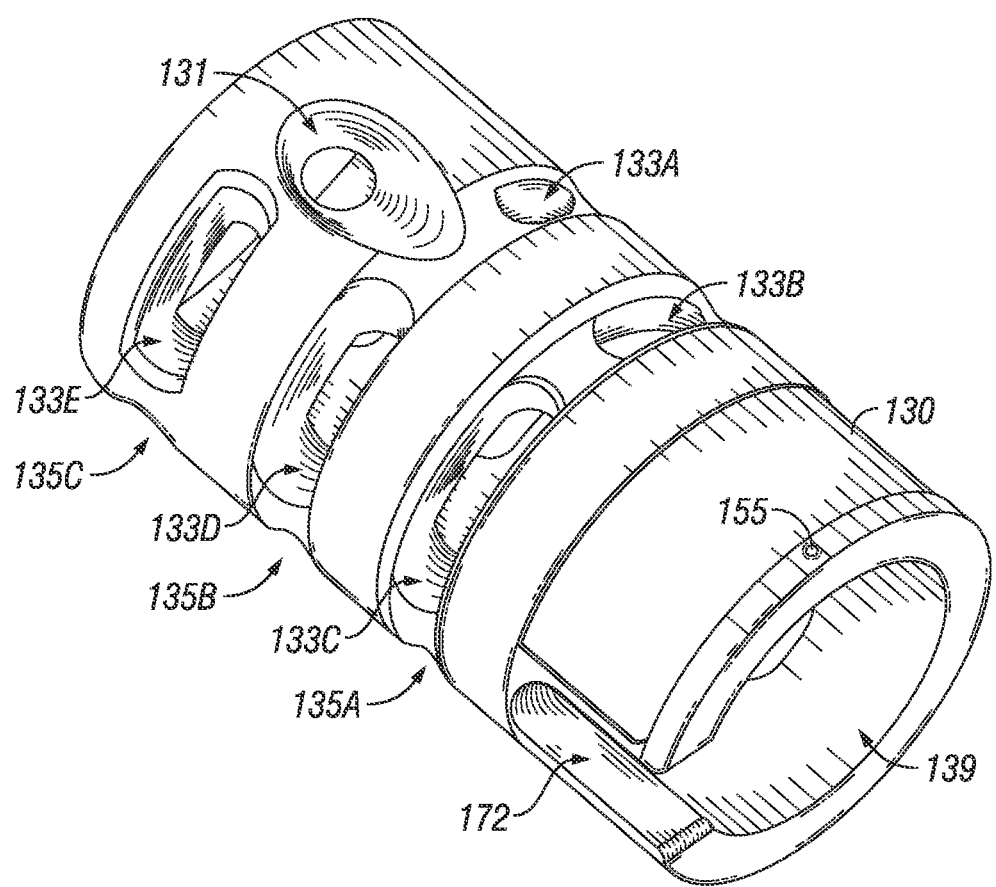
FIG. 4B is a lower perspective view of an embodiment of a vented sleeve.

FIG. 4A is an upper perspective view of an embodiment of a vented sleeve 130. Such a vented sleeve could be used, for example, with the descent controller described with reference to FIGS. 1-3. FIG. 4B a lower perspective view of an embodiment of a vented sleeve 130. With reference to FIGS. 4A and 4B, the vented sleeve 130 can be manufactured from a heat resistant material such as but not limited to plastic, heat resistive nylon, glass filled nylon, plastic based composite materials, plastic like composite materials, or other heat resistant materials capable of additive (three-dimensional printing) manufacturing, milling, and/or injection molding. In at least one embodiment, the vented sleeve 130 may be manufactured out of plastic, heat resistant nylon, glass filled nylon, metals such as aluminum or titanium, and/or composites such as carbon fiber or other similar and/or like compounds. The vented sleeve 130 may also be sized and/or shaped to house a descent controller within it.

For example, the vented sleeve 130, in at least one embodiment, can be a cylinder, or elongated cylinder, with a top or upper section, a side or enclosing section, and a bottom or lower section. The side or enclosing section may be coupled to and/or manufactured as part of the top and/or bottom section. In at least one example, the vented sleeve 130 in a first position may house or enclose the housing and/or plunger of the descent controller.

The vented sleeve 130 can have at least one button aperture 131. The button aperture 131 can have an angled lip that can surround the button aperture 131. The button aperture 131 can, in at least one example, be substantially closer to the top than the bottom of the vented sleeve 130 along a portion of the side section. The side section may also have one or more vents 133A, 133B, 133C, 133D, 133E, and/or 133F (collectively 133). The vent(s) 133 in at least one example, are substantially oval with the semi-major axis extending parallel with the top and bottom of the vented sleeve 130. In at least one embodiment, the vent(s) 133 are placed along the circumference of the vented sleeve 130. When there are two or more vent(s) 133, there can be a separation support 135A, 135B, and/or 135C (collectively 135). In at least one example, there may also be partial separation support(s) 137. The partial separation support(s) 137 can have a depth that is less than the separation support 135. In at least one embodiment, the partial separation support(s) 137 is at least one half the depth of the separation support 135, but no more than two-thirds the depth of the separation support 135. The vented sleeve 130, can have an extending peripheral notch 172 that can align with portions of a descent controller to allow for a rope move freely through the descent controller. The bottom of the vented sleeve 130 can have an engaging aperture 139 to allow for a descent controller to be inserted into and/or within the vented sleeve 130. The vented sleeve 130 can be coupled to a descent controller by a pin placed through a securing aperture 155. The top 153 of the vented sleeve 130 can have a rope aperture 151 that allows for a rope to pass through the vented sleeve 130 from a descent controller.

Figure 5:
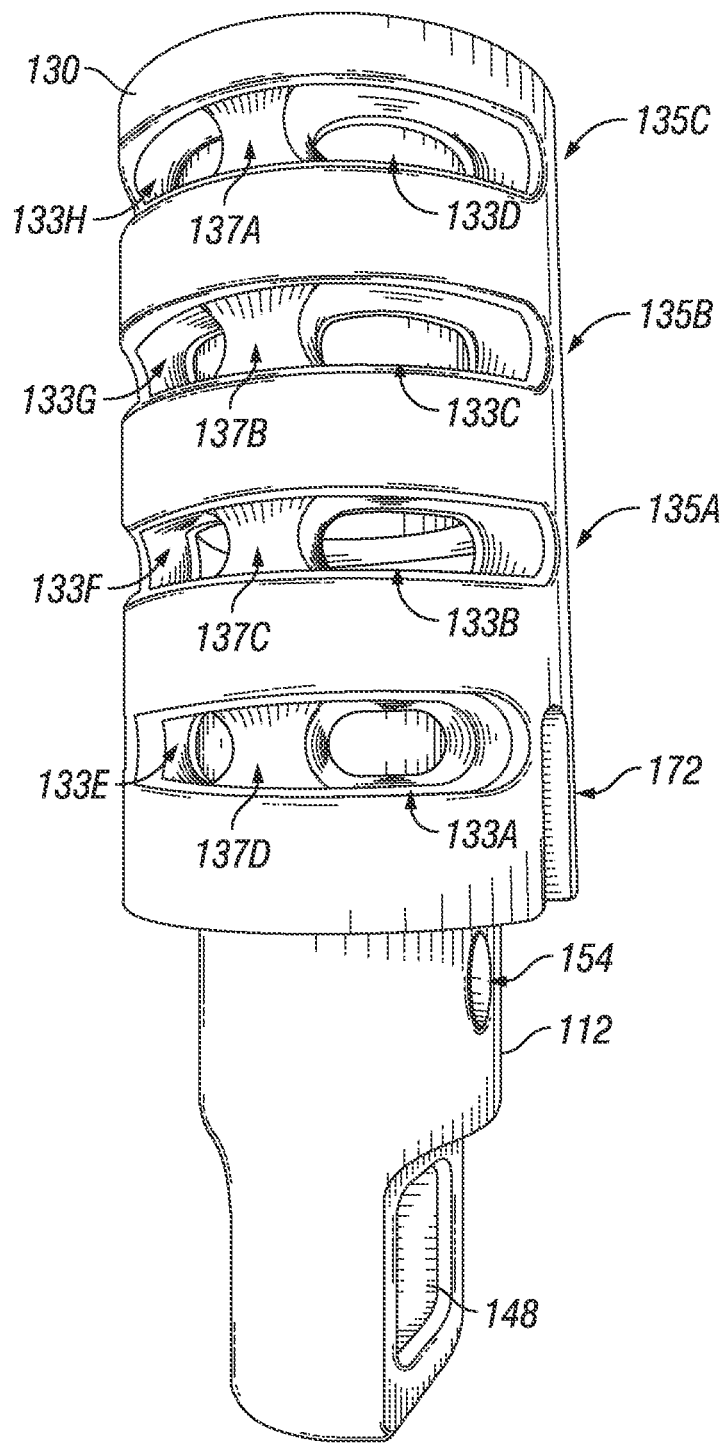
FIG. 5 is a perspective assembly view of an embodiment of a vented sleeve together with a housing.

FIG. 5 is a perspective assembly view of an embodiment of a vented sleeve together with a housing. The vented sleeve 130 can have one or more vent(s) 133A, 133B, 133C, 133D, 133E, 133F, 133G, and/or 133H (collectively 133). The vented sleeve 130 can have separation support(s) 135A, 135B, and/or 135C (collectively 135). The separation support(s) 135 can provide structural integrity to the vented sleeve 130. For example, the vented sleeve 130 may have a single set of separation supports 135 vertically along the outer circumference of the vented sleeve 130 opposite the button aperture (shown in FIGS. 4A and 4B). In other examples, the vented sleeve 130 may have more than one set of separation supports 135 vertically along the circumference of the vented sleeve 130. In at least one embodiment, the vented sleeve 130 has two sets of separation supports 135 arranged vertically along the circumference of the vented sleeve 130. In at least one example, the vented sleeve 130 may also have partial separation support(s) 137A, 137B, 137C, and/or 137D (collectively 137). The partial separation support(s) 137 would have a depth that is less than the depth (from the outer surface of the vented sleeve 130, to the inner surface of the vented sleeve 130) of the separation support(s) 135.

The vented sleeve 130 can have an extending peripheral notch 172 that can align with aperture 154 (a rope travel aperture) that allows for a rope to pass through the vented sleeve 130 and a descent controller. The aperture 154 may be disposed within a housing 112. The housing 112 can receive a plunger (not illustrated) that can be operated with a resistance device to serve as a lock and/or brake for the rope. Juxtaposed with the bottom portion of the housing is means for receiving a coupling device 148 for attaching a connection, such as, but not limited to a strap, supporting rope, hook, loop, carabiner or the like for engaging and supporting a load suspension structure or harness. The coupling device 148 and housing 112 can be, but is not required to be, an integral structure as shown in FIG. 5.

Figure 6:
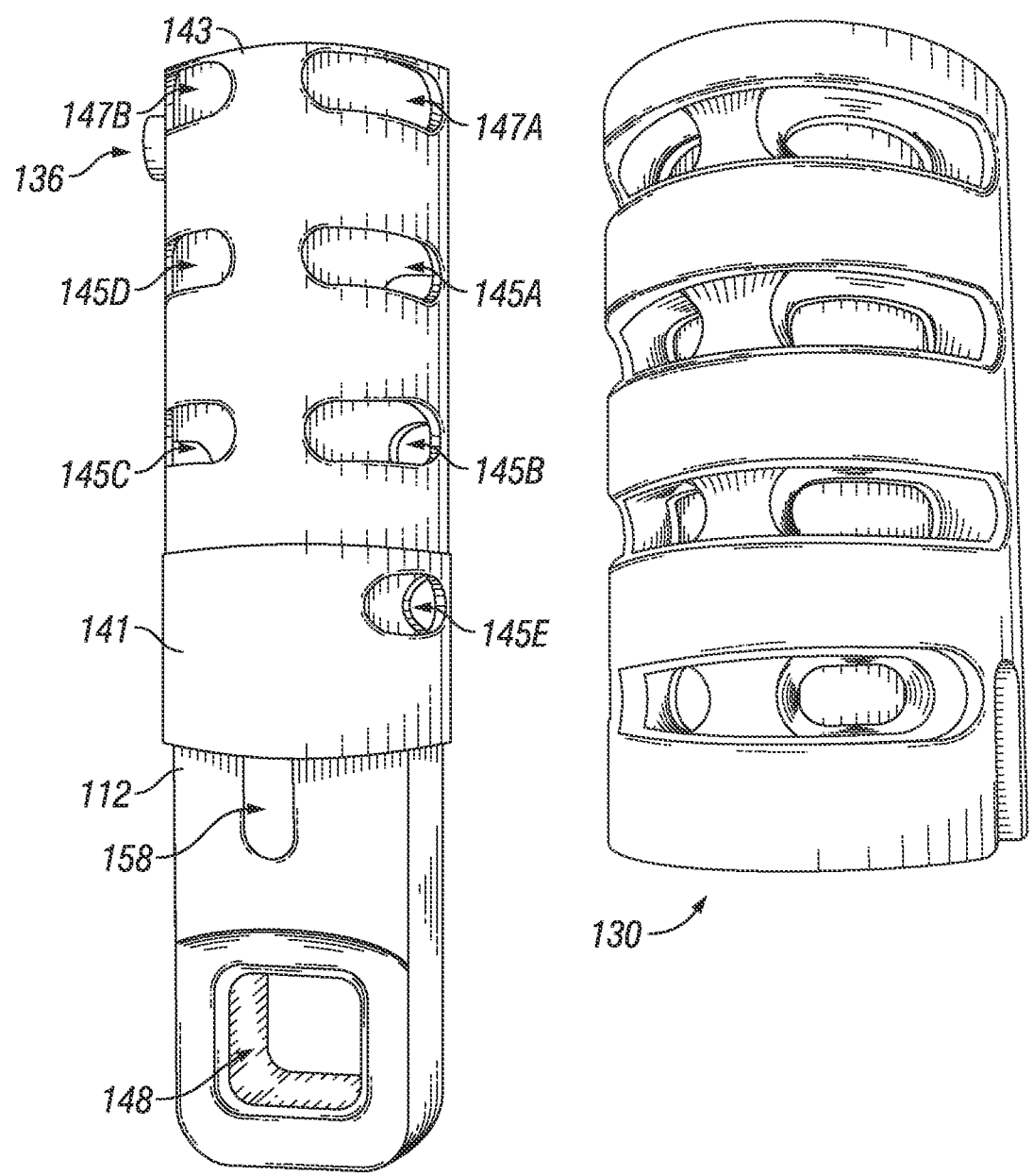
FIG. 6 is a side perspective view of an embodiment of a housing and protective sleeve assembly and a vented sleeve.

FIG. 6 is a side perspective view of an embodiment of a housing and protective sleeve assembly and a vented sleeve. The protective sleeve 141 (inner sleeve) can have an upper section 143 that has at least one button aperture (not shown) that allows for operation of the securing button 136. The securing button 136 can pass through the protective sleeve 141 (inner sleeve) and the vented sleeve 130 (outer sleeve). The protective sleeve 141 can also have venting apertures 145A, 145B, 145C, 145D, and/or 145E (collectively 145). The protective sleeve 141 may be manufactured out of plastic, heat resistant nylon, glass filled nylon, metals such as aluminum or titanium, and/or composites such as carbon fiber, plastic based composite materials, metallic based composite materials, or other similar and/or like compounds. The upper section 143 of the protective sleeve 141 (inner vented sleeve) may also have upper venting aperture(s) 147A and/or 147B. The aperture 158 that allows for a rope to pass through the vented sleeve 130 and a descent controller may be disposed within a housing 112. The housing 112 can receive a plunger (not illustrated), which can be operated with a resistance device, such as, but not limited to a spring, coil, magnets, and/or other devices capable of resistance, to serve as a lock and/or brake for the rope. Juxtaposed with the bottom portion of the housing is means for receiving a coupling device 148 for attaching a connection such as a strap, supporting rope, hook, loop, carabiner, or the like for engaging and supporting a load suspension structure or harness like that shown in FIG. 1. The housing 112 and the receiving means 148 can be an integral structure.

Figure 7A:
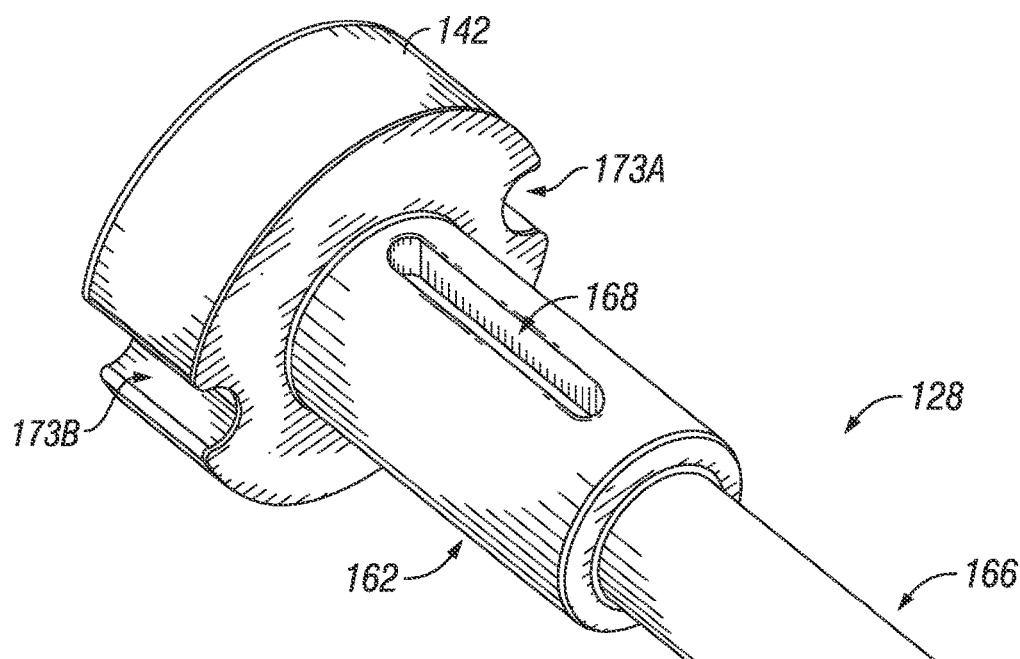
FIG. 7A is a perspective view of an embodiment of a plunger.
Figure 7B:
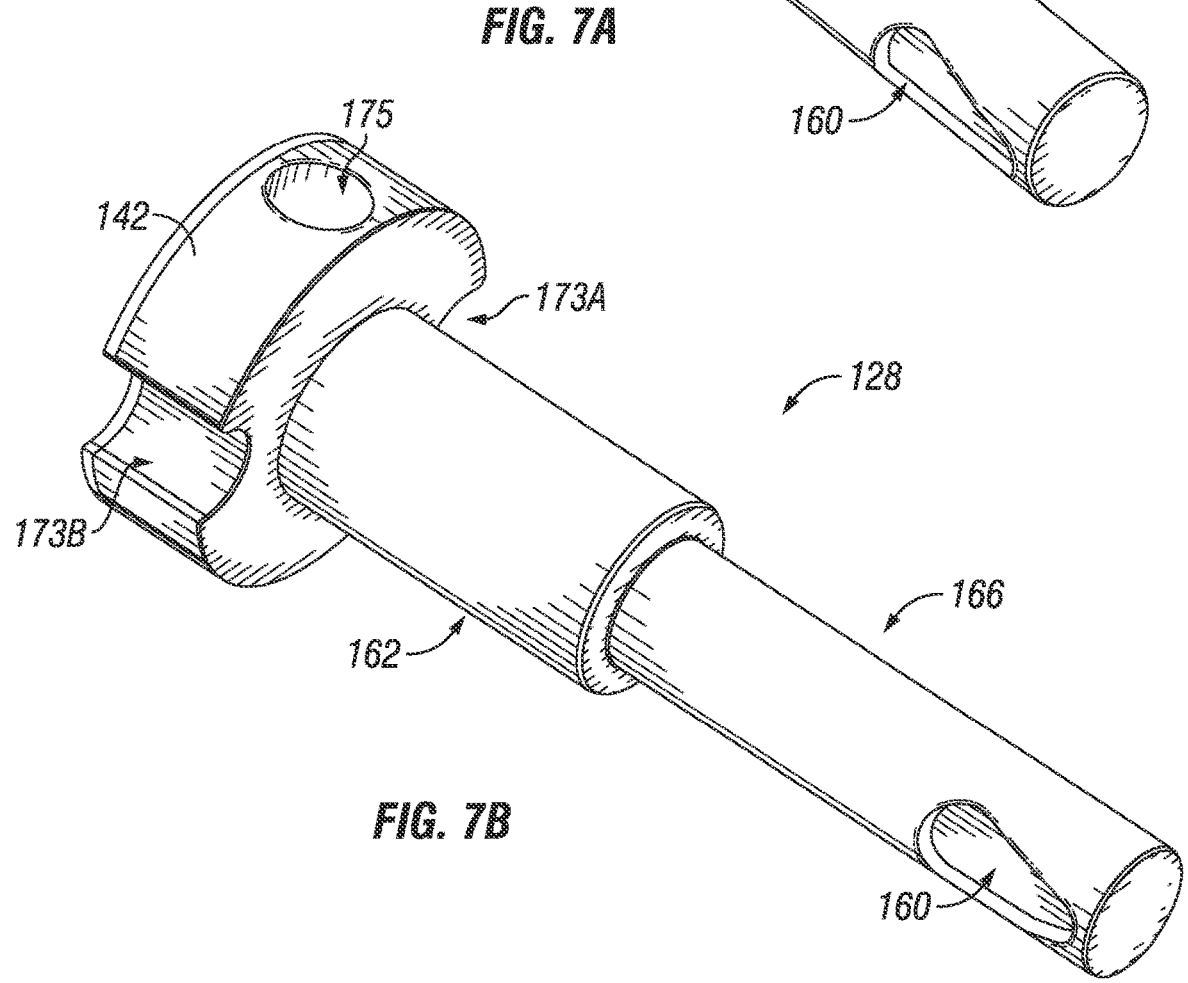
FIG. 7B is a perspective view of the plunger of FIG. 7A showing the opposite side.

FIGS. 7A and 7B are perspective views of an embodiment of a plunger 128. With respect to FIGS. 7A and 7B, the plunger 128 can have an upper portion 142, an intermediate portion 162, and/or a bottom or lower portion 166. In at least one example, the upper portion 142 is at least two or three times larger in diameter than the intermediate portion 162, the diameter of which is larger than the lower portion 166. The upper portion 142 can have one or more rope slot(s) 173A and/or 173B (collectively 173). The rope slots 173 are apertures along the circumference of the upper portion 142 that allow a rope to pass through the plunger 128 and/or the upper portion 142. The upper portion 142 may also have a securing button aperture 175 that is sized for receiving a securing button (not pictured) and/or a biasing or resistive device to correspond with the securing button. The intermediate portion 162 may have a securing slot 168. The securing slot 168 can be an elongated slot for receiving a securing pin to limit the travel of the plunger 128 against a biasing means or resistance device. For example, the securing slot 168 in combination with a securing pin (not illustrated) can prevent the plunger 128 from overextending or pushing the plunger 128 past the housing (see FIGS. 8A and 8B), potentially cutting the rope (not illustrated). In at least one example, the securing slot 168 has a depth less than the diameter of the intermediate portion 162. Lower portion 166 can also have a narrowing tapered aperture or slot 160 that allows for the passage of a rope and/or securing line through it.

Figure 8A:
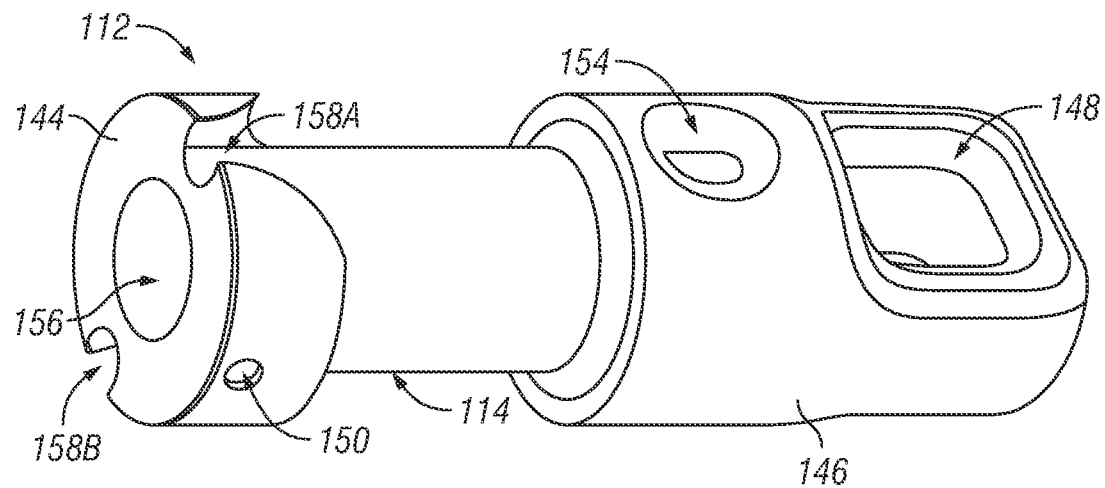
FIG. 8A is a perspective view of an embodiment of a housing.
Figure 8B:
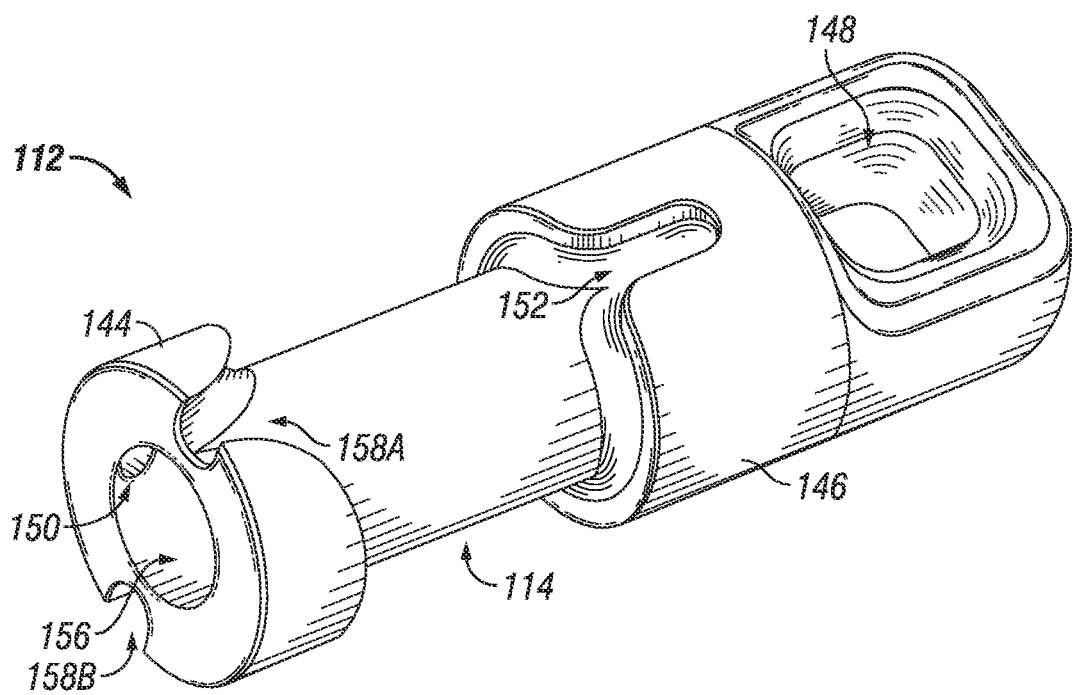
FIG. 8B is a perspective view of the housing of FIG. 8A showing the opposite side.

FIGS. 8A and 8B are perspective views of an embodiment of a housing 112. With regards to FIGS. 8A and 8B, the housing 112 has a capstan 114. In at least one example, the capstan 114 can be an intermediate portion between the top or upper portion 144, and the bottom or lower portion 146. The capstan 114, in at least one embodiment, is a smooth surface that allows for a rope and/or line to be coiled and/or lined around it, to create a mechanical advantage. In some examples, the upper portion 144 and the lower portion 146 are of the same diameter that is greater than the diameter of the capstan 114. The upper portion 144, may have at least one rope aperture 158A and/or 158B (collectively 158) that allow for the passage of a rope or line from the capstan 114 to a plunger (not illustrated). The rope aperture 158 can be configured to receive and allow the passage or traversal of a rope or line. The upper portion 144 may also have a securing pin aperture 150 that intersects the upper portion 144 and is sized and/or configured to receive a securing pin (not illustrated). The securing pin can be utilized to prevent the plunger from exceeding its desired travel distance. In one embodiment, the securing pin aperture 150 in combination with a securing pin (not illustrated) penetrating the securing slot 168 of the plunger 128 illustrated in FIGS. 7A and 7B, can prevent the plunger 128 from extending to point of breaking, cutting and/or severing a rope (not illustrated).

The upper portion 144 and the capstan 114 may be configured to have a counterbore 156 that is concentric with a center axis that passes through both the upper portion 144 and the capstan 114. In at least one example, the counterbore 156 receives the plunger and/or a biasing, resistance and/or resistive device. The housing 112 and the plunger 128, as illustrated in FIGS. 7A and 7B, move towards one another with the plunger being engaged by a biasing, resistance and/or resistive device. In at least one examples, the biasing, resistance and/or resistive device is a spring. The lower portion 146 may have a transverse through aperture 154 connecting to a longitudinal aperture 152, each sized for freely receiving a portion of the rope. The longitudinal aperture 152 may also be coupled and/or allow for a rope to be received by the capstan 114. In at least one example, a rope or line may be placed through the transverse through aperture 154 that is coupled to the longitudinal aperture 152, allowing the rope or line to be coiled around the capstan 114 and then traversing the rope aperture 158. In at least one example, the bore defined by the transverse through aperture 154, longitudinal aperture 152, along with the capstan 114, and the rope aperture(s) 158 are all smooth to allow a rope or line to pass through and/or around them without friction or an increase in friction or resistance. The lower portion 146 may also have a receiving means 148 or securing loop that allows for ropes, hooks, loops, carabiners, or the like to be utilized for engaging and supporting a load suspension structure or harness by the housing 112.

Figure 9A:
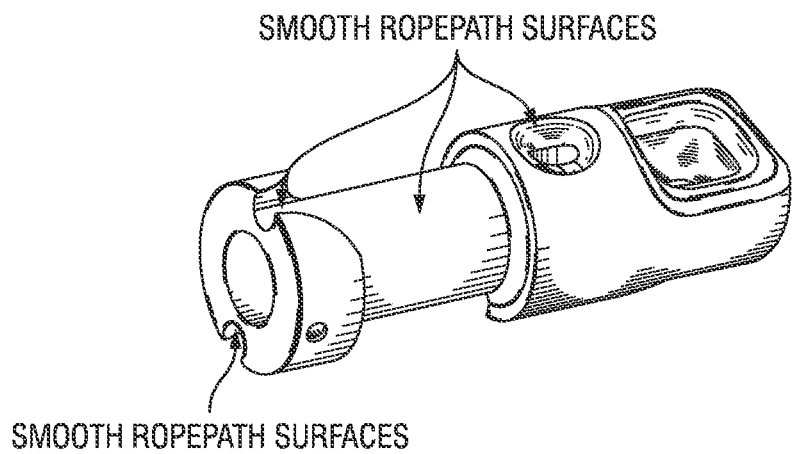
FIGS. 9A and 9B are perspective views of an embodiment of a housing illustrating rope path surfaces.
Figure 9B:
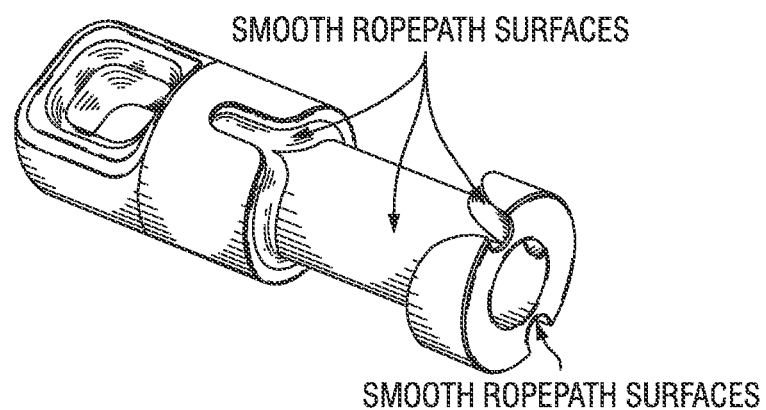
Figure 9C:
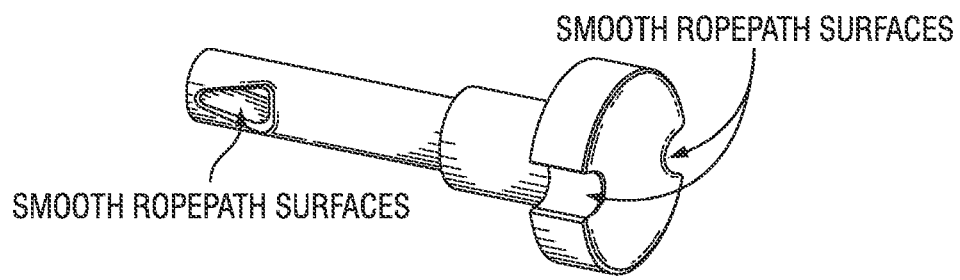
FIG. 9C is a perspective view of an embodiment of a plunger illustrating rope path surfaces.

FIGS. 9A, 9B and 9C are perspective views of an embodiment of a housing and a plunger illustrating the surfaces that allow a rope to traverse the housing and plunger. The surfaces that interact with the rope can be smooth to prevent higher friction coefficients and heat. As the rope passes over the surfaces, it may deposit its coating or composition material on to the surface. The deposit of material causes a generation of material-on-material friction that quickly generates significant heat in the housing, plunger, and rope. A traditional sleeve has no ventilation, causing heat to continually build over long rope deployments. As the temperature rises the rope may begin to show signs of charring or burn marks that can cause concern for the user. However, the vented sleeve, as illustrated in FIGS. 4A and 4B, allows the generated heat to be released in a manner that prevents the rope from charring or burning.

In any embodiment, the portions of the device in contact with the rope, such as aperture edges, can be polished, chamfered, or rounded to reduce the risk of cutting or damaging the rope. The rope path surfaces as referenced allow for a nonlinear rope path and are surprisingly influential to rope wear and rope capacity. Preferably, the surfaces in these areas are smoothly flowing rope paths comprising inner radii of more than 1.2 times the rope radius, external radii of more than 3 times the rope radius, and rope contact areas with no high spots or ledges. Ropes such as VECTRAN, 12 strand braided rope, available from The Cortland Companies and having a diameter of about 5 mm can be used with a descent controller having the preferred smoothly flowing rope paths. Surfaces in these areas that have an inner radius of less than 1 times the rope radius, an external radius of less than 3 times the rope radius, or a high area or ledge may decrease the rope ultimate yield strength or carrying capacity by as much as 50 percent.

Figure 10A:
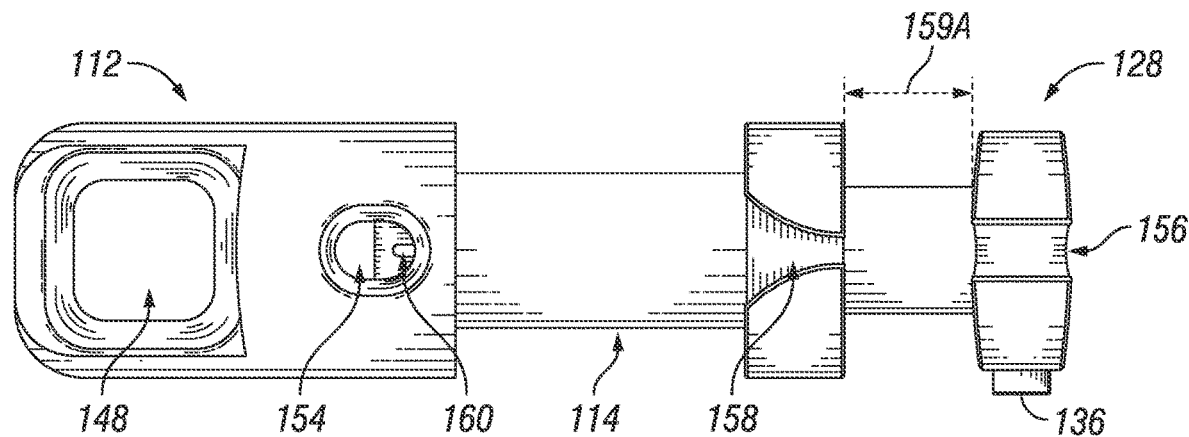
FIG. 10A is a side assembly view of an embodiment of a housing and plunger in a first position.
Figure 10B:
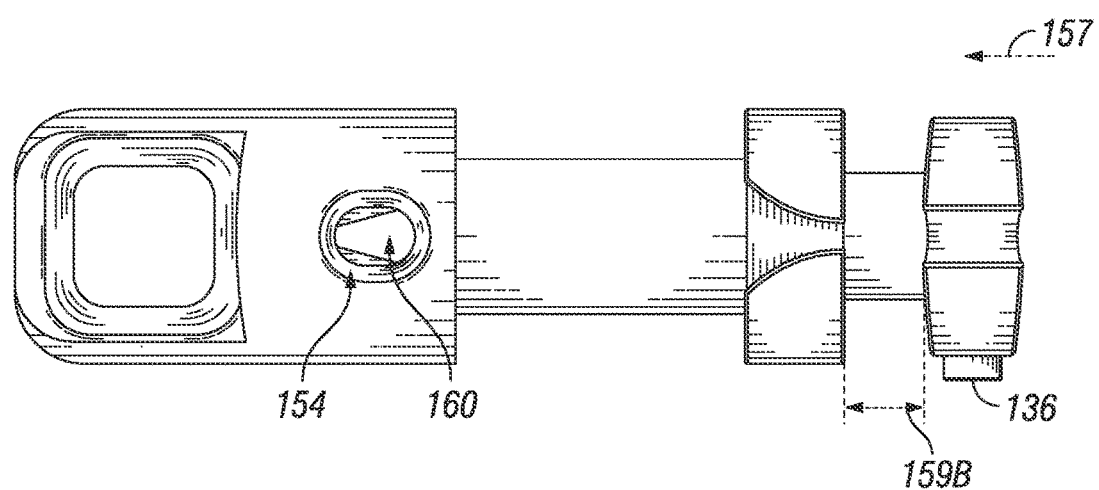
FIG. 10B is a side assembly view of an embodiment of a housing and plunger in a second position.

FIGS. 10A and 10B are side views of an embodiment of a housing and plunger assembly that illustrate the operation of the housing 112 and the plunger 128. The housing can have a longitudinally oriented capstan 114 such as a cylinder shaft or drum about which a length of rope or line is wound. The housing 112 has a section that allows a plunger 128 to be inserted within the housing 112 and be longitudinally operated (depressed) 157 against a resistance device or biasing means (not illustrated). The resistance device may be a spring or other device that would return the plunger to a first position after being operated to a second position. The distance between the top portion of the plunger 128 and the housing 112 can be a first distance 159A, while in a depressed state the distance between the top portion of the plunger 128 and the housing 112 is reduced to a second distance 159B. The securing button 136 can be used to secure the plunger 128 and/or housing 112 with a protective sleeve and/or vented sleeve. With the housing 112 and the plunger 128 at a first distance 159A the aperture 154 and a narrowing tapered slot 160 having a generally teardrop shape, are not aligned. The slot tapers from an enlarged end (seen in FIG. 10B) that loosely receives the rope to a narrow or gripping end (see in FIG. 10A) that frictionally grips the rope. A rope passing through the open end of the slot moves freely through the slot. However, the rope is tightly gripped and restrained by the narrower end of the slot. When the housing 112 and the plunger 128 are at a second distance 159B apart, the aperture 154 and the narrowing tapered slot 160 are aligned to allow a rope to pass through them. The rope (not illustrated) may pass through a capstan opening 158, and/or a plunger opening 156. Juxtaposed with the bottom portion of the housing is means for receiving a coupling device 148 for attaching a connection, such as, but not limited to a strap, supporting rope, hook, loop, carabiner or the like for engaging and supporting a load suspension structure or harness.

Figure 11:
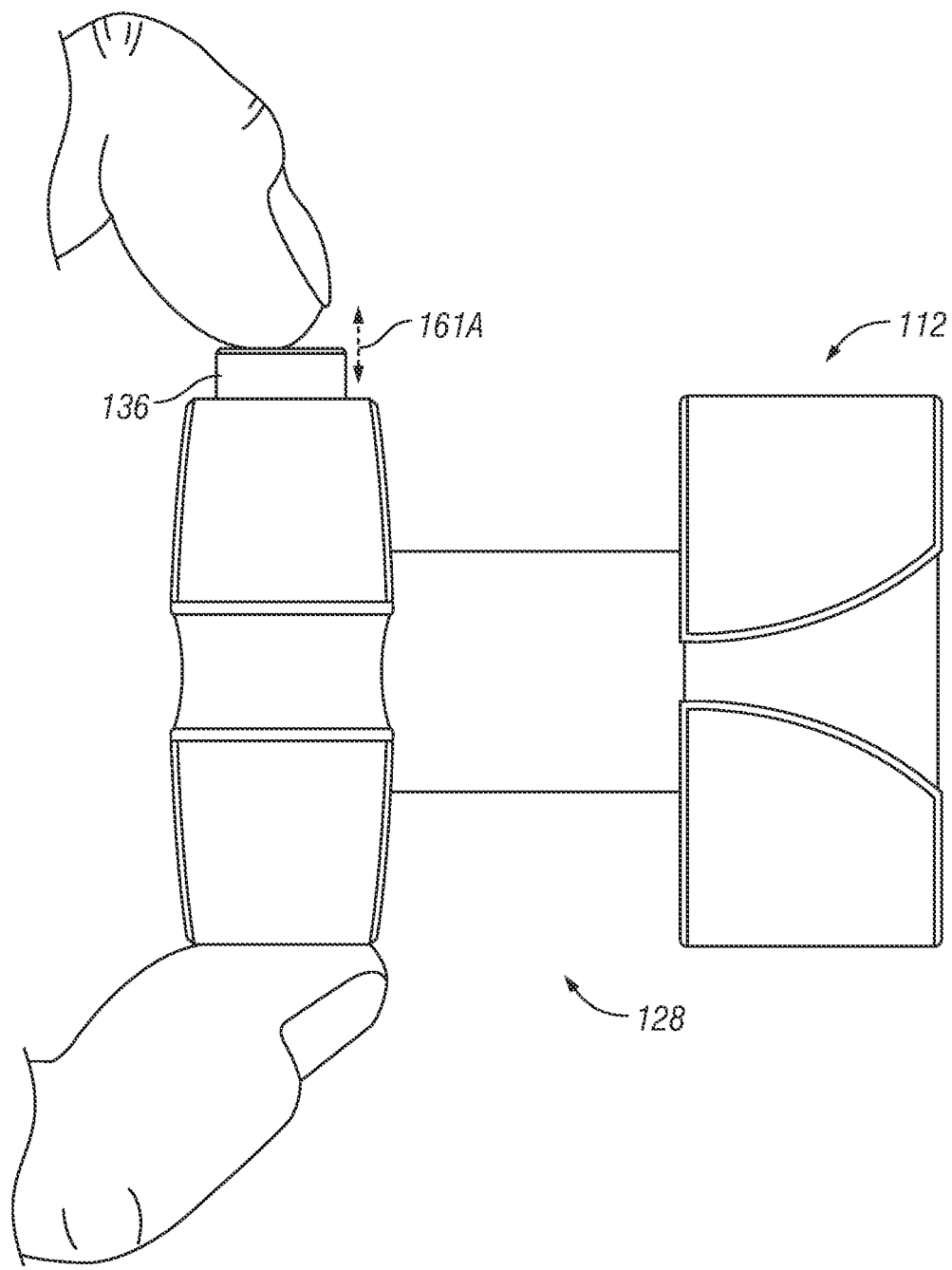
FIG. 11 is a side view of an embodiment of a visible portion of a plunger after insertion into a housing illustrating securing button operation.

FIG. 11 is a side view of an embodiment of a visible portion of a plunger after insertion into a housing illustrating the operation of the securing button 136. The securing button 136 can be used to secure the plunger 128 and/or housing 112 with a protective sleeve and/or vented sleeve. When the securing button 136 is depressed 161A within the plunger 128 it allows for the plunger 128 to be removed from a vented sleeve (not illustrated). In at least one embodiment, when the securing button 136 is depressed, the plunger and/or housing may be removed from the vented sleeve.

Figure 12A:
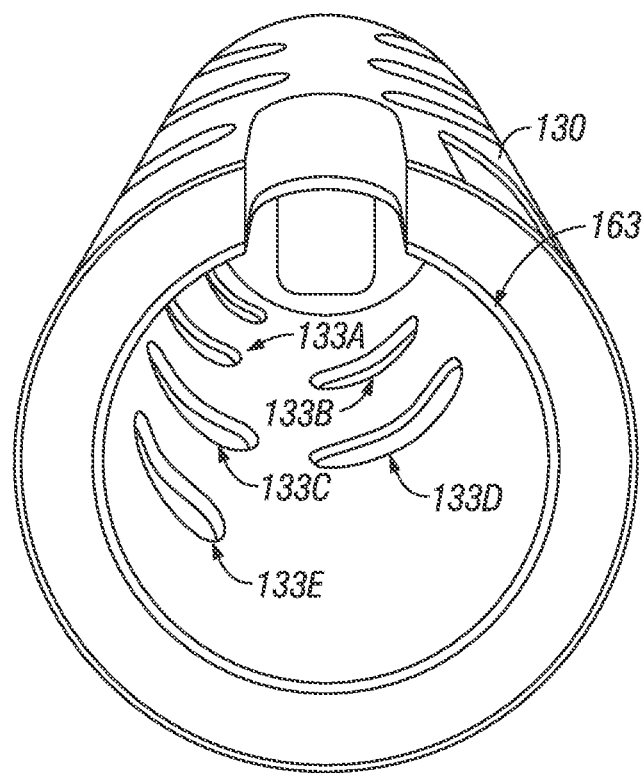
FIGS. 12A and 12B are perspective assembly views of the ends of an embodiment of a vented sleeve and protective sleeve.
Figure 12B:
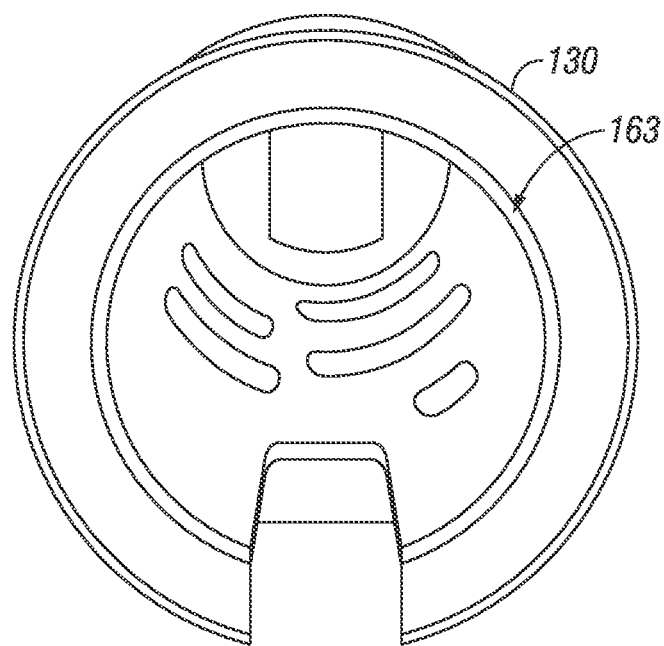

FIGS. 12A and 12B are perspective assembly views of the ends of a vented sleeve 130 and a protective sleeve 163. The protective sleeve 163 can be housed within the vented sleeve 130. In at least one example, the protective sleeve 163 can be secured to the vented sleeve 130 via a pin that passes through a securing aperture (not illustrated). The protective sleeve 163 can have vent(s) that align with the vent(s) 133A, 133B, 133C, and/or 133D of the vented sleeve 130.

Figure 13:
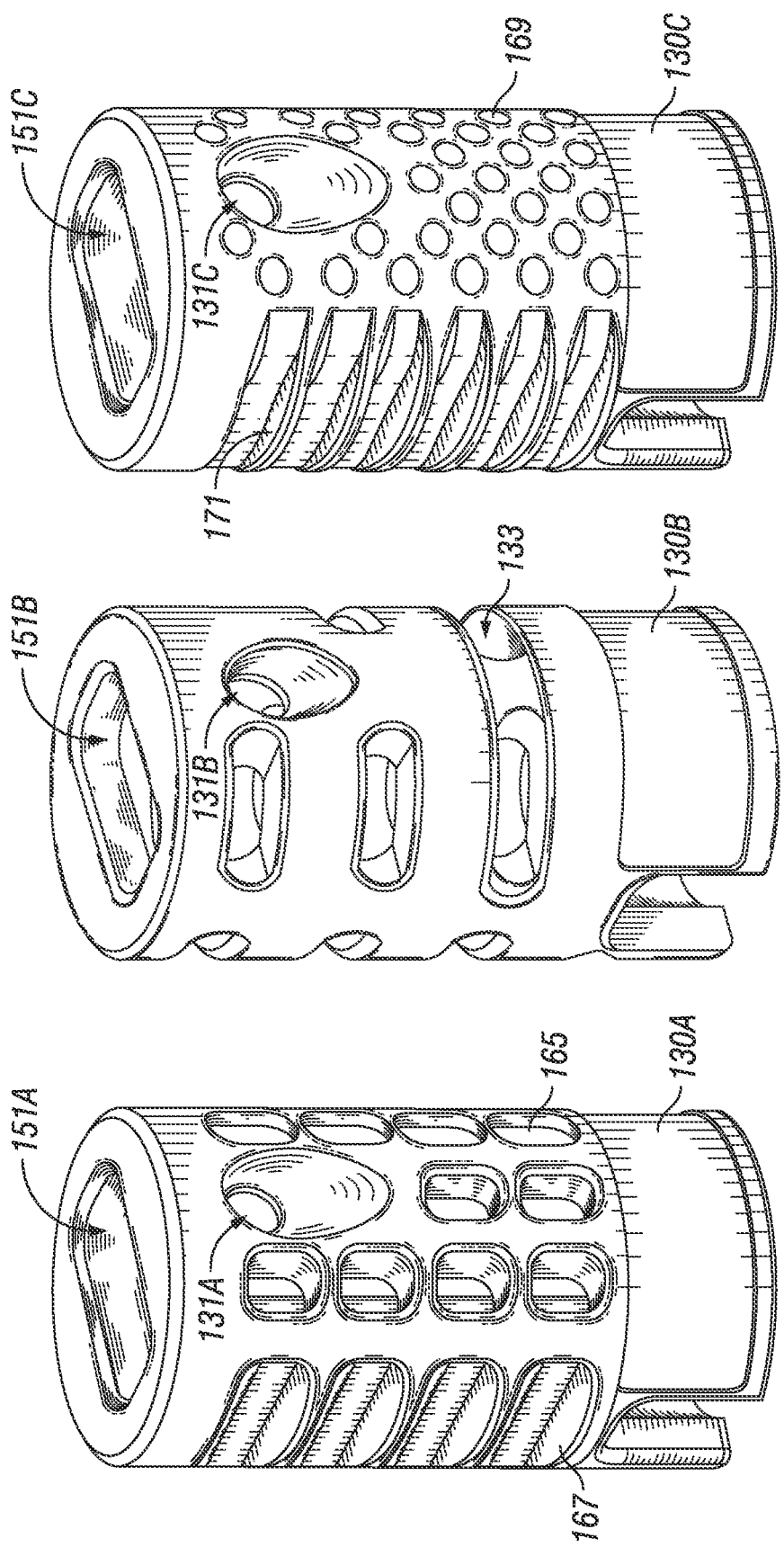
FIG. 13 is a perspective view of various embodiments of vented sleeves with alternative vent dimensions and shapes.

FIG. 13 a perspective view of various embodiments of vented sleeves with alternative vent dimensions and shapes. The first vented sleeve 130A can have a substantially square vent 165 in combination with a substantially rectangular vent 167. The second vented sleeve 130B can have substantially oval or rectangular vent(s) 133. The third vented sleeve 130C can have substantially round vent(s) 169 in combination with a substantially rectangular or oval vent(s) 171. Each of the vented sleeves 130A, 130B, and 130C can have a securing button aperture 131A, 131B, and/or 131C, as well as a rope aperture 151A, 151B, and/or 151C. The vented sleeve in at least one example is utilized to provide insulation from the movement of a rope and/or safety to a user from heat built up from friction. The insulation would prevent excess heat from building up at a user's hands during a descent. The vents in the vented sleeve and/or the protective sleeve allow for air flow through a descent controller, and in particular to the capstan where the rope is coiled and creates friction during a descent. Safety is also increased with the vented sleeve and/or protective sleeve as both are vented to allow air flow to a rope, but also prevent a user from directly contacting the rope during a descent. Accordingly, the vents of the vented sleeve and/or protective sleeve, can be sized and/or shaped in any manner that allows for air flow through the area the rope traverses in a manner to cool the rope during a descent. The vented sleeve and/or protective sleeve, may also have additional sleeves placed and/or configured in a similar manner with similar venting to allow for additional insulation and/or safety of a user.

Alternatively, for lowering an unconscious person or other load along a rope from an elevated position to a lowered position, the load can be secured to the loop end of the rope and the descent controller secured to a fixed mounting support by attaching the strap hereto. An operator at the position of the fixed descent controller can reach the sleeve to actuate the controller to control the descent of the load in the harness. The free end of the rope feeds through the controller as the load descends.

A further alternative use of a descent controller embodying the present disclosure is for controlling the descent of workstations, such as a bosun's chair, while the rider is working on a vertical surface. The user secures the descent controller to the bosun's chair and descends to a working position. At the working position the sleeve is released, thereby stopping the descent, and enabling the user to perform a task at the working position. When the task at that location is finished, the user can descend to a lower position and continue the work. The descent is controlled by actuating the sleeve of the descent controller to provide for a controlled descent. For additional safety, the user also conventionally employs a separate, secured safety rope (not shown) to prevent accidental descent or catch the user and prevent a fall.

The foregoing descent controller provides a user controllable means for a person located above the ground or floor to descend thereto on a rope. Applications include, but are not limited to, egress from overhead crane cabs, forklift or stock-picker cabs, and the buckets on high-lift utility vehicles. In addition, the device may be used for the evacuation of buildings, bridges, structures, platforms, ships, or aircraft where the descent distance is sufficient to cause injury if the user jumps without a control device. Another application is for the rescue of persons trapped in a building by fire, stranded on a ledge or a mountain, or in similar hazardous situations. Police special weapons teams and armed forces personnel can use the device effectively for controlled descent from buildings, ledges, mountains, aircraft and other elevated positions.

The present disclosure finds particular but not necessarily exclusive utility in safety escape systems. Such an escape system includes a descent controller in association with a safety rope and a supporting harness such as, for example, a harness of the type disclosed and claimed in U.S. Pat. No. 5,070,692, issued Dec. 10, 1991. At one end, the rope is provided with a loop or other device to enable the rope to be secured at an elevated position. The free end of the rope is housed in a container. The rope container, descent controller, and harness are packaged in a kit containing appropriate instructions. In use, such as for a descent from a scaffold or lift truck platform, the kit is opened and the loop end of the rope is secured to a fixture at the elevated location. The rope packet is lowered so that the rope extends from the fixture to the ground. The user dons the harness, steps off of the platform and actuates the descent controller so that the descent controller and user descend along the rope to the ground.

As objects and buildings increase in height, there are specific needs for safety or emergency devices to allow for rescue or safety during operations at heights that may in some examples be considered extreme. For example, the control or gear box of a wind generator is now about six hundred (600) feet off the ground. If a person working on the wind generator falls, or needs to descend from the control or gear box, a traditional descender system utilizing rope will cause significant heat and friction that can result in rope burns, or in an extreme case rope failure.

FIGS. 14A-15F illustrate an alternative design of the present disclosure capable of reducing heat during long descents. In at least one embodiment, there are three sleeves utilized to dissipate heat throughout the descender device. For example, one way that heat can be dissipated is by utilizing heat sinks or other mechanisms that allow for heat to be drawn away from the heat producing source. In at least one example, the present disclosure accomplishes this through the use of an inner sleeve, a middle sleeve, and an outer sleeve. The inner sleeve can be made of metal to absorb or pull heat away from the descender device, a plastic rigid middle sleeve for dissipating heat drawn into the inner sleeve, and an outer sleeve of a deformable plastic to provide further insulation of a user's hands from the middle sleeve in areas where heat is likely to be generated.

The sleeves can all be vented with a plurality of openings that allow air to move through and to the internal void of the sleeves that is configured to receive the descender device. A descender device can interact directly or indirectly with the sleeves to reduce the heat generated by the friction and other elements during movement of the rope through the descender device. In some examples, there may be a gap between the descender device and the inner sleeve, while in other examples, the descender device and the inner sleeve may be touching. This gap can be defined as any amount of space between the descender device and the inner sleeve that is substantial enough to be measured and would not exceed the distance between the inner circumference of the inner sleeve and the outer circumference of the outer sleeve.

Figure 14A:
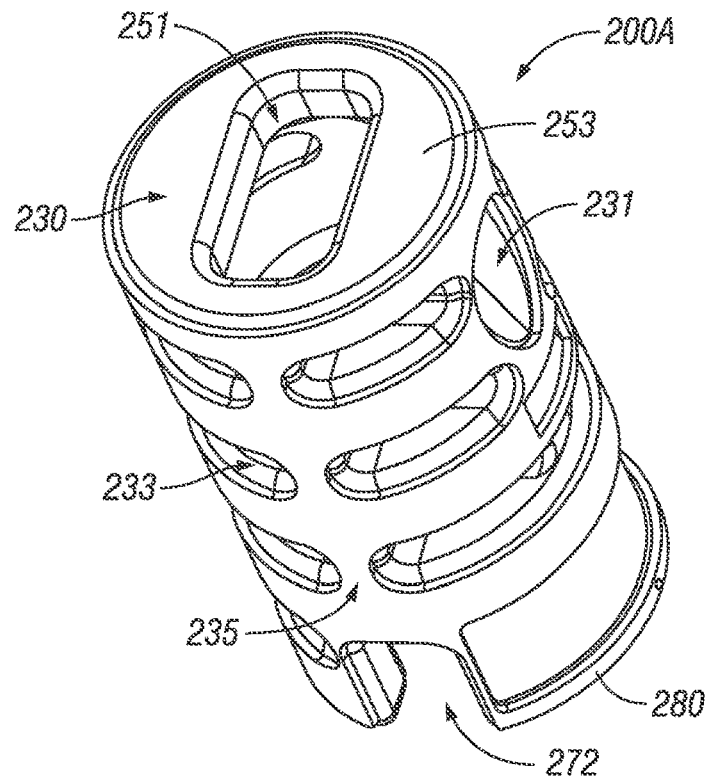
FIG. 14A is a perspective view illustration of a multi-sleeve combination for a descent controller.

FIG. 14A is a perspective view illustration of a multi-sleeve combination 200A for a descent controller. The multi-sleeve combination can include a vented sleeve 230, which in at least one embodiment, can be referenced as a middle or intermediate sleeve 230. The vented sleeve 230 can be manufactured as a non-pliable plastic-based material. Examples of a non-pliable plastic or composite-based material are acrylonitrile butadiene styrene (ABS), polylactic acid (PLA), and/or nylon. It would be understood that other materials of similar or like compositions may be substituted and/or added to the composition without departing from the spirit of the present disclosure. Additives may include strengtheners or other materials to increase the supportive or thermal structure of the material.

The vented sleeve 230 can include at least one button aperture 231 to allow for a user (not illustrated) to access a portion of a descent controller (not illustrated). The at least one button aperture 231 can include an aperture passing through one or more sleeves of the multi-sleeve combination 200A. In at least one example, the at least one button aperture 231 may have an engagement surface that allows for a concave design from the outer surface to the inner surface of one or more of the sleeves of the multi-sleeve combination 200A. The concave design may also include an oval or circular design on the outer surface and a smaller oval or circular design on the inner surface of one or more sleeves of the multi-sleeve design.

The multi-sleeve combination 200A can have one or more vents 233 that allow the movement of air to pass to or from the descent controller (not illustrated). The shapes and/or sizes of the vents can be of any number of configurations, shapes, or designs. For example, ovals are illustrated, but could be replaced with circles, squares, rectangles, triangles, or other polygon shape. Similarly, there can be any number of the one or more vents 233 for the multi-sleeve combination 200A. In at least one example, there can be four columns of vents, with each having at least three vents, for a total of at least 12 vents. While in other examples, there may be as few as three vents, or as many as may be desirable.

The one or more vents 233 can be supported by one or more separation support(s) 235. The separation support(s) 235 can allow for the one or more vents 233 to have various shapes and/or configurations. In some examples, the separation supports 235 may have varying thicknesses to allow for reduced weight of the multi-sleeve combination 200A. Yet, in other examples, the separation supports 235 can have various widths to provide support between two or more vents 233. In at least one embodiment, the separation supports 235 may also allow for the vertical separation of one or more vents 233 along the sidewall surface of one or more sleeves of the multi-sleeve combination 200A.

The top 253 of the vented sleeve 230, in at least one embodiment, can include a rope aperture 251 that allows a rope or other deployment device to pass through the vented sleeve 230 to the descent controller. The top 253 of the vented sleeve 230, in at least one example, can be perpendicular to the side walls through which the one or more vents 233 are placed. In other examples, the top 253 can have a concave or convex surface configuration that allows for the configuration of various shapes and/or design specifications. For example, a convex top may allow for the multi-sleeve combination 200A to fit within a mechanism for rope deployments.

In at least one embodiment, the multi-sleeve combination 200A can include an extending peripheral notch 272 that allows for ropes or other deployment devices to pass through the vented sleeve 230 and/or other sleeves of the multi-sleeve combination. Similarly, the multi-sleeve combination 200A may also have an outer sleeve 280. In at least one example, the outer sleeve 280 is pliable and manufactured utilizing a rubber-based material composition. The outer sleeve 280 may be configured to match the openings, apertures, and/or vents of the multi-sleeve combination 200A.

Figure 14B:
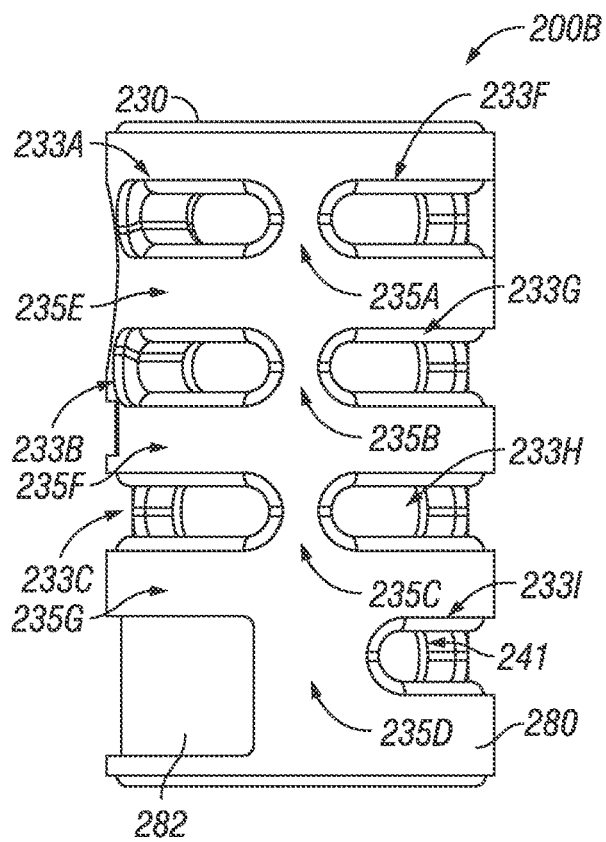
FIG. 14B is a side view illustration of a multi-sleeve combination for a descent controller.

FIG. 14B is a side view illustration of a multi-sleeve combination 200B for a descent controller. In at least one embodiment, the multi-sleeve combination 200B can include an inner or protective sleeve 241, a vented sleeve or middle sleeve 230, and an outer sleeve 280. The inner sleeve 241, in at least one example, is manufactured, formed, and/or constructed from a metallic-based material. Examples of a metallic-based material can include aluminum, steel, titanium, and/or combinations or compositions thereof. The vented sleeve 230 can be manufactured as a non-pliable plastic-based material. Some examples of a non-pliable plastic- or composite-based material are acrylonitrile butadiene styrene (ABS), polylactic acid (PLA), and/or nylon. It would be understood that other materials of similar or like compositions may be substituted and/or added to the composition without departing from the spirit of the present disclosure. Additives may include strengtheners or other materials to increase the supportive or thermal structure of the material. In at least one example, the outer sleeve 280 is pliable and manufactured utilizing a rubber-based material composition.

Each of the sleeves 241, 230, and/or 280 can have a set of apertures and/or openings that allow for the passage of air from outside of the multi-sleeve combination 200B into a central area where a descent controller (not illustrated) is received within the multi-sleeve combination 200B. In at least one embodiment, each of the sleeves 230, 241, and/or 280 have the same openings, apertures, and/or other voids. These openings can be aligned with vents 233A, 233B, 233C, 233F, 233G, 233H, and/or 233I (collectively vents 233).

The vents 233, can be separated by separation support(s) 235A, 235B, 235C, 235D, 235E, 235F, and/or 235G (collectively separation supports 235). These separation supports 235 may include vertical and horizontal support for the vents 233. In at least one examples, separation supports 235A, 235B, 235C, and/or 235D may be utilized as vertical separation supports, while separation supports 235E, 235F, and/or 235G can be utilized as horizontal separation supports. In some examples, the separation supports 235 in a horizontal configuration may be designed to be at least as wide or wider than the vents 233 that are adjacent to the separation supports 235. Additionally, in at least one example, the separation supports 235 in a vertical configuration can be designed to be the same or smaller in width than the vents 233 they are adjacent to.

The vents 233 may vary in length based on positions along the side wall surface of the multi-sleeve combination 200B. For example, vent 233H may be greater in length than vents 233A, 233B, and/or 233I. In other examples, vent 233A may be longer than vents 233B and/or 233F, to allow for increased air flow because of the at least one button aperture (shown in FIG. 14A as the at least one button aperture 231). Similarly, because of the at least one button aperture, vents 233A, 233B, 233F, and/or 233G may be shorter in length to allow for the size of the at least one button aperture.

The multi-sleeve combination 200B may have an advertisement or label surface 282. The advertisement or label surface 282 may allow for printed materials to be added to the surface of the vented sleeve 230 or inner sleeve 241. In other examples, an advertisement or label would be added during manufacturing to the advertising or label surface 282. The outer sleeve 280 would have an opening to allow for the advertising or label surface 282 to be seen.

Figure 14C:
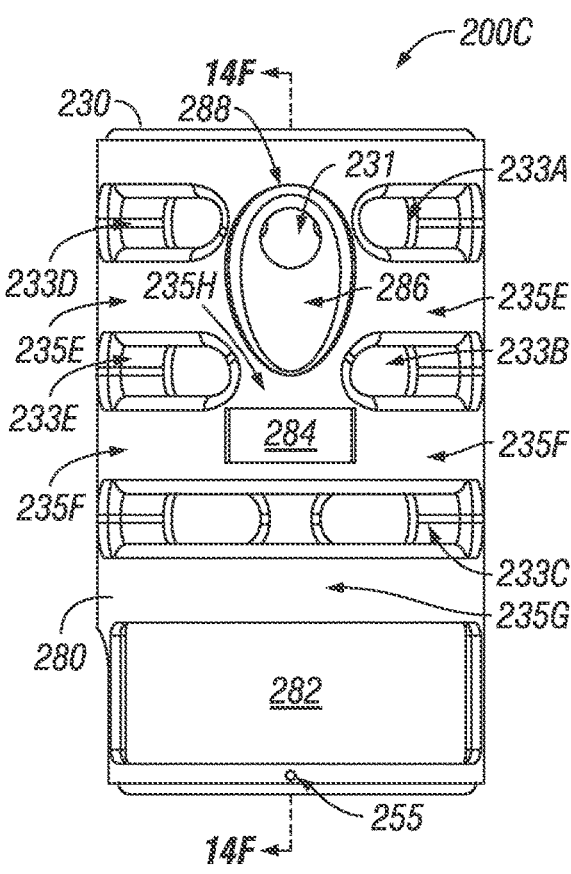
FIG. 14C is a front view illustration of a multi-sleeve combination for a descent controller.

FIG. 14C is a front view illustration of a multi-sleeve combination 200C for a descent controller. The multi-sleeve combination 200C is utilized with a descent controller (not illustrated) to provide a buffer between the rope movements and descent controller, and a user's hand or other body parts. One part of the buffer is to prevent a user from burning their hands, arms, or other body parts due to friction and/or rope movements through and/or around a descent controller. In order to prevent heat from reaching a user's hands, sleeves should be utilized around the descent controller.

In at least one embodiment, the multi-sleeve combination 200C can include a middle or vented sleeve 230 and an outer sleeve 280. Both the vented sleeve 230 and the outer sleeve 280 can have vents 233A, 233B, 233C, 233D, and/or 233E (collectively vents 233) through them that allows for additional air flow to and/or through the descent controller. The vents 233 can be sized and/or shaped to allow for air flow and/or cooling to be maximized for the particular deployment use cases. For example, a long rope deployment, e.g., longer than 600 feet, the vents 233 may need to be larger to allow for increased airflow, which may lead the vented sleeve 230 to be constructed with materials that are stronger even with less material being utilized to form or manufacturer the vented sleeve 230. In these examples, the separation supports 235E, 235F, 235G, and/or 235H (collectively separation supports 235) may be smaller than for multi-sleeve combination 200C utilized for shorter rope or other deployments. In other examples, the separation supports 235 may be sized and/or configured to maximize support while minimizing weight of the multi-sleeve combination 200C. For example, the material utilized to construct the vented sleeve 230 may include plastic based materials, but with the creation of new materials that include strengtheners such as metals, carbon fiber, and/or other materials that allow for light weight and significant strength even with subjected to significant heat.

The vented sleeve 230 can also allow for an at least one button aperture 231 that allows for user engagement or interactivity with the descent controller. The at least one button aperture 231 can allow for a button or other engagement mechanism that is smaller than the diameter of the aperture opening to pass through or allow a user's finger or other limb to pass through and engage with the descent controller. The at least one button aperture 231, can have an aperture surface 286 that allow for a slope or other surface characteristics that allow a user to more easily engage with the descent controller. From the outer edge 288 to the at least one button aperture 231, the aperture surface 286 can be interfaced between these two points and/or edges. In some examples the outer edge may have a lip or other depression along the surface of the side wall of the vented sleeve 230. In at least one example, the outer sleeve 280 may have a corresponding opening or aperture that is sized equal to or greater than the diameter of the outer edge 288.

In some examples, the side wall of the vented sleeve 230 can also have a labeling surface 284 that allows for a manufacturer or other logos or designs to be placed and seen by users. Similarly, there may also be an advertising surface 282 that allows for advertisements or other information to be placed or provided to a user. These surfaces 282 and 284 may be visible through the outer sleeve 280, or the outer sleeve 280 may have additional apertures or openings that allow for the surfaces 282 and 284 to be visible to a user. The inner sleeve (not shown), vented sleeve 230, and/or outer sleeve 280 may be coupled together through the use of a securing pin that can pass through the securing aperture 255. The securing pin can be utilized to ensure the various sleeves do not shift between the preferred positions during use, storage, and/or travel. If the sleeves shift for any reason the air flow to and/or around the descent controller can be restricted and result in overheating.

Figure 14D:
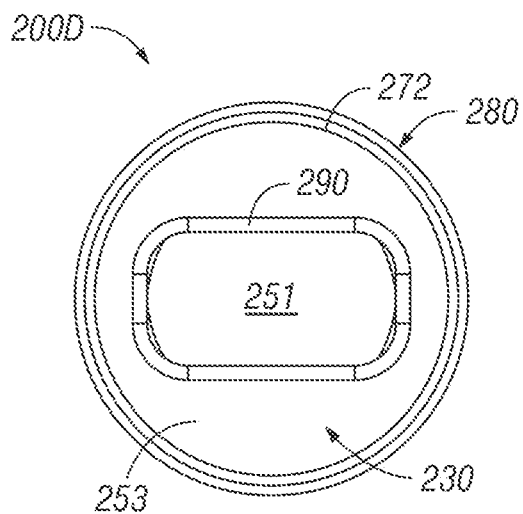
FIG. 14D is a top view illustration of a multi-sleeve combination for a descent controller.

FIG. 14D is a top view illustration of a multi-sleeve combination 200D for a descent controller. The top view of the multi-sleeve combination 200D shows the rope aperture 251, through which the rope can be inserted through the various sleeves of the multi-sleeve combination 200D, and in particular, creates an aperture in the top 253 of the vented sleeve 230. The rope aperture 251 can include an aperture lip or edge 290 having a beveled and/or rounded edge to prevent damage and minimize wear of the rope as it slides along the edge 290. The vented sleeve lip 272 can be rounded and/or beveled to prevent a user from gripping a sharp or contoured edge during use, storage, or travel. The outer sleeve 280 can be seen as a wrapping that goes around the entire vented sleeve 230. In some examples, the outer sleeve 280 may only partially enclose the vented sleeve 230, for example being present for 90, 180, and/or 270 degrees of the vented sleeve's circumference.

Figure 14E:
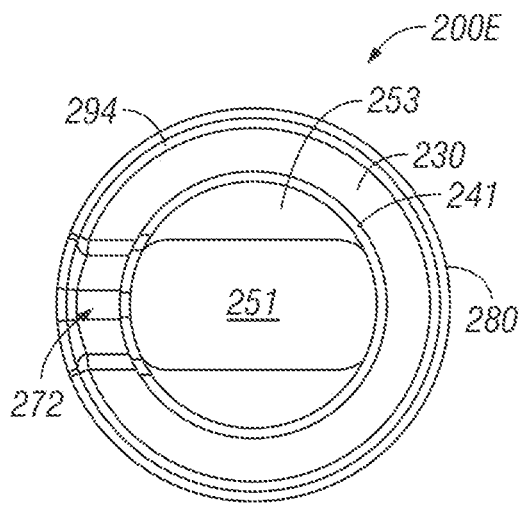
FIG. 14E is a bottom view illustration of a multi-sleeve combination for a descent controller.

FIG. 14E is a bottom view illustration of a multi-sleeve combination 200E for a descent controller. The bottom view illustration of the multi-sleeve combination 200E shows the inner sleeve 241, the vented sleeve 230, and/or outer sleeve 280. The vented sleeve 230, in at least one embodiment, is the thickest of the three sleeves illustrated. In at least one example, the vented sleeve 230 may have a sleeve lip 294 can be rounded or beveled to prevent harm to a user or damage to a rope during deployment. The rope aperture 251 can pass through the top 253 of the vented sleeve 230. The side wall of the vented sleeve 230 can include an extending peripheral notch 272 that allows for ropes, and/or other deployment components to be provided into the area surrounded by the multi-sleeve combination 200E.

Figure 14F:
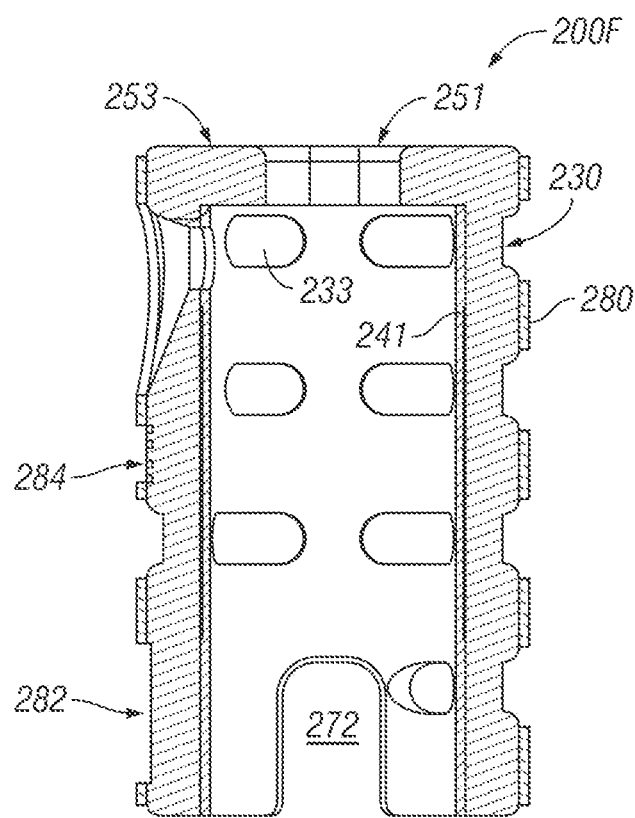
FIG. 14F is a cut-away view illustration of a multi-sleeve combination for a descent controller.

FIG. 14F is a cut-away view illustration of a multi-sleeve combination 200F for a descent controller. The cut-away view of the multi-sleeve combination 200F shows the positioning and linking of the multi-sleeve combination 200F. In particular, the inner sleeve 241 interfaces with the vented sleeve 230. In at least one example, there can be an air gap between the inner sleeve 241 and the vented sleeve 230.

The inner sleeve 241 can have openings that correspond to the openings 233 through the vented sleeve 230. Additionally, in at least one example, the inner sleeve may have additional openings that allow for heat to transfer from the descent controller to the vented sleeve 230. For example, the vented sleeve 230 and/or inner sleeve 241 may be manufactured from a material that is capable of absorbing and/or transferring heat away from one surface to another. Another example of heat transfer points could be the two surfaces 282 and 284 that can also be utilized for labeling, advertising, and/or logos. These surfaces can be made with a depth that allows for specific heat transfer characteristics. The rope aperture 251 along the top 253 of the vented sleeve 230 allows for ropes or other devices or mechanisms to pass through. It should be noted that while the inner sleeve 241 is shown without a top, it could have one as part of the design if chosen without departing from the spirit of the present disclosure.

In at least one embodiment, the multi-sleeve combination 200F can include a peripheral notch 272 that allows for ropes or other deployment devices to pass through the vented sleeve 230 and/or other sleeves of the multi-sleeve combination. Similarly, the multi-sleeve combination 200F may also have an outer sleeve 280. In at least one example, the outer sleeve 280 is pliable and manufactured utilizing a rubber-based material composition. The outer sleeve 280 may be configured to match the openings, apertures, and/or vents of the multi-sleeve combination 200F.

Figure 15A:
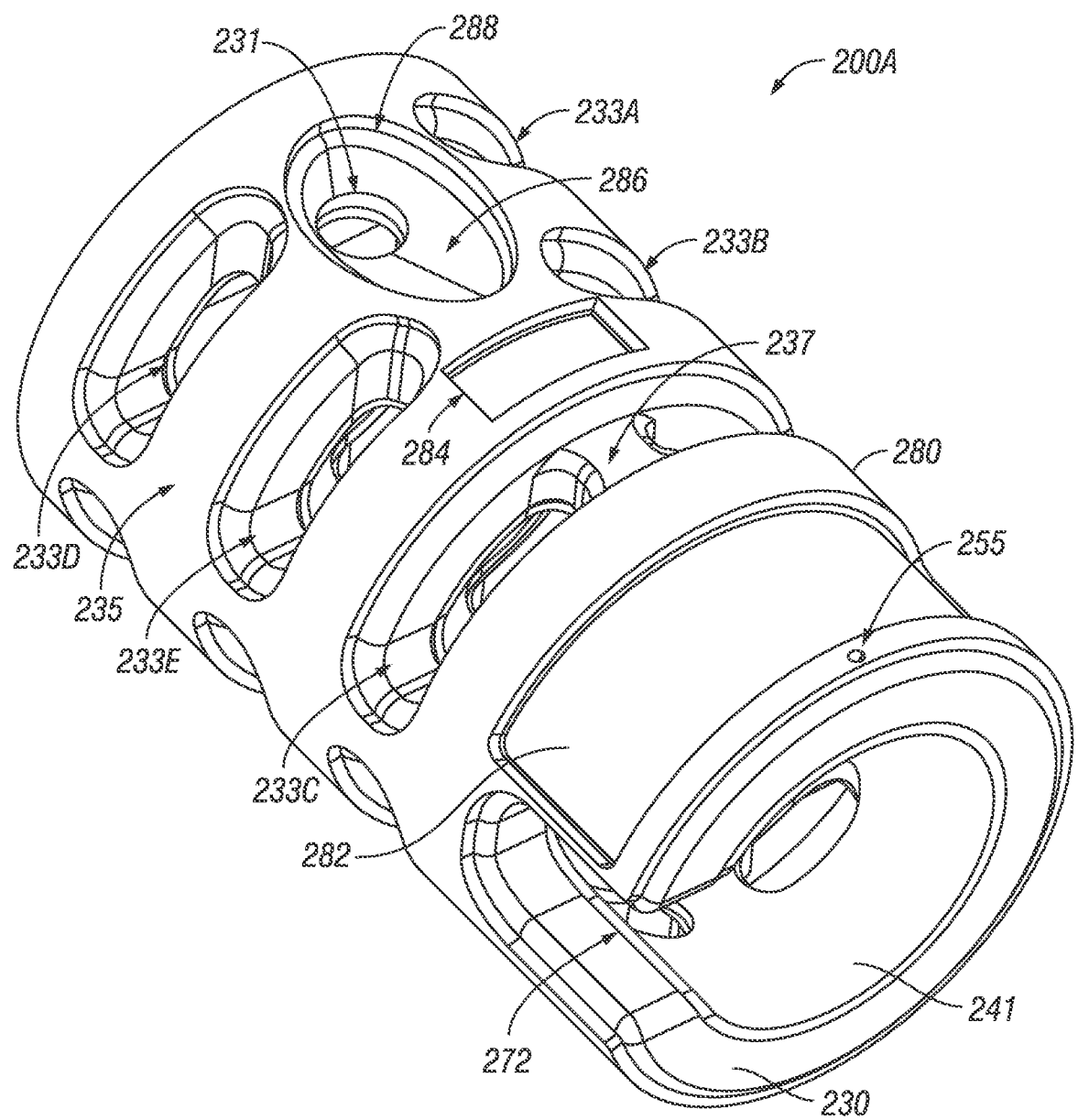
FIG. 15A is a perspective view illustration of a multi-sleeve combination for a descent controller.

FIG. 15A is a perspective view illustration of a multi-sleeve combination 200A for a descent controller. The multi-sleeve combination can include a vented sleeve 230, which in at least one embodiment, can be referenced as a middle or intermediate sleeve 230. The vented sleeve 230 can be manufactured as a non-pliable plastic-based material. Some examples of a non-pliable plastic or composite based material are acrylonitrile butadiene styrene (ABS), polylactic acid (PLA), and/or nylon. It would be understood that other materials of similar or like compositions may be substituted and/or added to the composition without departing from the spirit of the present disclosure. Additives may include strengtheners or other materials to increase the supportive or thermal structure of the material. For example, the inner sleeve 241 may have a thermal property that causes heat to transfer to a thermally conductive plastic of the vented sleeve 230, which can then be thermally conductive to the outer sleeve 280, which has a rubber base for manufacturing. The rubber-based material may include silicone or other similar materials.

The vented sleeve 230 can include at least one button aperture 231 to allow for a user to access a portion of a descent controller (not illustrated). The at least one button aperture 231 can include an aperture passing through one or more sleeves of the multi-sleeve combination 200A. In at least one example, the at least one button aperture 231 may have an engagement surface that allows for a concave design from the outer surface to the inner surface of one or more of the sleeves of the multi-sleeve combination 200A. The concave design may also include an oval or circular design on the outer surface, and a smaller oval or circular design on the inner surface of one or more sleeves of the multi-sleeve design. The at least one button aperture 231, can have an aperture surface 286 that is sloped or can have other surface characteristics that allow a user to more easily engage with the descent controller. From the outer edge 288 to the at least one button aperture 231, the aperture surface 286 can be interfaced between these two points and/or edges. In some examples the outer edge 288 may have a lip or other depression along the surface of the side wall of the vented sleeve 230. In at least one example, the outer sleeve 280 may have a corresponding opening or aperture that is sized equal to or greater than the diameter of the outer edge 288.

The multi-sleeve combination 200A can have one or more vents 233 that allow for air to pass to or from the descent controller (not illustrated). The shapes and/or sizes of the vents can be of any number of configurations, shapes, or designs. For example, ovals are illustrated, however, circles, squares, rectangles, triangles, or other polygon shape as viewed from a side view of the multi-sleeve combination 200A. Similarly, there can be any number of the one or more vents 233 for the multi-sleeve combination 200A. In at least one example, there can be four columns of vents, with each having at least three vents, for a total of at least 12 vents. In other examples, there may be as few as three vents or as many as desired but no more than 200 vents. These openings can be aligned with vents 233A, 233B, and/or 233C (collectively vents 233).

The vents 233 may vary in length based on positions along the side wall surface of the multi-sleeve combination 200A. For example, vent 233C may be greater in length than vents 233A, and/or 233B. Similarly, because of the at least one button aperture, vents 233A, and/or 233B may be shorter in length to allow for the size of the at least one button aperture. The multi-sleeve combination 200A may have an advertisement or label surface 282. The advertisement or label surface 282 may allow for printed materials to be added to the surface of the vented sleeve 230 or inner sleeve 241. In other examples, an advertisement or label can be added during manufacturing to the advertising or label surface 282. The outer sleeve 280 can have an opening over the advertising or label surface 282.

In some examples, the side wall of the vented sleeve 230 can also have a labeling surface 284 that allows for logos or designs to be placed on the sleeve. Similarly, there may also be an advertising surface 282 that allows for advertisements or other information to be placed or provided to a user. These surfaces 282 and 284 may be visible through the outer sleeve 280, or the outer sleeve 280 may have additional apertures or openings over the surfaces 282 and 284. The inner sleeve (not shown), vented sleeve 230, and/or outer sleeve 280 may be coupled together through the use of a securing pin that can pass through the securing aperture 255. The securing pin can be utilized to ensure the various sleeves do not shift between the preferred positions during use, storage, and/or travel. If the sleeves shift for any reason, the air flow to and/or around the descent controller can be restricted and result in overheating.

The one or more vents 233 can be supported by one or more separation support(s) 235. The separation support(s) 235 can allow for the one or more vents 233 to have various shapes and/or configurations. In some examples, the separation supports 235 may have varying thicknesses to allow for reduced weight of the multi-sleeve combination 200A. Yet, in other examples, the separation supports 235 can have various widths to provide support between two or more vents 233. In at least one embodiment, the separation supports 235 may also allow for the vertical separation of one or more vents 233 along the sidewall surface of one or more sleeves of the multi-sleeve combination 200A.

In at least one example, there may also be partial separation support(s) 237. The partial separation support(s) 237 can have a depth that is less than the separation support 235. In at least one embodiment, the partial separation support(s) 237 is at least one half the depth of the separation support 235, but no more than two-thirds the depth of the separation support 235.

In at least one embodiment, the multi-sleeve combination 200A can include a peripheral notch 272 that allows for ropes or other deployment devices to pass through the vented sleeve 230 and/or other sleeves of the multi-sleeve combination. Similarly, the multi-sleeve combination 200A may also have an outer sleeve 280. In at least one example, the outer sleeve 280 is pliable and manufactured utilized a rubber-based material composition. The outer sleeve 280 may be configured to match the openings, apertures, and/or vents of the multi-sleeve combination 200A.

Figure 15B:
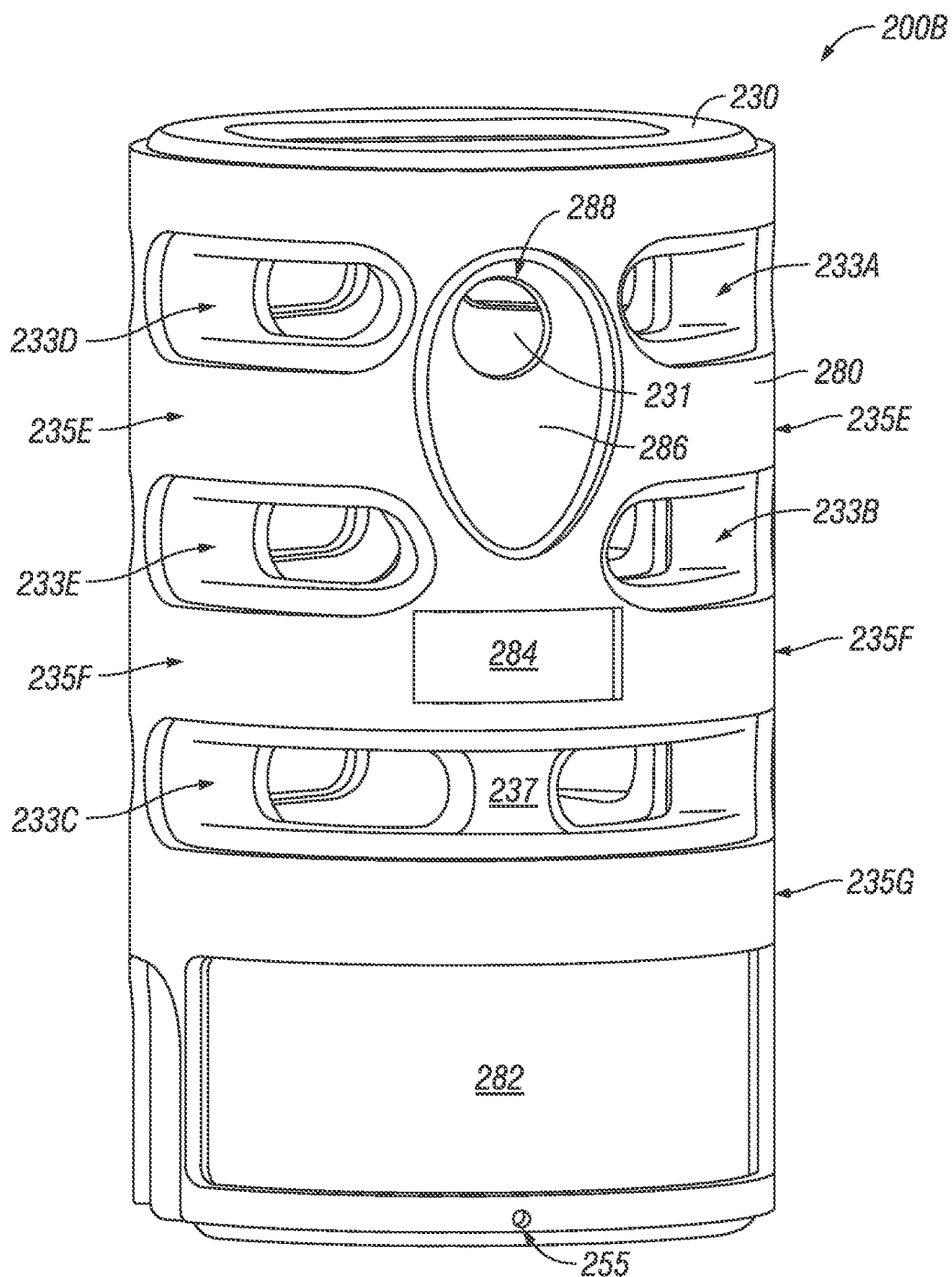
FIG. 15B is a front view illustration of a multi-sleeve combination for a descent controller.

FIG. 15B is a front view illustration of a multi-sleeve combination 200B for a descent controller. The multi-sleeve combination 200B is utilized with a descent controller (not illustrated) to provide a buffer between the rope movements, descent controller, and a user's hand or other body parts. One function of the buffer is to prevent burns to a user's skin from heat generated by friction associated with use of the descent controller. As a user descends using a descent controller, the friction caused by the rope traveling against itself or other materials can generate heat, and this heat can then be transferred to the sleeves and/or escape through the sleeves. The sleeves disclosed herein are utilized to help prevent excessive heat from reaching a user's hands.

In at least one embodiment, the multi-sleeve combination 200B can include a middle or vented sleeve 230 and an outer sleeve 280. Both the vented sleeve 230 and the outer sleeve 280 can have vents 233A, 233B, 233C, 233D, and/or 233E (collectively vents 233) through them that allow for additional air flow to and/or through the descent controller. The vents 233 can be sized and/or shaped to allow for air flow and/or cooling to be maximized for the particular deployment use cases. For example, a long rope deployment, e.g., 600 feet, the vents 233 may need to be larger to allow for increased airflow, which may necessitate construction with materials that are stronger to allow larger vents in the vented sleeve 230. Using stronger materials, the multi-sleeve combination 200B can include separation supports 235E, 235F, and/or 235G (collectively separation supports 235) that may be made smaller. In other examples, the separation supports 235 may be sized and/or configured to maximize support while minimizing weight of the multi-sleeve combination 200B. For example, the material utilized to construct the vented sleeve 230 may include plastic based materials, but can also include strengtheners such as metals, carbon fiber, and/or other materials to allow for a high strength to weight ratio even when subjected to significant heat. In at least one example, there may also be partial separation support(s) 237. The partial separation support(s) 237 can have a depth that is less than the separation support 235. In at least one embodiment, the partial separation support(s) 237 is at least one half the depth of the separation support 235, but no more than two-thirds the depth of the separation support 235.

The vented sleeve 230 can also have at least one button aperture 231 to allow access through the sleeve to a control mechanism on the descent controller. The at least one button aperture 231 can house a button or other engagement mechanism so the user can control the descent controller while the descent controller is housed in the vented sleeve. The at least one button aperture 231, can have an aperture surface 286 with a slope or other surface characteristics that allow a user to more easily engage with the descent controller. From the outer edge 288, to the at least one button aperture 231, the aperture surface 286 can be interfaced between these two points and/or edges. In some examples the outer edge 288 may have a lip or other depression along the surface of the side wall of the vented sleeve 230. In at least one example, the outer sleeve 280 may have a corresponding opening or aperture that is sized equal to or greater than the diameter of the outer edge 288.

In some examples, the side wall of the vented sleeve 230 can also have a labeling surface 284 that allows for placement of logos or designs. Similarly, there may also be an advertising surface 282 for advertisements or other information to be placed or provided to a user. These surfaces 282 and 284 may be visible through the outer sleeve 280, or the outer sleeve 280 may have additional apertures or openings over the surfaces 282 and 284. The inner sleeve (not shown), vented sleeve 230, and/or outer sleeve 280 may be coupled together through the use of a securing pin that can pass through the securing aperture 255. The securing pin can be utilized to ensure the various sleeves do not shift between the preferred positions during use, storage, and/or travel. The sleeves can be secured together by other means as well, such as adhesive and/or spot welding depending on the materials. If the sleeves shift for any reason, the air flow to and/or around the descent controller can be restricted and result in overheating.

Figure 15C:
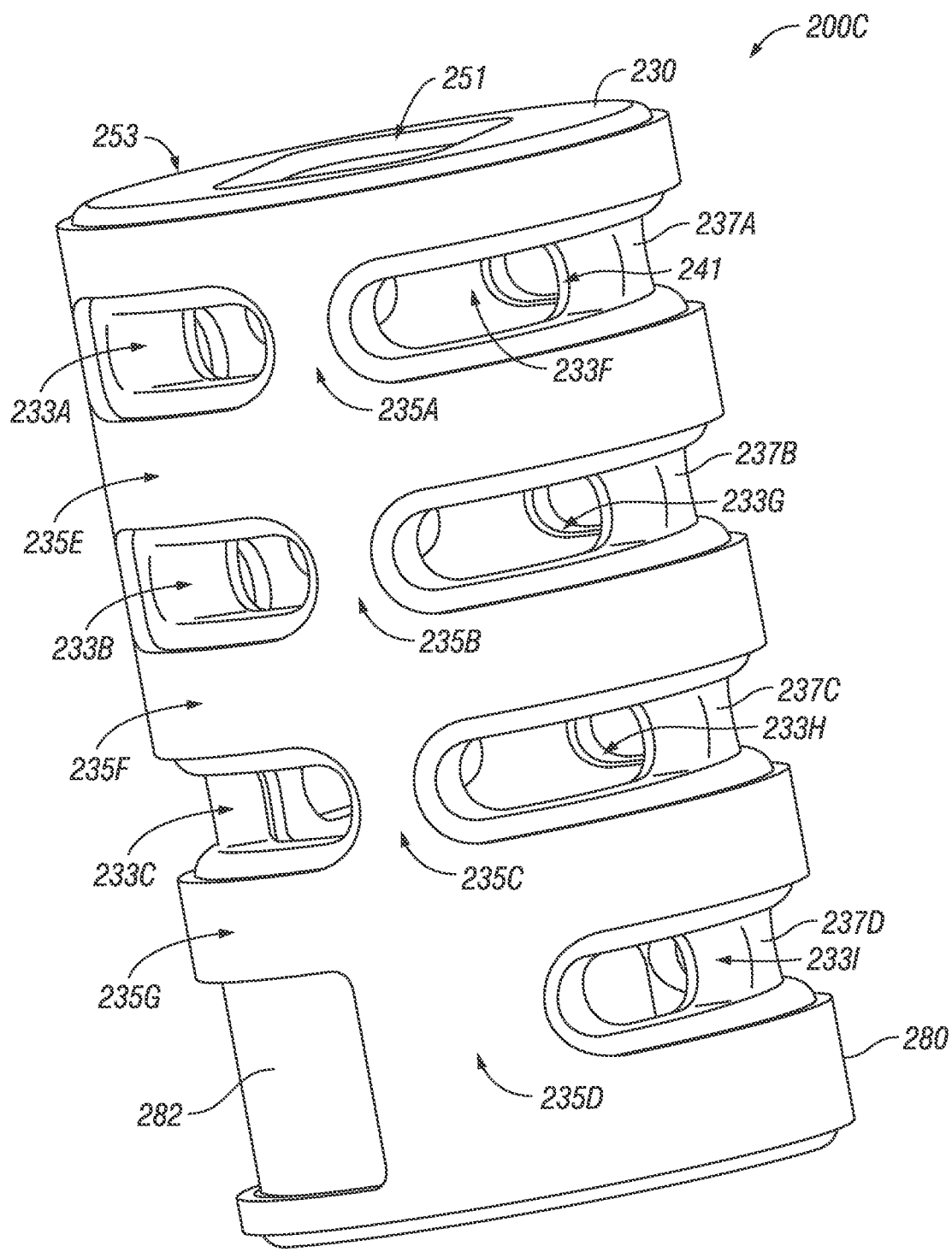
FIG. 15C is a side view illustration of a multi-sleeve combination for a descent controller.

FIG. 15C is a side-view illustration of a multi-sleeve combination 200C for a descent controller. In at least one embodiment, the multi-sleeve combination 200C can include an inner or protective sleeve 241, a vented sleeve or middle sleeve 230, and an outer sleeve 280. The inner sleeve 241, in at least one example, is manufactured, formed, and/or constructed from a metallic based material. Examples of a metallic based material can include aluminum, steel, titanium, and/or combinations or compositions thereof. The vented sleeve 230 can be manufactured as a non-pliable plastic-based material. Some examples of a non-pliable plastic or composite based material can be acrylonitrile butadiene styrene (ABS), polylactic acid (PLA), or nylon. It would be understood that other materials of similar or like compositions, may be substituted, and/or added to the composition without departing from the spirit of the present disclosure. Additives may include strengtheners or other materials to increase the supportive or thermal structure of the material. In at least one example, the outer sleeve 280 is pliable and manufactured utilizing a rubber-based material composition.

Each of the sleeves 241, 230, and/or 280 can have a set of apertures and/or openings that allow for the passage of air from outside of the multi-sleeve combination 200C into a central area where a descent controller (not illustrated) is received within the multi-sleeve combination 200C. In at least one embodiment, each of the sleeves 230, 241, and/or 280 have the same openings, apertures, and/or other voids. These openings can be aligned with vents 233A, 233B, 233C, 233F, 233G, 233H, and/or 233I (collectively vents 233).

The vents 233, can be separated by separation support(s) 235A, 235B, 235C, 235D, 235E, and/or 235F (collectively separation supports 235). These separation supports 235 may include vertical and horizontal support for the vents 233. In at least one example, separation supports 235A, 235B, and/or 235C may be utilized as vertical separation supports, while separation supports 235D, 235E, and/or 235F can be utilized as horizontal separation supports. In some examples, the separation supports 235 in a horizontal configuration may be designed to be at least as wide or wider than the vents 233 that are adjacent to the separation supports 235. Additionally, in at least one example, the separation supports 235 in a vertical configuration can be designed to be the same or smaller in width than the vents 233 they are adjacent to.

The vents 233 may vary in length based on positions along the side wall surface of the multi-sleeve combination 200C. For example, vent 233H may be greater in length than vents 233A, 233B, and/or 233I. In other examples, vent 233A may be longer than vents 233B and/or 233F, allow for increased air flow because of the at least one button aperture (shown in FIG. 14A as the at least one button aperture 231). Similarly, because of the at least one button aperture, vents 233A, 233B, 233F, and/or 233G may be shorter in length to allow for the size of the at least one button aperture.

The multi-sleeve combination 200C may have an advertisement or label surface 282. The advertisement or label surface 282 may allow for printed materials to be added to the surface of the vented sleeve 230 or inner sleeve 241. In other examples, an advertisement or label can be added during manufacturing to the advertising or label surface 282. The outer sleeve 280 can have an opening over the advertising or label surface 282. In at least one example, there may also be partial separation support(s) 237A, 237B, 237C, and/or 237D (collectively partial separation support(s) 237). The partial separation support(s) 237 can have a depth that is less than the separation support 235. In at least one embodiment, the partial separation support(s) 237 is at least one half the depth of the separation support 235, but no more than two-thirds the depth of the separation support 235. The rope aperture 251 can pass through the top 253 of the vented sleeve 230. The side wall of the vented sleeve 230 can include a peripheral notch (not pictured) that allows for ropes, and/or other deployment components to be provided into the area surrounded by the multi-sleeve combination 200C.

Figure 15D:
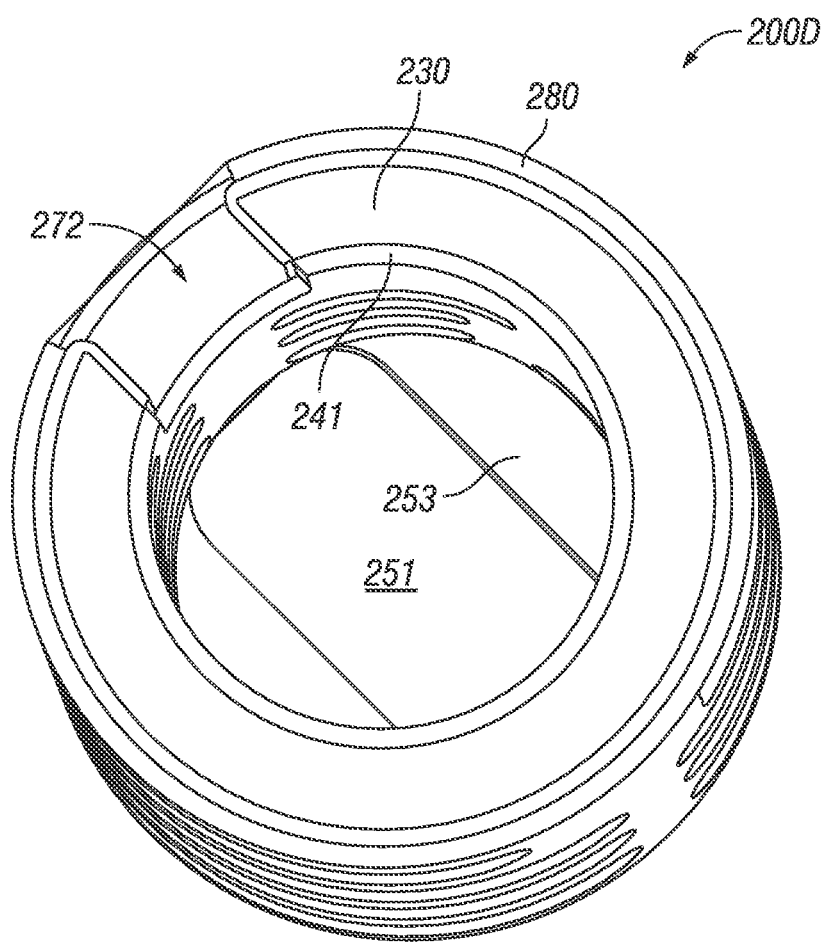
FIG. 15D is a bottom view illustration of a multi-sleeve combination for a descent controller.

FIG. 15D is a bottom view illustration of a multi-sleeve combination 200D for a descent controller. The bottom view illustration of the multi-sleeve combination 200D shows the inner sleeve 241, the vented sleeve 230, and/or outer sleeve 280. The vented sleeve 230 in at least one embodiment, is the thickest of the three sleeves illustrated. The rope aperture 251 can pass through the top 253 of the vented sleeve 230. The side wall of the vented sleeve 230 can include a peripheral notch 272 that allows for ropes, and/or other deployment components to pass into the area surrounded by the multi-sleeve combination 200D.

Figure 15E:
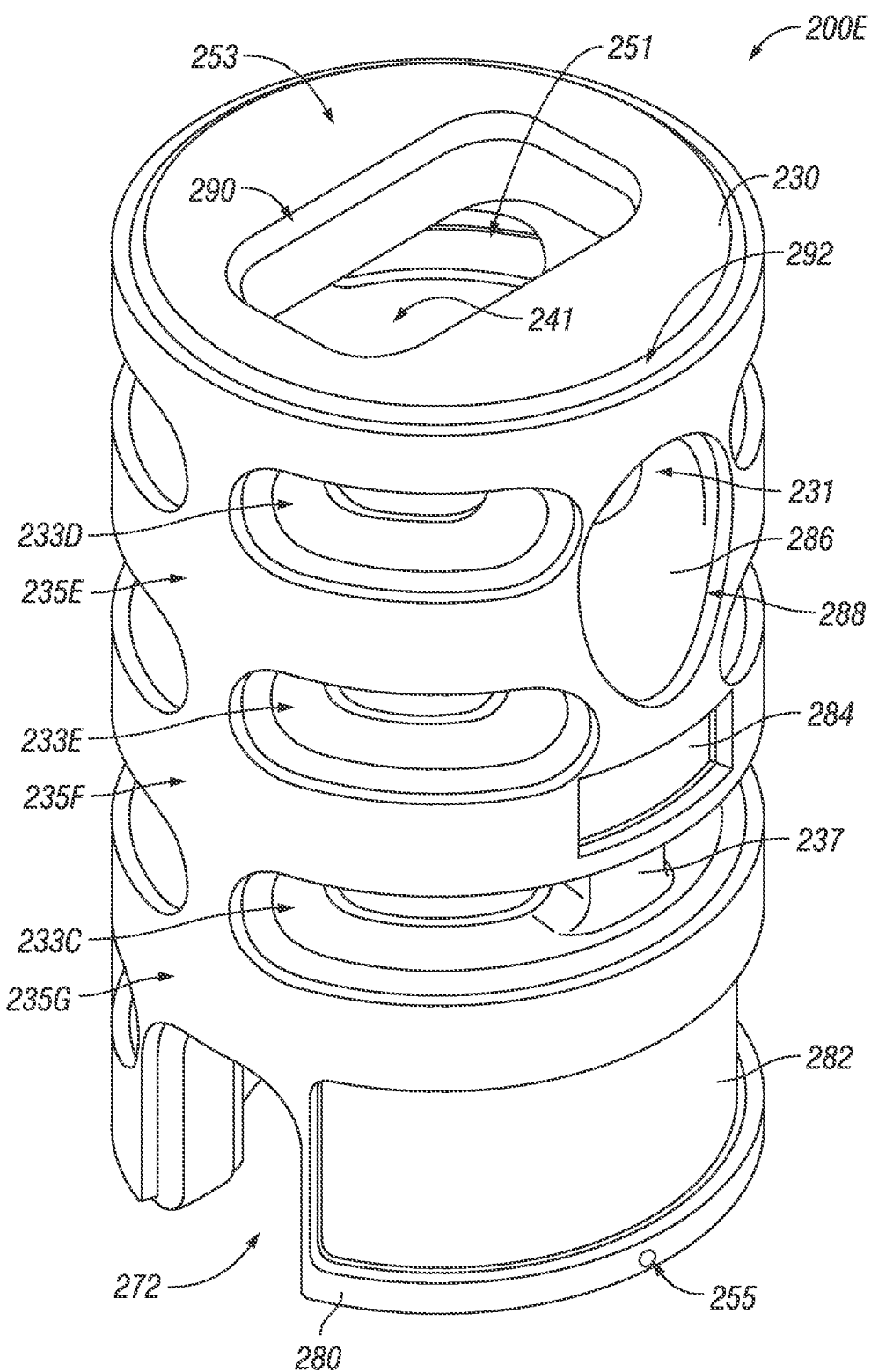
FIG. 15E is a perspective view illustration of a multi-sleeve combination for a descent controller.

FIG. 15E is a perspective view illustration of a multi-sleeve combination 200E for a descent controller. The multi-sleeve combination can include a vented sleeve 230, which in at least one embodiment, can be referenced as a middle or intermediate sleeve 230. The vented sleeve 230 can be manufactured as a non-pliable plastic-based material. Some examples of a non-pliable plastic or composite based material can be acrylonitrile butadiene styrene (ABS), polylactic acid (PLA), or nylon. It would be understood that other materials of similar or like compositions may be substituted and/or added to the composition without departing from the spirit of the present disclosure. Additives may include strengtheners or other materials to increase the supportive or thermal structure of the material.

The vented sleeve 230 can include at least one button aperture 231 to allow for a user to access a portion of a descent controller (not illustrated). The at least one button aperture 231 can include an aperture passing through one or more sleeves of the multi-sleeve combination 200E. In at least one example, the at least one button aperture 231 may have an engagement surface having a concave design from the outer surface to the inner surface of one or more of the sleeves of the multi-sleeve combination 200E. The concave design may also include an oval or circular design on the outer surface and a smaller oval or circular design on the inner surface of one or more sleeves of the multi-sleeve design. The at least one button aperture 231 can have an aperture surface 286 having a slope or other surface characteristics that allow a user to more easily engage with the descent controller. From the outer edge 288 to the at least one button aperture 231, the aperture surface 286 can be interfaced between these two points and/or edges. In some examples the outer edge 288 may have a lip or other depression along the surface of the side wall of the vented sleeve 230. In at least one example, the outer sleeve 280 may have a corresponding opening or aperture that is sized equal to or greater than the diameter of the outer edge 288.

The multi-sleeve combination 200E can have one or more vents 233A, 233B, and/or 233C (collectively vents 233) that allow for air to pass to or from the descent controller (not illustrated). The shapes and/or sizes of the vents can be of any number of configurations, shapes, or designs. For example, ovals are illustrated, however, circles, squares, rectangles, triangles, or other polygon shapes as viewed from a side view of the multi-sleeve combination 200E can be utilized. Similarly, there can be any number of the one or more vents 233 for the multi-sleeve combination 200E. In at least one example, there can be four columns of vents, with each having at least three vents, for a total of at least 12 vents. In other examples, there may be as few as three vents, or as many as desired but no more than 200 vents. These openings can be aligned with vents 233.

The vents 233 may vary in length based on positions along the side wall surface of the multi-sleeve combination 200A. For example, vent 233C may be greater in length than vents 233A, and/or 233B. Similarly, because of the at least one button aperture, vents 233A, and/or 233B may be shorter in length to allow for the size of the at least one button aperture. The multi-sleeve combination 200A may have an advertisement or label surface 282. The advertisement or label surface 282 may allow for printed materials to be added to the surface of the vented sleeve 230 or inner sleeve 241. While in other examples, an advertisement or label can be added during manufacturing to the advertising or label surface 282. The outer sleeve 280 can have an opening over the advertising or label surface 282.

In some examples, the side wall of the vented sleeve 230 can also have a labeling surface 284 that for logos or designs. Similarly, there may also be an advertising surface 282 that allows for advertisements or other information to be placed or provided to a user. These surfaces 282 and 284 may be visible through the outer sleeve 280, or the outer sleeve 280 may have additional apertures or openings over the surfaces 282 and 284. The inner sleeve 241, vented sleeve 230, and/or outer sleeve 280 may be coupled together through the use of a securing pin that can pass through the securing aperture 255. The securing pin can be utilized to ensure the various sleeves do not shift between the preferred positions during use, storage, and/or travel. If the sleeves shift for any reason, the air flow to and/or around the descent controller can be restricted and result in overheating.

The one or more vents 233 can be supported by one or more separation supports 235A, 235B, and/or 235C (collectively separation supports 235). The separation support(s) 235 can be configured such that the one or more vents 233 can have various shapes and/or sizes. In some examples, the separation supports 235 may have varying thicknesses to allow for reduced weight of the multi-sleeve combination 200A. Yet, in other examples, the separation supports 235 can have various widths to provide support between two or more vents 233. In at least one embodiment, the separation supports 235 may also allow for the horizontal separation of one or more vents 233 along the sidewall surface of one or more sleeves of the multi-sleeve combination 200E. In at least one example, there may also be partial separation support(s) 237. The partial separation support(s) 237 can have a depth that is less than the separation support 235. In at least one embodiment, the partial separation support(s) 237 is at least one half the depth of the separation support 235, but no more than two-thirds the depth of the separation support 235.

The top 253 of the vented sleeve 230, in at least one embodiment, can include a rope aperture 251 that allows a rope or other deployment device to pass through the vented sleeve 230 to the descent controller. The top 253 of the vented sleeve 230, in at least one example, can be perpendicular to the side walls through which the one or more vents 233 are placed. In other examples, the top 253 can have a concave or convex surface configuration that allows for the configuration of various shapes and/or design specifications. For example, a convex top may allow for the multi-sleeve combination 200A to fit within a mechanism for rope deployments. The rope aperture 251 can include an aperture lip or edge 290 that can allow for a beveled and/or rounded edge that would not fray or damage the rope if it came in contact with the edge 290. The vented sleeve lip 292 can allow for a rounded and/or beveled edge to prevent a user from gripping a sharp or contoured edge during use, storage, or travel. The outer sleeve 280 can be configured as a wrapping that goes around the entire vented sleeve 230. In some examples, the outer sleeve 280 may only partially enclose the vented sleeve 230, for example being present for 90, 180, and/or 270 degrees of the vented sleeve's circumference.

In at least one embodiment, the multi-sleeve combination 200E can include a peripheral notch 272 that allows for ropes or other deployment devices to pass through the vented sleeve 230 and/or other sleeves of the multi-sleeve combination. Similarly, the multi-sleeve combination 200E may also have an outer sleeve 280. In at least one example, the outer sleeve 280 is pliable and manufactured using a rubber based material composition. The outer sleeve 280 may be configured to match the openings, apertures, and/or vents of the multi-sleeve combination 200E. The inner sleeve (not shown), vented sleeve 230, and/or outer sleeve 280 may be coupled together through the use of a securing pin that can pass through the securing aperture 255. The securing pin can be utilized to ensure the various sleeves do not shift between the preferred positions during use, storage, and/or travel. If the sleeves shift for any reason, the air flow to and/or around the descent controller can be restricted and result in overheating.

Figure 15F:
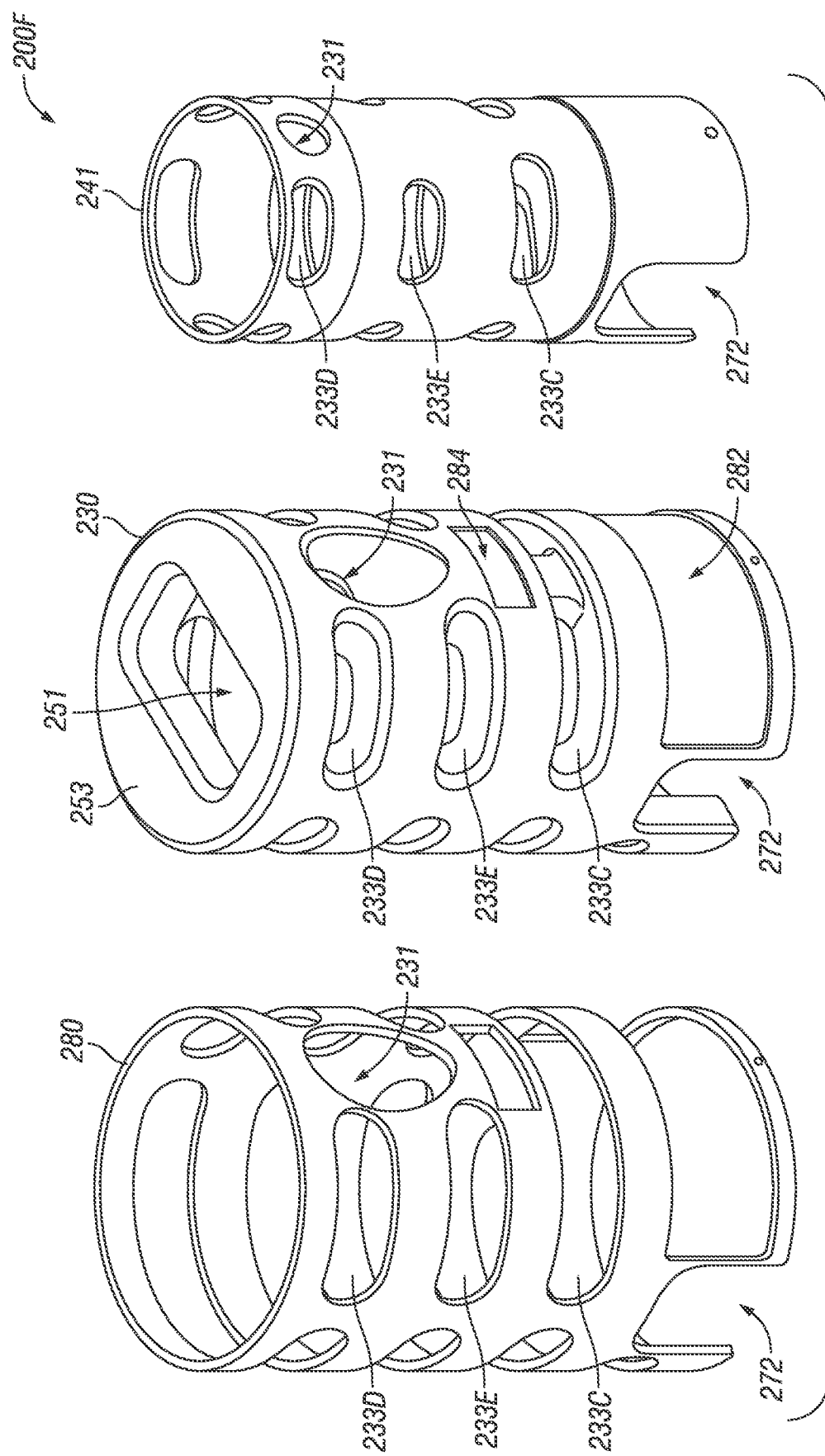
FIG. 15F is a separated view illustration of a multi-sleeve combination for a descent controller.

FIG. 15F is a separated view illustration of a multi-sleeve combination 200F for a descent controller. The inner sleeve 241, vented sleeve 230, and outer sleeve 280 are shown together with the various apertures as described with reference to FIGS. 15A-15E above.

FIGS. 16A-17B are illustrations of vented sleeves formed without additional outer or inner sleeves. For example, to reduce weight for users, a vented sleeve with a set of offset bridges formed along the inner circumference of the vented sleeve can be utilized with the offset bridges acting as the heat sink portions. The set of offset bridges may be formed to align and/or correspond with different desired heat reduction requirements in mind. In at least one example, the set of offsets may include two offset bridges, which can allow for a specific amount of heat to be dissipated from the descender device. In other examples there may be three, four, five, six, seven, eight, or more offset bridges. The number of bridges may be configured for use with different environments. For example, a descender device manufactured for South America may have more offset bridges than one that is manufactured for use in Alaska. These offset bridges may interact or engage with designated portions of the descender device.

Alternatively, the number of contact points with the descender device allows for additional amounts of specific heat to be drawn away from the descender device and into the vented sleeve. The offset bridges can also create an offset space that provides additional airflow in, around, and through the descender device. This can result in a reduction in the heat build-up in and around the descender device. For example, the offset bridges can be defined as extending from the inner circumferential surface of the vented sleeve in any amount of space between the descender device and the inner sleeve that is substantial enough to be measured, and would not exceed an amount that is equal to the amount of distance between the inner circumference of the vented sleeve to the outer circumference of the vented sleeve (for clarity, the offset bridges can be the same width as the circumferential wall or less). In other examples, the offset bridges can be greater in size than the circumferential wall but would likely include additional offset bridges to provide increased stability.

FIG. 16A is a perspective view illustration of a single-sleeve 300A for a descent controller. The single-sleeve 300A can include a vented sleeve 330, which in at least one embodiment, can be referenced as a middle or intermediate sleeve 330. The vented sleeve 330 can be manufactured as a non-pliable plastic-based material. Some examples of a non-pliable plastic or composite based material can be acrylonitrile butadiene styrene (ABS), polylactic acid (PLA), or nylon. It would be understood that other materials of similar or like compositions may be substituted and/or added to the composition without departing from the spirit of the present disclosure. Additives may include strengtheners or other materials to increase the supportive or thermal structure of the material.

The vented sleeve 330 can include at least one button aperture 331 to allow for a user (not illustrated) to access a portion of a descent controller (not illustrated). The at least one button aperture 331 can include an aperture passing through one or more sleeves of the single-sleeve 300A. In at least one example, the at least one button aperture 331 may have an engagement surface having a concave design from the outer surface to the inner surface of one or more of the sleeves of the single-sleeve 300A. The concave design may also include an oval or circular design on the outer surface, and a smaller oval or circular design on the inner surface of one or more sleeves of the multi-sleeve design.

The single-sleeve 300A can allow for one or more vents 333 that allow for air, or the movement of air to pass to or from the descent controller (not illustrated). The shapes and/or sizes of the vents can be of any number of configurations, shapes, or designs. For example, ovals are illustrated as viewed from a side view of the single-sleeve 300A, but circles, squares, rectangles, triangles, or other polygon shape may be used. Similarly, there can be any number of the one or more vents 333 for the single-sleeve 300A. In at least one example, there can be four columns of vents, with each having at least three vents, for a total of at least 12 vents. While in other examples, there may be as few as three vents, or as many as desired but no more than 200 vents.

The one or more vents 333 can be supported by one or more separation support(s) 335. The separation support(s) 335 can allow for the one or more vents 333 to have various shapes and/or configurations. In some examples, the separation supports 335 may have varying thicknesses to allow for reduced weight of the single-sleeve 300A. Yet, in other examples, the separation supports 335 can have various widths to provide support between two or more vents 333. In at least one embodiment, the separation supports 335 may also allow for the vertical separation of one or more vents 333 along the sidewall surface of one or more sleeves of the single-sleeve 300A.

The top 353 of the vented sleeve 330, in at least one embodiment, can include a rope aperture 351 that allows a rope or other deployment device to pass through the vented sleeve 330 to the descent controller. The top 353 of the vented sleeve 330, in at least one example, can be perpendicular to the side walls through which the one or more vents 333 are placed. In other examples, the top 353 can have a concave or convex surface configuration that allows for the configuration of various shapes and/or design specifications. For example, a convex top may allow for the single-sleeve 300A to fit within a mechanism for rope deployments. In at least one embodiment, the single-sleeve 300A can include an extending peripheral notch 372 that allows for ropes or other deployment devices to pass through the vented sleeve 330 and/or other sleeves if utilized.

FIG. 16B is a side view illustration of a single-sleeve 300B for a descent controller. In at least one embodiment, the single-sleeve 300B can include a vented sleeve or middle sleeve 330. The vented sleeve 330 can be manufactured as a non-pliable plastic based material. Some examples of a non-pliable plastic or composite based material can be acrylonitrile butadiene styrene (ABS), polylactic acid (PLA), or nylon. It would be understood that other materials of similar or like compositions may be substituted and/or added to the composition without departing from the spirit of the present disclosure. Additives may include strengtheners or other materials to increase the supportive or thermal structure of the material.

The vented sleeve 330 can have a set of apertures and/or openings that allow for the passage of air from outside of the single-sleeve 300B into a central area where a descent controller (not illustrated) is received within the single-sleeve 300B. These openings can be aligned with vents 333A, 333B, 333C, 333F, 333G, 333H, and/or 333I (collectively vents 333).

The vents 333, can be separated by separation support(s) 335A, 335B, 335C, 335D, 335E, 335F, and/or 335G (collectively separation supports 335). These separation supports 335 may include vertical and horizontal support for the vents 333. In at least one examples, separation supports 335A, 335B, 335C, and/or 335D may be utilized as vertical separation supports, while separation supports 335E, 335F, and/or 335G can be utilized as horizontal separation supports. In some examples, the separation supports 335 in a horizontal configuration may be designed to be at least as wide or wider than the vents 333 that are adjacent to the separation supports 335. Additionally, in at least one example, the separation supports 335 in a vertical configuration can be designed to be the same or smaller in width than the vents 333 they are adjacent to.

The vents 333 may vary in length based on positions along the side wall surface of the multi-sleeve combination 300B. For example, vent 333H may be greater in length than vents 333A, 333B, and/or 333I. In other examples, vent 333A may be longer than vents 333B and/or 333F, to allow for increased air flow because of the at least one button aperture (shown in FIG. 16A as the at least one button aperture 331). Similarly, because of the at least one button aperture, vents 333A, 333B, 333F, and/or 333G may be shorter in length to allow for the size of the at least one button aperture.

The single-sleeve 300B may have an advertisement or label surface 382. The advertisement or label surface 382 may allow for printed materials to be added to the surface of the vented sleeve 330. While in other examples, an advertisement or label would be added during manufacturing to the advertising or label surface 382.

FIG. 16C is a front view illustration of a single-sleeve 300C for a descent controller. The single-sleeve 300C is utilized with a descent controller (not illustrated) to provide a buffer between the rope movements and descent controller, and a user's hand or other body parts. One part of the buffer is to prevent a user from burning their hands, arms, or other body parts due to friction and/or rope movements through and/or around a descent controller. In order to prevent heat from reaching a user's hands, sleeves should be utilized around the descent controller.

In at least one embodiment, the single-sleeve 300C can include a vented sleeve 330. The vented sleeve 330 can have vents 333A, 333B, 333C, 333D, and/or 333E (collectively vents 333) through them that allows for additional air flow to and/or through the descent controller. The vents 333 can be sized and/or shaped to allow for air flow and/or cooling to be maximized for the particular deployment use cases. For example, for a long rope deployment, e.g., longer than 600 feet, the vents 333 may need to be larger to allow for increased airflow, which may lead the vented sleeve 330 to be constructed with materials that are stronger even with less material being utilized to form or manufacture the vented sleeve 330. In these examples, the separation supports 335E, 335F, and/or 335G (collectively separation supports 335) may be smaller than for single-sleeve 300C utilized for shorter rope or other deployments. In other examples, the separation supports 335 may be sized and/or configured to maximize support while minimizing weight of the single-sleeve 300C. For example, the material utilized to construct the vented sleeve 330 may include plastic based materials, but with the creation of new materials that include strengtheners such as metals, carbon fiber, and/or other materials that allow for light weight and significant strength even with subjected to significant heat.

The vented sleeve 330 can also allow for an at least one button aperture 331 that allows for user engagement or interactivity with the descent controller. The at least one button aperture 331 can allow for a button or other engagement mechanism that is smaller than the diameter of the aperture opening to pass through or allow a user's finger or other limb to pass through and engage with the descent controller. The at least one button aperture 331, can have an aperture surface 386 that allow for a slope or other surface characteristics that allow a user to more easily engage with the descent controller.

In some examples, the side wall of the vented sleeve 330 may have an advertising surface 382 for advertisements or other information to be placed or provided to a user. The vented sleeve 330, and/or other sleeves may be coupled together through the use of a securing pin, that can pass through a securing aperture 355. The securing pin can be utilized to ensure the various sleeves do not shift between the preferred positions during use, storage, and/or travel. If the sleeves shift for any reason, the air flow to and/or around the descent controller can be restricted and result in overheating.

Figure 16D:
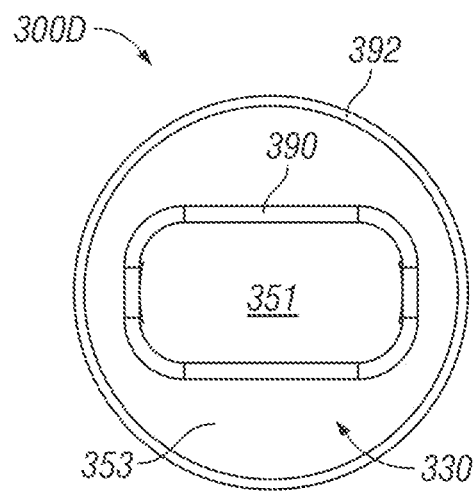
FIG. 16D is a top view illustration of a single-sleeve for a descent controller.

FIG. 16D is a top view illustration of a single-sleeve 300D for a descent controller. The top view of the single-sleeve 300D shows the rope aperture 351, and how it passes through the top 353 of the vented sleeve 330. The rope aperture 351 can include an aperture lip or edge 390 with a beveled and/or rounded edge that would not fray or damage the rope if it came in contact with the edge 390. The vented sleeve lip 392 can have a rounded and/or beveled edge to prevent a user from gripping a sharp or contoured edge during use, storage, or travel.

Figure 16E:
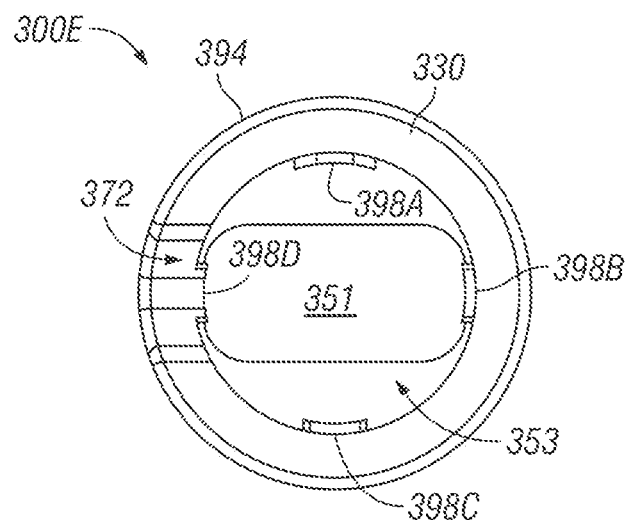
FIG. 16E is a bottom view illustration of a single-sleeve for a descent controller.

FIG. 16E is a bottom view illustration of a single-sleeve 300E for a descent controller. The bottom view illustration of the single-sleeve 300E shows the vented sleeve 330, and the offset bridges 398A, 398B, 398C and/or 398D (collectively offset bridges 398). For example, to reduce weight for users a vented sleeve with a set of offset bridges 398 formed along the inner circumference of the vented sleeve 330 can be utilized with the offset bridges 398 acting as the heat sink portions. The set of offset bridges 398 may be formed to align and/or correspond with different desired heat reduction desirability's in mind. In at least one example, the set of offsets 398 may include two offset bridges 398, which can allow for a specific amount of heat to be dissipated from the descender device. In other examples there may be three, four, five, six, seven, eight, or more offset bridges. The number of bridges may be configured for use with different environments, for example a descender device manufactured for South America may have more offset bridges than one that is manufactured for use in Alaska. These offset bridges 398 may interact or engage with designated portions of the descender device. Alternatively, the number of contact points with the descender device allows for additional amounts of specific heat to be drawn away from the descender device and into the vented sleeve. The offset bridges 398 can also create an offset space that allows for additional airflow in, around, and through the descender device.

In at least one example, the vented sleeve 330 may have a sleeve lip 394 that is rounded or beveled to prevent damage to a user or a rope during deployment. The rope aperture 351 can pass through the top 353 of the vented sleeve 330. The side wall of the vented sleeve 330 can include a peripheral notch 372 that allows for ropes, and/or other deployment components to be passed into the area surrounded by the single sleeve 300E.

Figure 16F:
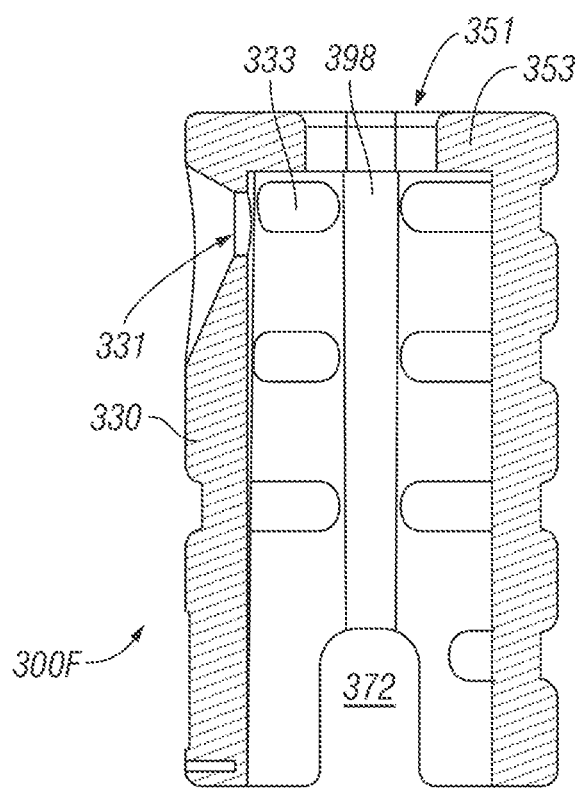
FIG. 16F is a cut-away view illustration of a single-sleeve for a descent controller.

FIG. 16F is a cut-away view illustration of a single-sleeve 300F for a descent controller. The cut-away view of the single-sleeve 300F shows the positioning of the offset bridges 398. The top 353 of the vented sleeve 330, in at least one embodiment, can include a rope aperture 351 for a rope or other deployment device to pass through the vented sleeve 330 to the descent controller. The top 353 of the vented sleeve 330, in at least one example, can be perpendicular to the side walls through which the one or more vents 333 are placed. In other examples, the top 353 can have a concave or convex surface configuration that allows for the configuration of various shapes and/or design specifications. For example, a convex top may allow for the single-sleeve 300F to fit within a mechanism for rope deployments. In at least one embodiment, the single-sleeve 300F can include a peripheral notch 372 for ropes or other deployment devices to pass through the vented sleeve 330 and/or other sleeves if utilized. The vented sleeve 330 can additionally have vents 333, and an at least one button aperture 331. The vented sleeve 330 and the offset bridge(s) 398 can allow for air flow towards the descent controller (not illustrated) as discussed above with reference to other embodiments.

Figure 17A:
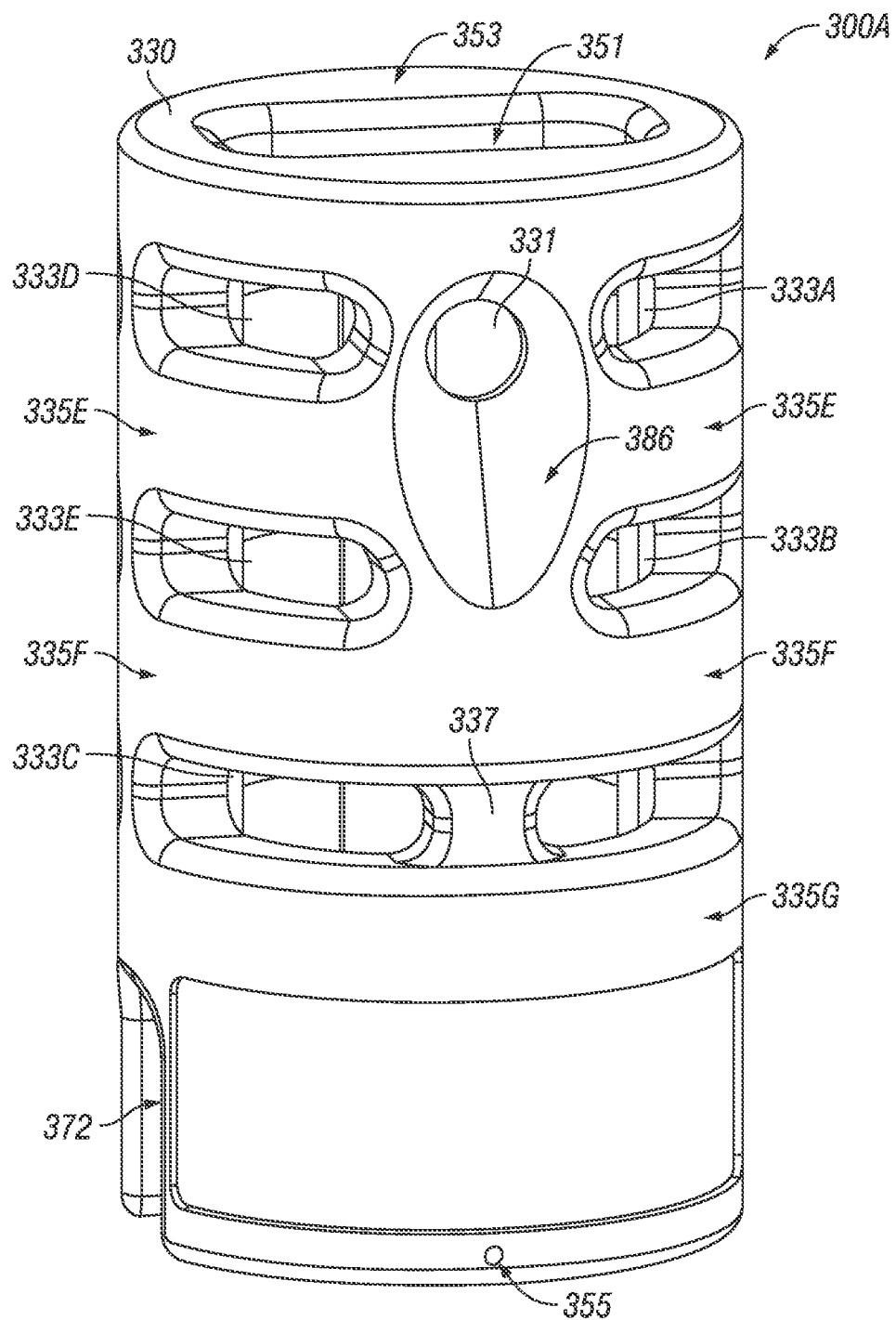
FIG. 17A is a side perspective view illustration of a sleeve for a descent controller.

FIG. 17A is a side perspective view illustration of a sleeve 300A for a descent controller. The sleeve 300A can include a vented sleeve 330, which in at least one embodiment, can be referenced as a middle or intermediate sleeve 330. The vented sleeve 330 can be manufactured as a non-pliable plastic based material. Some examples of a non-pliable plastic or composite based material can be acrylonitrile butadiene styrene (ABS), polylactic acid (PLA), or nylon. It would be understood that other materials of similar or like compositions may be substituted and/or added to the composition without departing from the spirit of the present disclosure. Additives may include strengtheners or other materials to increase the supportive or thermal structure of the material.

The vented sleeve 330 can include at least one button aperture 331 to allow for a user to access a portion of a descent controller (not illustrated). The at least one button aperture 331 can include an aperture passing through one or more sleeves of the single-sleeve 300A. In at least one example, the at least one button aperture 331 may have an engagement surface that allows for a concave design from the outer surface to the inner surface of one or more of the sleeves of the single-sleeve 300A. The concave design may also include an oval or circular design on the outer surface, and a smaller oval or circular design on the inner surface of one or more sleeves of the sleeve design. The at least one button aperture 331, can have an aperture surface 386 having a slope or other surface characteristics that allow a user to more easily engage with the descent controller.

The vented sleeve 330 can have vents 333A, 333B, 333C, 333D, and/or 333E (collectively vents 333) through them that allows for additional air flow to and/or through the descent controller. The vents 333 can be sized and/or shaped to allow for air flow and/or cooling to be maximized for the particular deployment use cases as discussed above with reference to other embodiments. Furthermore, The vents 333 can have separation supports 335E, 335F, and/or 335G (collectively separation supports 335) and one or more partial separation supports 337 as discussed above with reference to other embodiments.

The top 353 of the vented sleeve 330, in at least one embodiment, can include a rope aperture 351 that allows a rope or other deployment device to pass through the vented sleeve 330 to the descent controller. The top 353 of the vented sleeve 330, in at least one example, can be perpendicular to the side walls through which the one or more vents 333 are placed. In at least one embodiment, the single-sleeve 300A can include an extending peripheral notch 372 that allows for ropes or other deployment devices to pass through the vented sleeve 330 and/or other sleeves of the sleeve combination.

In some examples, the side wall of the vented sleeve 330 may have an advertising surface 382. The vented sleeve 330, and/or other sleeves may be coupled together through the use of a securing pin, that can pass through the securing aperture 355.

Figure 17B:
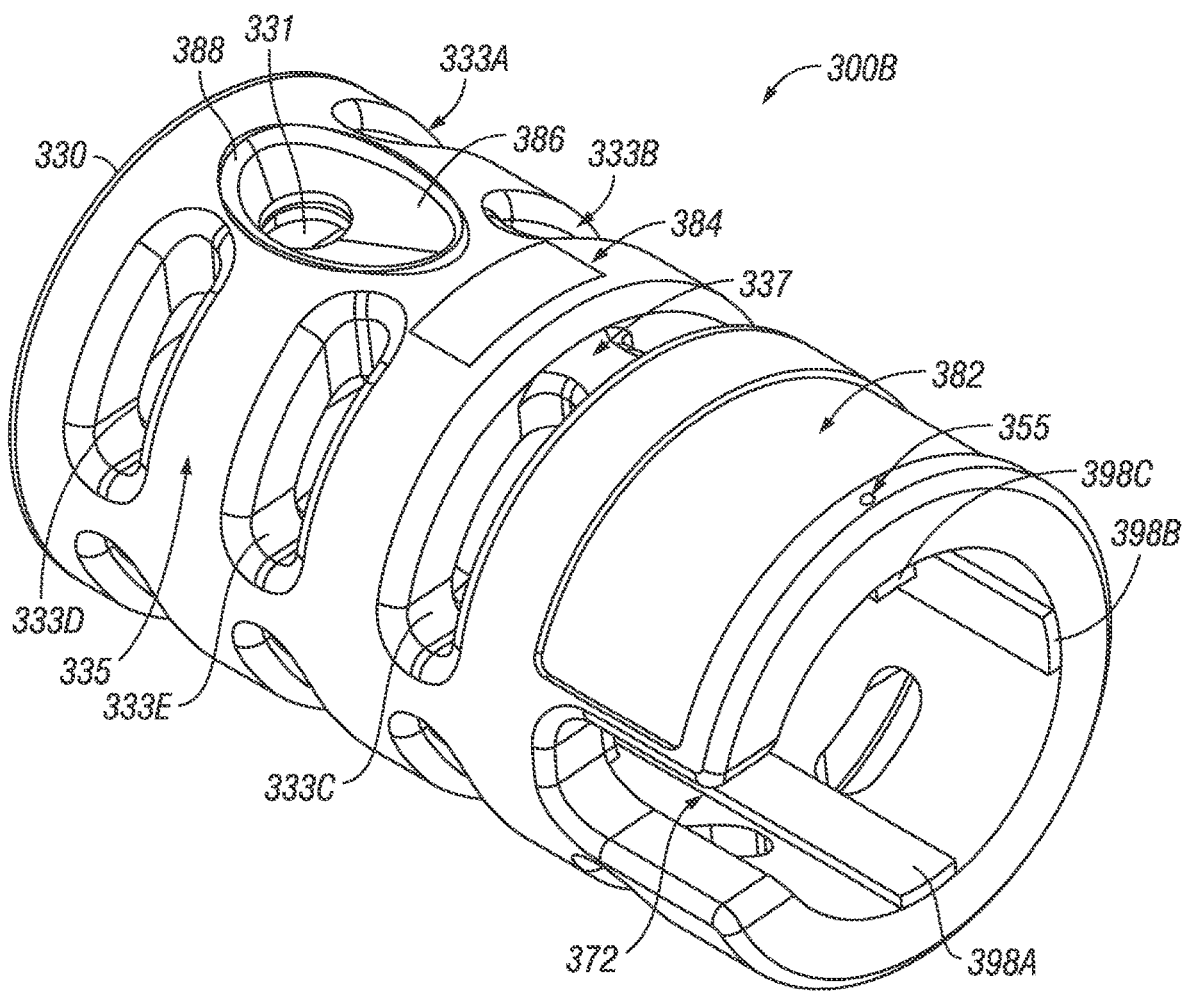
FIG. 17B is a bottom perspective view illustration of a sleeve for a descent controller.

FIG. 17B is a bottom perspective view illustration of a sleeve 300B for a descent controller. The sleeve 300B can include a vented sleeve 330, which in at least one embodiment, can be referenced as a middle or intermediate sleeve 330. The vented sleeve 330 can be manufactured as a non-pliable plastic-based material. Some examples of a non-pliable plastic or composite based material can be acrylonitrile butadiene styrene (ABS), polylactic acid (PLA), or nylon. It would be understood that other materials of similar or like compositions may be substituted and/or added to the composition without departing from the spirit of the present disclosure. Additives may include strengtheners or other materials to increase the supportive or thermal structure of the material.

The vented sleeve 330 can include at least one button aperture 331 to allow for a user to access a portion of a descent controller (not illustrated). In at least one example, the at least one button aperture 331 may have an engagement surface with a concave design from the outer surface to the inner surface of the single-sleeve 300B. The concave design may also include an oval or circular design on the outer surface, and a smaller oval or circular design on the inner surface of one or more sleeves of the sleeve design. The at least one button aperture 331, can have an aperture surface 386 with a slope or other surface characteristics that allow a user to more easily engage with the descent controller. From the outer edge 388 to the at least one button aperture 331, the aperture surface 386 can be interfaced between these two points and/or edges. In some examples the outer edge may have a lip or other depression along the surface of the side wall of the vented sleeve 330. In at least one example, the outer sleeve 380 may have a corresponding opening or aperture that is sized equal to or greater than the diameter of the outer edge 388.

The sleeve 300B can allow for vents 333A, 333B, and/or 333C (collectively vents 333) that allow for air, or the movement of air to pass to or from the descent controller. The shapes and/or sizes of the vents can be of any number of configurations, shapes, or designs as discussed above. The sleeve 300B can also include an advertisement or label surface 382, a labeling surface 384, and a securing aperture 355 as discussed above.

The one or more vents 333 can be supported by one or more separation support(s) 335. The separation support(s) 335 can allow for the one or more vents 333 to have various shapes and/or configurations.

In at least one example, there may also be partial separation support(s) 337. The partial separation support(s) 337 can have a depth that is less than the separation support 335. In at least one embodiment, the partial separation support(s) 337 is at least one half the depth of the separation support 335, but no more than two-thirds the depth of the separation support 335. In at least one embodiment, the single-sleeve 300B can include an extending peripheral notch 372 that allows for ropes or other deployment devices to pass through the vented sleeve 330 and/or other sleeves of the sleeve combination.

The perspective view illustration of the single-sleeve 300B shows the vented sleeve 330 and the offset bridges 398A, 398B, and/or 398C (collectively offset bridges 398). For example, to reduce weight for users a vented sleeve with a set of offset bridges 398 formed along the inner circumference of the vented sleeve 330 can be utilized with the offset bridges 398 acting as the heat sink portions. The set of offset bridges 398 may be formed to align and/or correspond with different desired heat reduction desirability's in mind. In at least one example, the set of offsets 398 may include two offset bridges 398, which can allow for a specific amount of heat to be dissipated from the descender device. In other examples there may be three, four, five, six, seven, eight, or more offset bridges. The number of bridges may be configured for use with different environments, for example a descender device manufactured for South America may have more offset bridges than one that is manufactured for use in Alaska. These offset bridges 398 may interact or engage with designated portions of the descender device. Alternatively, the number of contact points with the descender device allows for additional amounts of specific heat to be drawn away from the descender device and into the vented sleeve. The offset bridges 398 can also create an offset space that allows for additional airflow in, around, and through the descender device.

Figure 18D:
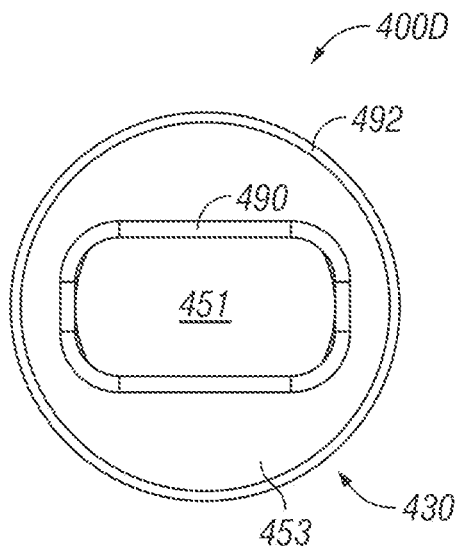
FIG. 18D is a top view illustration of a multi-sleeve combination for a descent controller.
Figure 18E:
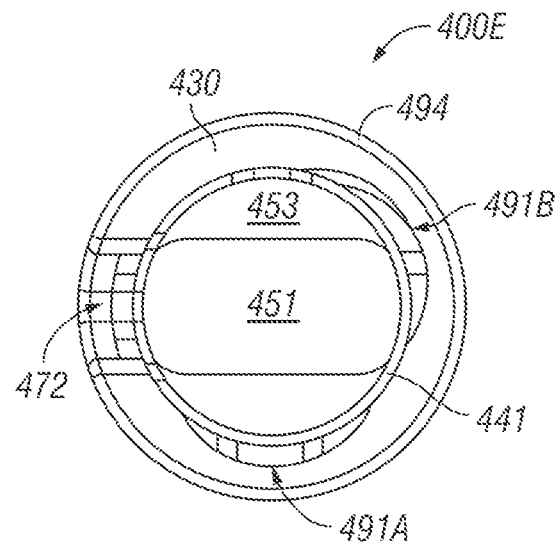
FIG. 18E is a bottom view illustration of a multi-sleeve combination for a descent controller.
Figure 18F:
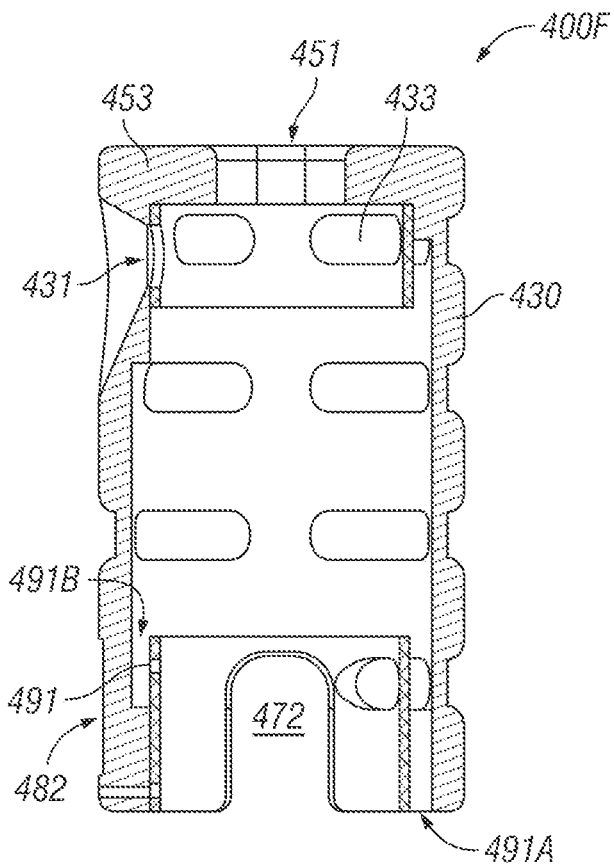
FIG. 18F is a cut-away view illustration of a multi-sleeve combination for a descent controller.
Figure 19:
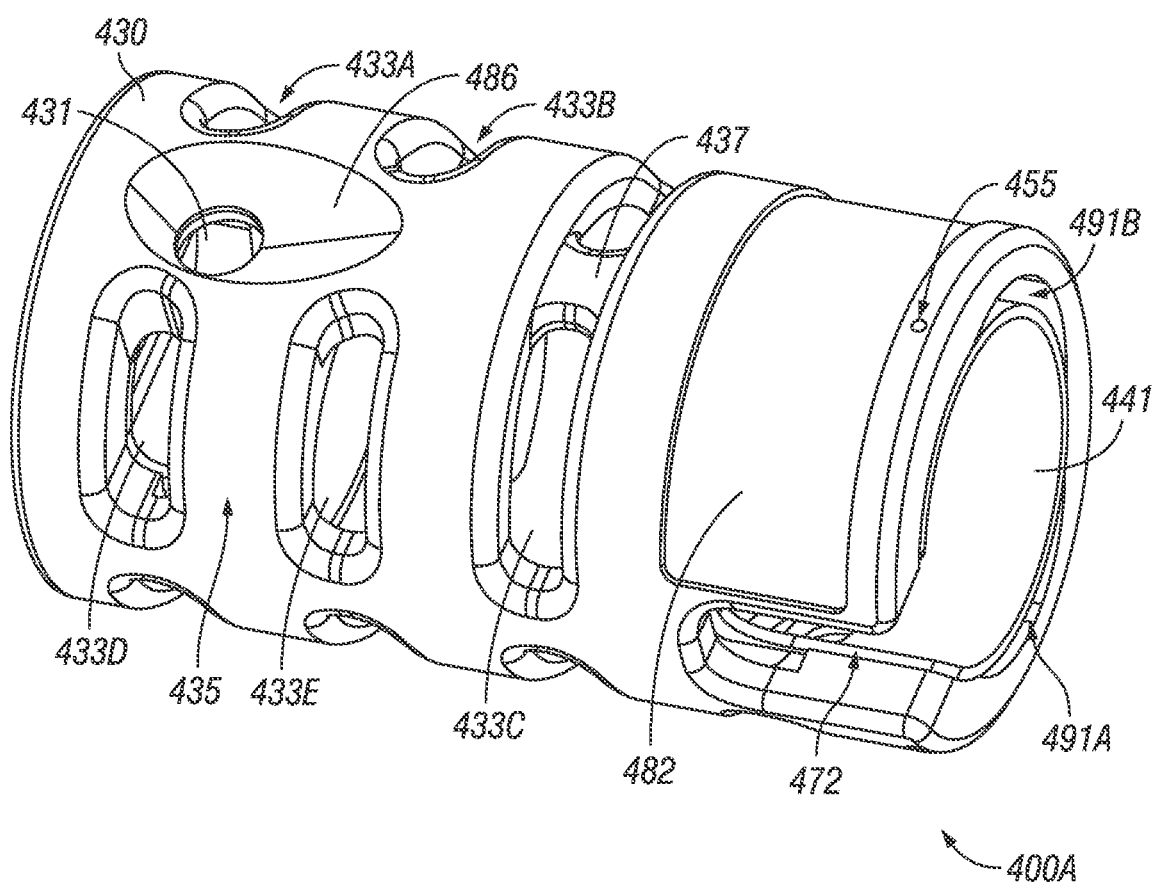
FIG. 19 is a perspective view illustration of a multi-sleeve combination for a descent controller.

FIGS. 18A-19 are an illustration of an inner sleeve and outer sleeve having an air gap separation along portions of the inner circumference surface of the outer sleeve. The air gaps created during formation or manufacturing provide increased air flow through the outer sleeve, and/or the vents or openings along the surface of the outer sleeve. These vents or openings can be structurally designed to provide appropriate air flow to the parts of the descender device that are most prone to heating during a deployment. In at least one example, the air gaps can be created by reducing wall thickness at specific points along the circumference of the vented sleeve. The inner sleeve, in at least one embodiment, is manufactured from a metal or metal like material that allows for the capture of heat from the descender device. In some examples, the inner sleeve can be coated with a material that allows for increased absorption of heat from the descender device. The inner sleeve can interface with designated portions of the inner circumferential surface of the outer sleeve and/or can be engaged with a stabilization pin placed through the stabilization point. There can be air gaps manufactured into the outer sleeve to allow for increased air flow.

FIG. 18A is a perspective view illustration of a multi-sleeve combination 400A for a descent controller. The multi-sleeve combination can include a vented sleeve 430, which in at least one embodiment, can be referenced as an outer sleeve 430. The vented sleeve 430 can be manufactured as a non-pliable plastic based material. Some examples of a non-pliable plastic or composite based material can be acrylonitrile butadiene styrene (ABS), polylactic acid (PLA), or nylon. It would be understood that other materials of similar or like compositions may be substituted and/or added to the composition without departing from the spirit of the present disclosure. Additives may include strengtheners or other materials to increase the supportive or thermal structure of the material.

The vented sleeve 430 can include at least one button aperture 431 to allow for a user to access a portion of a descent controller (not illustrated). The at least one button aperture 431 can include an aperture passing through one or more sleeves of the multi-sleeve combination 400A. In at least one example, the at least one button aperture 431 may have an engagement surface with a concave design from the outer surface to the inner surface of one or more of the sleeves of the multi-sleeve combination 400A. The concave design may also include an oval or circular design on the outer surface, and a smaller oval or circular design on the inner surface of one or more sleeves of the multi-sleeve design.

The multi-sleeve combination 400A can allow for one or more vents 433 that allow for air, or the movement of air to pass to or from the descent controller (not illustrated). The shapes and/or sizes of the vents can be of any number of configurations, shapes, or designs as discussed above.

The one or more vents 433 can be supported by one or more separation support(s) 435. The separation support(s) 435 can allow for the one or more vents 433 to have various shapes and/or configurations as discussed above.

The top 453 of the vented sleeve 430, in at least one embodiment, can include a rope aperture 451 that allows a rope or other deployment device to pass through the vented sleeve 430 to the descent controller. The top 453 of the vented sleeve 430, in at least one example, can be perpendicular to the side walls through which the one or more vents 433 are placed. In other examples, the top 453 can have a concave or convex surface configuration that allows for the configuration of various shapes and/or design specifications as discussed above. Furthermore, the vented sleeve 430 can include an extending peripheral notch 472 as discussed above.

FIG. 18B is a rear view illustration of a multi-sleeve combination 400B for a descent controller. In at least one embodiment, the multi-sleeve combination 400B can include an inner or protective sleeve 441, and a vented sleeve or outer sleeve 430. The inner sleeve 441, in at least one example, is manufactured, formed, and/or constructed from a metallic based material. Examples of a metallic based material can include aluminum, steel, titanium, and/or combinations or compositions thereof. The vented sleeve 430 can be manufactured as a non-pliable plastic based material. Some examples of a non-pliable plastic or composite based material can be acrylonitrile butadiene styrene (ABS), polylactic acid (PLA), or nylon. It would be understood that other materials of similar or like compositions may be substituted and/or added to the composition without departing from the spirit of the present disclosure. Additives may include strengtheners or other materials to increase the supportive or thermal structure of the material.

Each of the sleeves 441, and/or 430 can each have a set of apertures and/or openings that allow for the passage of air from outside of the multi-sleeve combination 400B into a central area where a descent controller (not illustrated) is received within the multi-sleeve combination 400B. In at least one embodiment, each of the sleeves 430, and/or 441 have the same openings, apertures, and/or other voids. These openings can be aligned with vents 433A, 433B, 433C, 433F, 433G, 433H, and/or 433I (collectively vents 433).

The vents 433, can be separated by separation support(s) 435A, 435B, 435C, 435D, 435E, 435F, and/or 435G (collectively separation supports 435). These separation supports 435 may include vertical and horizontal support for the vents 433. In at least one examples, separation supports 435A, 435B, 435C, and/or 435D may be utilized as vertical separation supports, while separation supports 435E, 435F, and/or 435G can be utilized as horizontal separation supports. In some examples, the separation supports 435 in a horizontal configuration may be designed to be at least as wide or wider than the vents 433 that are adjacent to the separation supports 435. Additionally, in at least one example, the separation supports 435 in a vertical configuration can be designed to be the same or smaller in width than the vents 433 they are adjacent to.

The vents 433 may vary in length based on positions along the side wall surface of the multi-sleeve combination 400B. For example, vent 433H may be greater in length than vents 433A, 433B, and/or 433I. In other examples, vent 433A may be longer than vents 433B and/or 433F, allow for increased air flow because of the at least one button aperture (shown in FIG. 18A as the at least one button aperture 431). Similarly, because of the at least one button aperture, vents 433A, 433B, 433F, and/or 433G may be shorter in length to allow for the size of the at least one button aperture.

The multi-sleeve combination 400B may have an advertisement or label surface 482. The advertisement or label surface 482 may allow for printed materials to be added to the surface of the vented sleeve 430 or inner sleeve 441. While in other examples, an advertisement or label would be added during manufacturing to the advertising or label surface 482.

FIG. 18C is a front view illustration of a multi-sleeve combination 400C for a descent controller. The multi-sleeve combination 400C is utilized with a descent controller (not illustrated) to provide a buffer between the rope movements, descent controller, and a user's hand or other body parts. One function of the buffer is to prevent a user from burning their hands, arms, or other body parts due to friction and/or rope movements through and/or around a descent controller. In order to prevent heat from reaching a user's hands, sleeves should be utilized around the descent controller.

In at least one embodiment, the multi-sleeve combination 400C can include an outer or vented sleeve 430, and an inner sleeve. The vented sleeve 430 can have vents 433A, 433B, 433C, 433D, and/or 433E (collectively vents 433) through them that allows for additional air flow to and/or through the descent controller. The vents 433 can be sized and/or shaped to allow for air flow and/or cooling to be maximized for the particular deployment use cases as discussed above.

The one or more vents 433 can be supported by one or more separation support(s) 435E, 435F, and/or 435G (collectively separation support(s) 435). The separation support(s) 435 can allow for the one or more vents 433 to have various shapes and/or configurations as discussed above.

The vented sleeve 430 can also allow for an at least one button aperture 431 that allows for user engagement or interactivity with the descent controller. The at least one button aperture 431 can allow for a button or other engagement mechanism that is smaller than the diameter of the aperture opening to pass through or allow a user's finger or other limb to pass through and engage with the descent controller. The at least one button aperture 431 can have an aperture surface 486 that allow for a slope or other surface characteristics that allow a user to more easily engage with the descent controller.

In some examples, the side wall of the vented sleeve 430 can also have an advertising surface 482 that allows for advertisements or other information to be placed or provided to a user. The inner sleeve (not shown) and/or vented sleeve 430 may be coupled together through the use of a securing pin that can pass through the securing aperture 455. The securing pin can be utilized to ensure the various sleeves do not shift between the preferred positions during use, storage, and/or travel. If the sleeves shift for any reason the air flow to and/or around the descent controller can be restricted and result in overheating.

FIG. 18D is a top view illustration of a multi-sleeve combination 400D for a descent controller. The top view of the multi-sleeve combination 400D shows the rope aperture 451 and how it passes through the top 453 of the vented sleeve 430. The rope aperture 451 can include an aperture lip or edge 490 that can allow for a beveled and/or rounded edge that would not fray or damage the rope if it came in contact with the edge 490. The vented sleeve lip 492 can have a rounded and/or beveled edge to prevent a user from gripping a sharp or contoured edge during use, storage, or travel.

FIG. 18E is a bottom view illustration of a multi-sleeve combination 400E for a descent controller. The bottom view illustration of the multi-sleeve combination 400E shows the inner sleeve 441, and the vented sleeve 430. The vented sleeve 430 in at least one embodiment, is the thickest of the two sleeves illustrated. In at least one example, the vented sleeve 430 may have a sleeve lip 494, which can be rounded or beveled to prevent damage to a user or a rope during deployment. The rope aperture 451 can pass through the top 453 of the vented sleeve 430. The side wall of the vented sleeve 430 can include an extending peripheral notch 472 that allows for ropes, and/or other deployment components to be provided into the area surrounded by the multi-sleeve combination 400E. Additionally, the air gap(s) 491A and/or 491B (collectively air gaps 491) allow for increased air flow within the internal areas of the multi-sleeve combination 400E. In at least one embodiment, the air gaps 491 are manufactured into the vented sleeve 430 as a decreased wall thickness. In at least one example, the air gaps 491 are manufactured in specific locations to allow for air flow to be directed to the most heat generating portions of the descent controller. The air gaps 491 may range from 1 mm in depth, to several millimeters in depth, but will always be less than the thickness of the vented sleeve 430 in this embodiment.

FIG. 18F is a cut-away view illustration of a multi-sleeve combination 400F for a descent controller. The cut-away view of the multi-sleeve combination 400F shows the positioning and linking of the multi-sleeve combination 400F. In particular, the inner sleeve 441 interfaces with the vented sleeve 430. In at least one example, a set of air gaps 491A and/or 491B (collectively air gaps 491) are provided between the inner sleeve 441 and the vented sleeve 430.

The multi-sleeve combination can include a vented sleeve 430, which in at least one embodiment, can be referenced as an outer sleeve 430. The vented sleeve 430 can be manufactured as a non-pliable plastic based material. Some examples of a non-pliable plastic or composite based material can be acrylonitrile butadiene styrene (ABS), polylactic acid (PLA), or nylon. It would be understood that other materials of similar or like compositions may be substituted and/or added to the composition without departing from the spirit of the present disclosure. Additives may include strengtheners or other materials to increase the supportive or thermal structure of the material.

The vented sleeve 430 can include at least one button aperture 431 to allow for a user (not illustrated) to access a portions of a descent controller (not illustrated). The at least one button aperture 431 can include an aperture passing through one or more sleeves of the multi-sleeve combination 400A. In at least one example, the at least one button aperture 431 may have an engagement surface that allows for a concave design from the outer surface to the inner surface of one or more of the sleeves of the multi-sleeve combination 400F. The concave design may also include an oval or circular design on the outer surface, and a smaller oval or circular design on the inner surface of one or more sleeves of the multi-sleeve design.

The inner sleeve 441 can have openings that correspond to the openings 433 through the vented sleeve 430. Additionally, in at least one example, the inner sleeve may have additional openings that allow for heat to transfer from the descent controller to the vented sleeve 430. For example, the vented sleeve 430 and/or inner sleeve 441 may be manufactured from a material that is capable of absorbing and/or transferring heat away from one surface to another. Another example of heat transfer points could be a labeling or advertising surface 482 that can be utilized for labeling, advertising, and/or logos. These surfaces can be made with a depth that allows for specific heat transfer characteristics. There is also the rope aperture 451 along the top 453 of the vented sleeve 430 that allows for ropes or other devices or mechanisms to pass through. It should be noted that while the inner sleeve 441 is shown without a top, it could have one as part of the design if chosen without departing from the spirit of the present disclosure.

Additionally, the air gap(s) 491A and/or 491B (collectively air gaps 491) illustrated provide increased air flow within the internal areas of the multi-sleeve combination 400E. In at least one embodiment, the air gaps 491 are manufactured into the vented sleeve 430. In at least one example, the air gaps 491 are placed in specific locations to allow for air flow to be directed to the most heat generating portions of the descent controller. Furthermore, the vented sleeve 430 can include an extending peripheral notch 472 as discussed above.

FIG. 19 is a perspective view illustration of a multi-sleeve combination 400A for a descent controller. The multi-sleeve combination can include a vented sleeve 430, which in at least one embodiment can be referenced as a middle or intermediate sleeve 430, and an inner sleeve 441. The vented sleeve 430 can be manufactured as a non-pliable plastic-based material. Some examples of a non-pliable plastic or composite based material can be acrylonitrile butadiene styrene (ABS), polylactic acid (PLA), or nylon. It would be understood that other materials of similar or like compositions may be substituted and/or added to the composition without departing from the spirit of the present disclosure. Additives may include strengtheners or other materials to increase the supportive or thermal structure of the material. For example, the inner sleeve 441 may have a thermal property that causes heat to transfer to a thermally conductive plastic of the vented sleeve 430.

The vented sleeve 430 can include at least one button aperture 431 to allow for a user (not illustrated) to access a portion of a descent controller (not illustrated). The at least one button aperture 431 can include an aperture passing through one or more sleeves of the multi-sleeve combination 400A. In at least one example, the at least one button aperture 431 may have an engagement surface that allows for a concave design from the outer surface to the inner surface of one or more of the sleeves of the multi-sleeve combination 400A. The concave design may also include an oval or circular design on the outer surface, and a smaller oval or circular design on the inner surface of one or more sleeves of the multi-sleeve design. The at least one button aperture 431, can have an aperture surface 486 that allow for a slope or other surface characteristics that allow a user to more easily engage with the descent controller.

The multi-sleeve combination 400A can have vents 433A, 433B, and/or 433C (collectively vents 433) that allow for air, or the movement of air to pass to or from the descent controller (not illustrated). The shapes and/or sizes of the vents can be of any number of configurations, shapes, or designs as discussed above.

The multi-sleeve combination 400A may have an advertisement or label surface 482 that may allow for printed materials to be added to the surface of the vented sleeve 430 or inner sleeve 441. While in other examples, an advertisement or label can be added during manufacturing to the advertising or label surface 482.

The vented sleeve 430, and/or inner sleeve 441 may be coupled together through the use of a securing pin that can pass through the securing aperture 455. The securing pin can be utilized to ensure the various sleeves do not shift between the preferred positions during use, storage, and/or travel. If the sleeves shift for any reason, the air flow to and/or around the descent controller can be restricted and result in overheating.

The one or more vents 433 can be supported by one or more separation support(s) 435. The separation support(s) 435 can allow for the one or more vents 433 to have various shapes and/or configurations as discussed above.

In at least one example, there may also be partial separation support(s) 437. The partial separation support(s) 437 can have a depth that is less than the separation support 435. In at least one embodiment, the partial separation support(s)

437 is at least one half the depth of the separation support 435, but no more than two-thirds the depth of the separation support 435.

In at least one embodiment, the multi-sleeve combination 400A can include a peripheral notch 472 for ropes or other deployment devices to pass through the vented sleeve 430 and/or other sleeves of the multi-sleeve combination. Additionally, the air gap(s) 491A and/or 491B (collectively air gaps 491) provide increased air flow within the internal areas of the multi-sleeve combination 400E. In at least one embodiment, the air gaps 491 are manufactured into the vented sleeve 430. In at least one example, the air gaps 491 are manufactured in specific locations to allow for air flow to be directed to the most heat generating portions of the descent controller. The air gaps 491 may range from 1 mm in depth, to several millimeters in depth, but will always be less than the thickness of the vented sleeve 430.

FIGS. 20A-20F are an illustration of a multi-sleeve design having a two-part inner sleeve and a single outer sleeve. The two-part inner sleeve allows for heat transfer from specific portions of the descent controller. In some examples, the two-part inner sleeve allows for the ability to control heat transfer from the inner sleeve to the outer sleeve in specific areas.

FIG. 20A is a perspective view illustration of a multi-sleeve combination 500A for a descent controller. The multi-sleeve combination can include a vented sleeve 530, which in at least one embodiment, can be referenced as a middle or intermediate sleeve 530. The vented sleeve 530 can be manufactured as a non-pliable plastic-based material. Some examples of a non-pliable plastic or composite based material can be acrylonitrile butadiene styrene (ABS), polylactic acid (PLA), or nylon. It would be understood that other materials of similar or like compositions may be substituted and/or added to the composition without departing from the spirit of the present disclosure. Additives may include strengtheners or other materials to increase the supportive or thermal structure of the material.

The vented sleeve 530 can include at least one button aperture 531 to allow for a user (not illustrated) to access a portion of a descent controller (not illustrated). The at least one button aperture 531 can include an aperture passing through one or more sleeves of the multi-sleeve combination 500A. In at least one example, the at least one button aperture 531 may have an engagement surface that allows for a concave design from the outer surface to the inner surface of one or more of the sleeves of the multi-sleeve combination 500A. The concave design may also include an oval or circular design on the outer surface, and a smaller oval or circular design on the inner surface of one or more sleeves of the multi-sleeve design.

The multi-sleeve combination 500A can allow for one or more vents 533 that allow for air, or the movement of air to pass to or from the descent controller (not illustrated). The shapes and/or sizes of the vents can be of any number of configurations, shapes, or designs as discussed above.

The one or more vents 533 can be supported by one or more separation support(s) 535. The separation support(s) 535 can allow for the one or more vents 533 to have various shapes and/or configurations as discussed above.

The top 553 of the vented sleeve 530, in at least one embodiment, can include a rope aperture 551 for a rope or other deployment device to pass through the vented sleeve 530 to the descent controller. The top 553 of the vented sleeve 530, in at least one example, can be perpendicular to the side walls through which the one or more vents 533 are placed. In other examples, the top 553 can have a concave or convex surface configuration that allows for the configuration of various shapes and/or design specifications as discussed above. Furthermore, the vented sleeve 530 can include an extending peripheral notch 572 that allows for ropes or other deployment devices to pass through the vented sleeve 530.

FIG. 20B is a side view illustration of a multi-sleeve combination 500B for a descent controller. In at least one embodiment, the multi-sleeve combination 500B can include a two part inner or protective sleeve 541A and/or 541B (collectively inner sleeve 541), and a vented sleeve or outer sleeve 530. The inner sleeve 541, in at least one example, is manufactured, formed, and/or constructed from a metallic based material. Examples of a metallic based material can include aluminum, steel, titanium, and/or combinations or compositions thereof. The vented sleeve 530 can be manufactured as a non-pliable plastic based material. Some examples of a non-pliable plastic or composite based material can be acrylonitrile butadiene styrene (ABS), polylactic acid (PLA), or nylon. It would be understood that other materials of similar or like compositions, may be substituted, and/or added to the composition without departing from the spirit of the present disclosure. Additives may include strengtheners, or other materials to increase the supportive or thermal structure of the material.

Each of the sleeves 541 and/or 530 can have a set of apertures and/or openings that allow for the passage of air from outside of the multi-sleeve combination 500B into a central area where a descent controller (not illustrated) is received within the multi-sleeve combination 500B. In at least one embodiment, each of the sleeves 530 and/or 541 have the same openings, apertures, and/or other voids. These openings can be aligned with vents 533A, 533B, 533C, 233F, 533G, 533H, and/or 533I (collectively vents 533).

The vents 533, can be separated by separation support(s) 535A, 535B, 535C, 535D, 535E, 535F, and/or 535G (collectively separation supports 535). These separation supports 535 may include vertical and horizontal support for the vents 533. In at least one examples, separation supports 535A, 535B, 535C, and/or 535D may be utilized as vertical separation supports, while separation supports 535E, 535F, and/or 535G can be utilized as horizontal separation supports. In some examples, the separation supports 535 in a horizontal configuration may be designed to be at least as wide or wider than the vents 533 that are adjacent to the separation supports 535. Additionally, in at least one example, the separation supports 535 in a vertical configuration can be designed to be the same or smaller in width than the vents 533 they are adjacent to.

The vents 533 may vary in length based on positions along the side wall surface of the multi-sleeve combination 500B. For example, vent 533H may be greater in length than vents 533A, 533B, and/or 533I. In other examples, vent 533A may be longer than vents 533B and/or 533F, to allow for increased air flow because of the at least one button aperture (shown in FIG. 20A as the at least one button aperture 531). Similarly, because of the at least one button aperture, vents 533A, 533B, 533F, and/or 533G may be shorter in length to allow for the size of the at least one button aperture. The multi-sleeve combination 500B may have an advertisement or label surface 582.

FIG. 20C is a front view illustration of a multi-sleeve combination 500C for a descent controller. The multi-sleeve combination 500C is utilized with a descent controller (not illustrated) to provide a buffer between the rope movements and descent controller, and a user's hand or other body parts. One part of the buffer is to prevent a user from burning their hands, arms, or other body parts due to friction and/or rope movements through and/or around a descent controller. In order to prevent heat from reaching a user's hands, sleeves should be utilized around the descent controller.

In at least one embodiment, the multi-sleeve combination 500C can include an outer or vented sleeve 530, and an inner sleeve(s) 541. The vented sleeve 530 can have vents 533A, 533B, 533C, 533D, and/or 533E (collectively vents 533) through them that allows for additional air flow to and/or through the descent controller. The one or more vents 533 can be supported by one or more separation support(s) 535E, 535F, and/or 535G (collectively separation support(s) 535). The separation support(s) 535 can allow for the one or more vents 533 to have various shapes and/or configurations as discussed above.

The vented sleeve 530 can also allow for an at least one button aperture 531 that allows for user engagement or interactivity with the descent controller. The at least one button aperture 531 can allow for a button or other engagement mechanism that is smaller than the diameter of the aperture opening to pass through or allow a user's finger or other limb to pass through and engage with the descent controller. The at least one button aperture 531, can have an aperture surface 586 that allow for a slope or other surface characteristics that allow a user to more easily engage with the descent controller. From the outer edge 588 to the at least one button aperture 531, the aperture surface 586 can be interfaced between these two points and/or edges. In some examples the outer edge 588 may have a lip or other depression along the surface of the side wall of the vented sleeve 530. In at least one example, the outer sleeve 580 may have a corresponding opening or aperture that is sized equal to or greater than the diameter of the outer edge 588.

In some examples, the side wall of the vented sleeve 530 can also have a labeling surface 584 that allows for a manufacturer or other logos or designs to be placed and seen by users. Similarly, there may also be an advertising surface 582 that allows for advertisements or other information to be placed or provided to a user. These surfaces 582 and 584 may be visible through the outer sleeve 580, or the outer sleeve 580 may have additional apertures or openings over the surfaces 582 and 584. The inner sleeve (not shown), and/or vented sleeve 530 may be coupled together through the use of a securing pin that can pass through the securing aperture 555. The securing pin can be utilized to ensure the various sleeves do not shift between the preferred positions during use, storage, and/or travel. If the sleeves shift for any reason the air flow to and/or around the descent controller can be restricted and result in overheating.

Figure 20D:
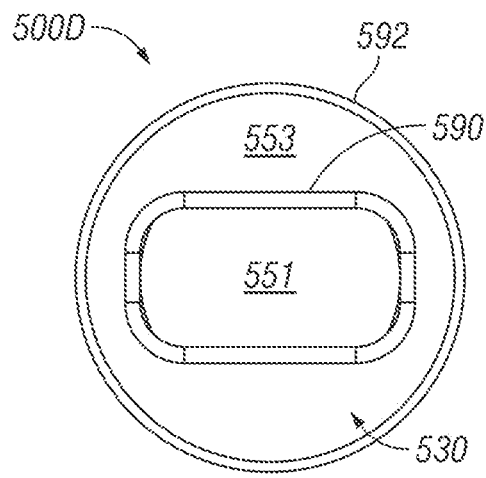
FIG. 20D is a top view illustration of a multi-sleeve combination for a descent controller.

FIG. 20D is a top view illustration of a multi-sleeve combination 500D for a descent controller. The top view of the multi-sleeve combination 500D shows the rope aperture 551, and how it passes through the top 553 of the vented sleeve 530. The rope aperture 551 can include an aperture lip or edge 590 that has a beveled and/or rounded edge that would not fray or damage the rope if it came in contact with the edge 590. The vented sleeve lip 592 can have a rounded and/or beveled edge to prevent a user from gripping a sharp or contoured edge during use, storage, or travel.

Figure 20E:
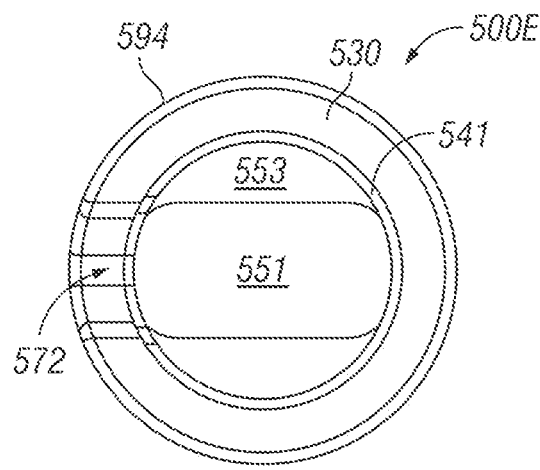
FIG. 20E is a bottom view illustration of a multi-sleeve combination for a descent controller.

FIG. 20E is a bottom view illustration of a multi-sleeve combination 500E for a descent controller. The bottom view illustration of the multi-sleeve combination 500E shows the inner sleeve 541 and/or the vented sleeve 530. In at least one example, the two-part inner or protective sleeve 541 provides for directed air flow and/or heat transfer. The vented sleeve 530 in at least one embodiment, is the thickest of the three sleeves illustrated. In at least one example, the vented sleeve 530 may have a sleeve lip 594 that can be rounded or beveled to prevent damage to a user or a rope during deployment. The rope aperture 551 can pass through the top 553 of the vented sleeve 530. The side wall of the vented sleeve 530 can include an extending peripheral notch 572 that allows for ropes, and/or other deployment components to be provided into the area surrounded by the multi-sleeve combination 500E.

Figure 20F:
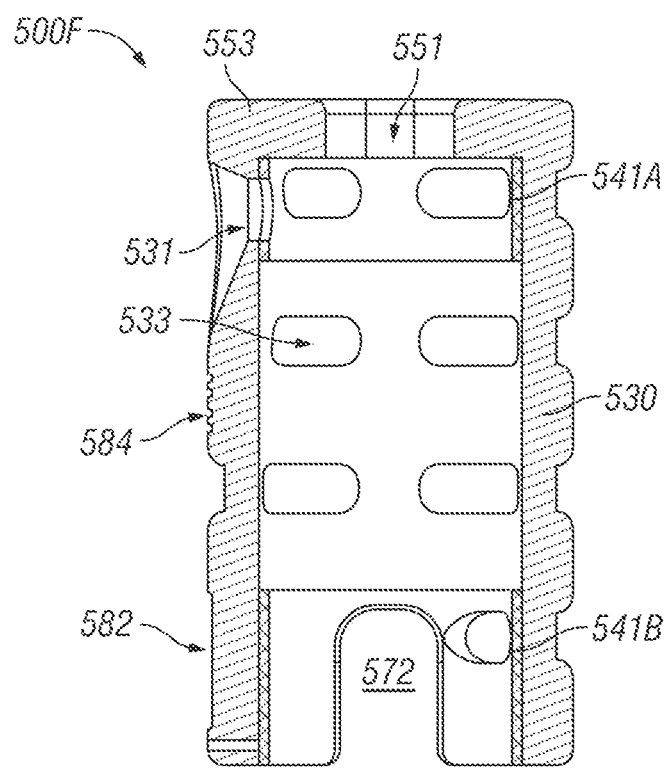
FIG. 20F is a cut-away view illustration of a multi-sleeve combination for a descent controller.

FIG. 20F is a cut-away view illustration of a multi-sleeve combination 500F for a descent controller. The cut-away view of the multi-sleeve combination 500F shows the positioning and linking of the multi-sleeve combination 500F. In particular, a two part inner or protective sleeve 541A and/or 541B (collectively inner sleeve 541) interfaces with the vented sleeve 530. In at least one example, there can be an air gap between the inner sleeve 541 and the vented sleeve 530. The vented sleeve 530 can also include an at least one button aperture 531 as described above.

The inner sleeve 541 has openings that correspond to the openings 533 through the vented sleeve 530. Additionally, in at least one example, the inner sleeve has additional openings that allow for heat to transfer from the descent controller to the vented sleeve 530. For example, the vented sleeve 530 and/or inner sleeve 541 may be manufactured from a material that is capable of absorbing and/or transferring heat away from one surface to another. Another example of heat transfer points could be the two surfaces 582 and 584 that can be utilized for labeling, advertising, and/or logos. These surfaces can be made with a depth that allows for specific heat transfer characteristics.

There is also the rope aperture 551 along the top 553 of the vented sleeve 530 that allows for ropes or other devices or mechanisms to pass through. It should be noted that while the inner sleeve 541 is shown without a top, it could have one as part of the design if chosen without departing from the spirit of the present disclosure. Furthermore, the vented sleeve 530 can include an extending peripheral notch as described above.

While certain illustrative embodiments have been shown in the drawings and described above in considerable detail, it should be understood that there is no intention to limit the disclosure to the specific forms disclosed. On the contrary, the intention is to cover all modifications, alternative constructions, equivalents, and uses falling within the spirit and scope of the disclosure as expressed in the appended claims.

While this disclosure has been particularly shown and described with reference to preferred embodiments, it will be understood by those skilled in the art that various changes in form and detail may be made therein without departing from the spirit and scope of the disclosure. The inventors expect skilled artisans to employ such variations as appropriate, and the inventors intend the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments but should be defined only in accordance with any claims and their equivalents issuing from this disclosure. Furthermore, the above advantages and features are provided in described embodiments but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure but should not be constrained by the headings set forth herein.

I claim:

1. An apparatus for descent control comprising:
   a housing comprising a longitudinal capstan portion, the longitudinal capstan portion defining a longitudinal counterbore therein;
   a plunger disposed within the longitudinal counterbore for movement between a rope releasing position and a rope braking position;
   a biasing member within the longitudinal counterbore for biasing the plunger toward the rope braking position;
   a protective sleeve partially enclosing the housing; and
   a vented sleeve enclosing the protective sleeve, wherein the vented sleeve and the protective sleeve comprise a plurality of vents configured to provide an air flow to the longitudinal capstan portion of the housing.

2. The apparatus of claim 1, further comprising at least one air gap between the vented sleeve and the protective sleeve.

3. The apparatus of claim 2, wherein the at least one air gap is configured to provide increased air flow through an end of the vented sleeve and through the plurality of air vents.

4. The apparatus of claim 1, further comprising an outer sleeve enclosing the vented sleeve.

5. The apparatus of claim 4, wherein the outer sleeve is manufactured from a metallic based composite material.

6. The apparatus of claim 1, wherein the vented sleeve is manufactured from a plastic based composite material.

7. The apparatus of claim 1, wherein the protective sleeve comprises two distinct parts.

8. The apparatus of claim 1, wherein the vented sleeve has at least one rope aperture at a first end of the vented sleeve separate from the plurality of vents.

9. An apparatus for descent control comprising:
   a housing comprising a longitudinal capstan portion, the longitudinal capstan portion defining a longitudinal counterbore therein;
   a plunger disposed within the longitudinal counterbore for movement between a rope releasing position and a rope braking position;
   a biasing member within the longitudinal counterbore for biasing the plunger toward the rope braking position;
   a protective sleeve partially enclosing the housing; and
   a vented sleeve enclosing the protective sleeve, wherein the vented sleeve forms at least one air gap between the vented sleeve and the protective sleeve.

10. The apparatus of claim 9, wherein the vented sleeve is manufactured from a plastic based composite material.

11. The apparatus of claim 9, wherein the protective sleeve is manufactured from a metallic based composite material.

12. The apparatus of claim 9, wherein the protective sleeve comprises two distinct parts.

13. The apparatus of claim 9, wherein the vented sleeve forms a plurality of air gaps between the vented sleeve and the protective sleeve.

14. The apparatus of claim 9, further comprising a metallic sleeve partially enclosing the vented sleeve.

15. A vented sleeve for use with a rope operated device comprising:
   a cylindrical body comprised of a circumferential wall having an inner surface and an outer surface;
   at least two vents passing from the outer surface to the inner surface;
   a top at a first end of the vented sleeve, awl-the top defining a rope aperture;
   a second end opposing the first end, the second end being open to allow the rope operated device to be at least partially inserted within the vented sleeve; and
   a plurality of offset bridges formed along the inner surface of the cylindrical body; and
   at least one partial separation support between the at least two vents, wherein the at least one partial separation support has a depth less than that between the outer surface and the inner surface of the cylindrical body.

16. The vented sleeve of claim 15, wherein the vented sleeve further comprises at least one separation support between the at least two vents.

17. The vented sleeve of claim 15, wherein the height of the offset bridges extending from the circumferential wall is greater than the thickness of the circumferential wall.

18. The vented sleeve of claim 15, wherein the height of the offset bridges extending from the circumferential wall is less than the thickness of the circumferential wall.

19. A vented sleeve for use with a rope operated device comprising:
   a cylindrical body comprised of a circumferential wall having an inner surface and an outer surface;
   at least one vent passing from the outer surface to the inner surface;
   a top at a first end of the vented sleeve, the top defining a rope aperture;
   a second end opposing the first end, the second end being open to allow the rope operated device to be at least partially inserted within the vented sleeve; and
   a plurality of offset bridges formed along the inner surface of the cylindrical body, wherein a height of the offset bridges extending from the circumferential wall is greater than a thickness of the circumferential wall.

20. The vented sleeve of claim 19, wherein the at least one vent comprises at least two vents.

21. The vented sleeve of claim 20, wherein the vented sleeve further comprises at least one separation support between the at least two vents.

22. The vented sleeve of claim 20, wherein the vented sleeve further comprises at least one partial separation support between the at least two vents.

23. The vented sleeve of claim 22, wherein the at least one partial separation support has a depth less than that between the outer surface and the inner surface of the cylindrical body.

* * * * *